United States Patent
Coughran et al.

(10) Patent No.: US 12,002,001 B2
(45) Date of Patent: *Jun. 4, 2024

(54) INTEGRATED MULTI-LOCATION SCHEDULING, ROUTING, AND TASK MANAGEMENT

(71) Applicant: Descartes Systems (USA) LLC, Atlanta, GA (US)

(72) Inventors: Patrick Miller Coughran, Tucson, AZ (US); Douglas David Coughran, IV, Tucson, AZ (US); Evan Fields, Cambridge, MA (US); Rany Polany, Foster City, CA (US); Raimundo Onetto, Walnut Creek, CA (US); Nathalie Saade, Berkeley, CA (US); Nasser Mohamed, Oakland, CA (US); Aurelio de Padua Gandra, Sao Paulo (BR)

(73) Assignee: Descartes Systems (USA) LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/215,466

(22) Filed: Jun. 28, 2023

(65) Prior Publication Data

US 2023/0342708 A1    Oct. 26, 2023

Related U.S. Application Data

(63) Continuation of application No. 17/208,708, filed on Mar. 22, 2021, now Pat. No. 11,727,345, which is a
(Continued)

(51) Int. Cl.
*G06Q 10/0835*    (2023.01)
*G06N 5/04*    (2023.01)
(Continued)

(52) U.S. Cl.
CPC ......... *G06Q 10/08355* (2013.01); *G06N 5/04* (2013.01); *G06N 7/01* (2023.01);
(Continued)

(58) Field of Classification Search
CPC . G06Q 10/08355; G06Q 10/047; G06N 20/00
(Continued)

(56) References Cited

U.S. PATENT DOCUMENTS 9,234,763 B1    1/2016    Savvopoulos et al.
9,696,175 B2    7/2017    Hansen et al.
(Continued)

OTHER PUBLICATIONS

Mastros, George; "School Bus Route Optimization: What is it and Why do I care?"; Nov. 3, 2011. (Year: 2011).*
(Continued)

*Primary Examiner* — Dione N. Simpson
(74) *Attorney, Agent, or Firm* — McDonnell Boehnen Hulbert & Berghoff LLP

(57) ABSTRACT

Methods, systems, and apparatus, including computer programs encoded on computer storage media, for scoring candidate routes. One of the methods includes obtaining a predictive model trained on training examples from trip log data, wherein each training example has feature values from a particular trip and a value of a dependent variable that represents an outcome of a portion of the particular trip, wherein the features of each particular trip include values obtained from one or more external data feed sources that specify a value of a sensor measurement at a particular point in time during the trip. Sensor values from one or more external data feed sources of a sensor network are received. Feature values are generated using the sensor values received from the one or more external data feed sources. A predicted score is computed for each route using the feature values for the candidate route.

20 Claims, 31 Drawing Sheets

Related U.S. Application Data continuation of application No. 15/238,708, filed on Aug. 16, 2016, now Pat. No. 10,956,855.

(60) Provisional application No. 62/259,295, filed on Nov. 24, 2015, provisional application No. 62/219,608, filed on Sep. 16, 2015, provisional application No. 62/205,727, filed on Aug. 16, 2015.

(51) Int. Cl.
| | |
|---|---|
| *G06N 7/01* | (2023.01) |
| *G06N 20/00* | (2019.01) |
| *G06N 20/10* | (2019.01) |
| *G06N 20/20* | (2019.01) |
| *G06Q 10/04* | (2023.01) |
| *G06Q 10/047* | (2023.01) |

(52) U.S. Cl.
CPC ............. *G06N 20/00* (2019.01); *G06N 20/10* (2019.01); *G06N 20/20* (2019.01); *G06Q 10/04* (2013.01); *G06Q 10/047* (2013.01)

(58) Field of Classification Search
USPC ......................................................... 705/338
See application file for complete search history.

(56) References Cited

U.S. PATENT DOCUMENTS

| | | | |
|---|---|---|---|
| 10,956,855 B1 | 3/2021 | Coughran et al. | |
| 2009/0125225 A1 | 5/2009 | Hussain et al. | |
| 2010/0106603 A1 | 4/2010 | Dey et al. | |
| 2010/0228574 A1 | 9/2010 | Mundinger et al. | |
| 2012/0041672 A1 | 2/2012 | Curtis et al. | |
| 2014/0278091 A1 | 9/2014 | Horvitz et al. | |
| 2015/0285652 A1* | 10/2015 | Peri .................... | G01C 21/3476 |
| | | | 701/438 |
| 2016/0117617 A1* | 4/2016 | Peters ................. | G06Q 10/025 |
| | | | 705/6 |
| 2016/0202074 A1* | 7/2016 | Woodard ............. | G06Q 10/047 |
| | | | 701/465 |
| 2016/0334236 A1 | 11/2016 | Mason et al. | |
| 2017/0108348 A1* | 4/2017 | Hansen ................ | H04W 4/024 |
| 2017/0154394 A1 | 6/2017 | Kan et al. | |

OTHER PUBLICATIONS

Bast et al.; "Route Planning in Transportation Networks," arXiv:1504.05140v1, Apr. 2015, 65 pages.

Mastros, George; "School Bus Route Optimization: What is it and Why do I care?" BusBoss, Nov. 3, 2011.

\* cited by examiner

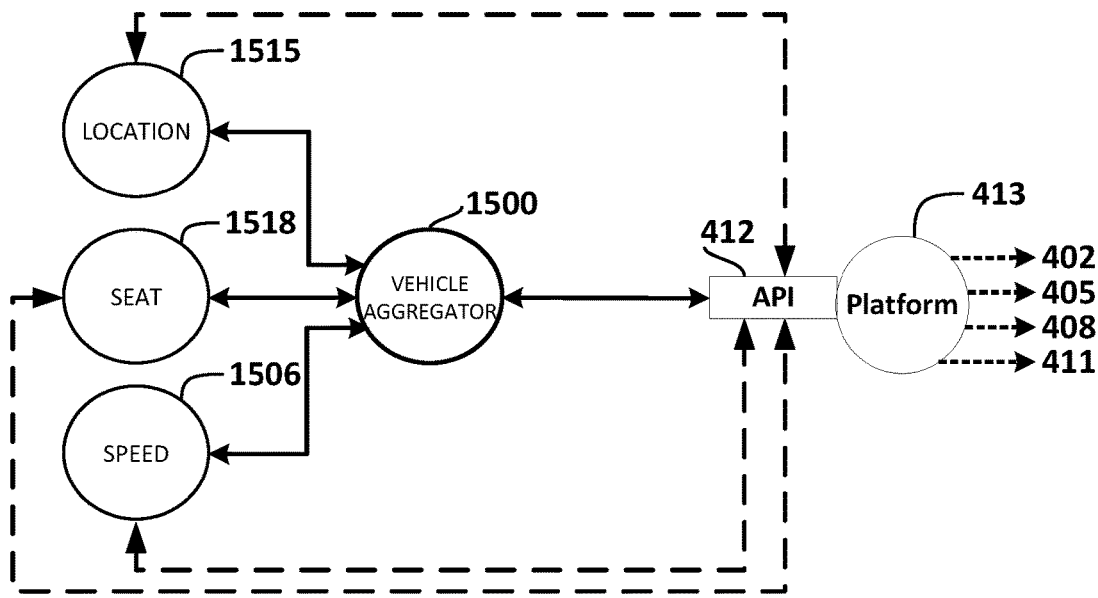
FIG. 25A
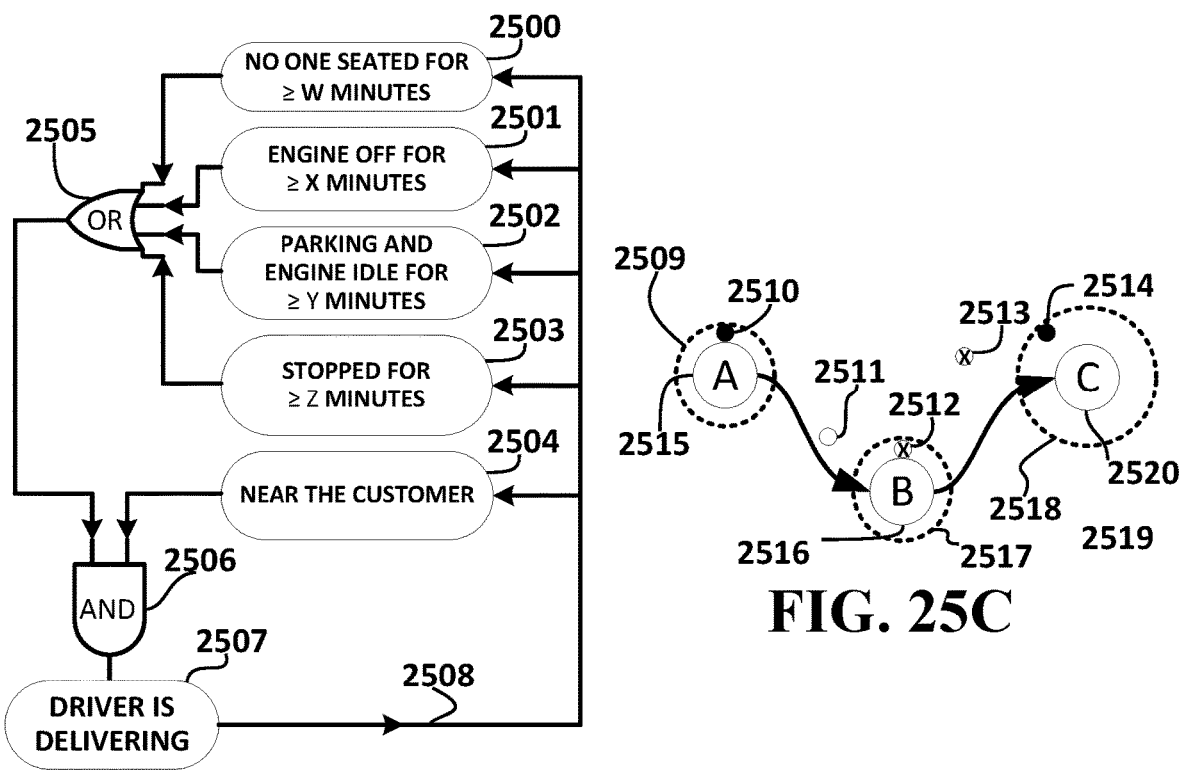
FIG. 25B
FIG. 25C

INTEGRATED MULTI-LOCATION SCHEDULING, ROUTING, AND TASK MANAGEMENT

CROSS-REFERENCE TO RELATED APPLICATIONS

This application is a continuation of pending U.S. patent application Ser. No. 17/208,708, filed on Mar. 22, 2021, which is a continuation of U.S. patent application Ser. No. 15/238,708, filed on Aug. 16, 2016, which claims priority to U.S. Provisional Application No. 62/205,727, filed on Aug. 16, 2015; U.S. Provisional Application No. 62/219,608, filed on Sep. 16, 2015; and U.S. Provisional Application No. 62/259,295, filed on Nov. 24, 2015. The disclosures of the foregoing applications are hereby incorporated by reference in their entirety.

FIELD OF THE INVENTION

This specification relates to transportation routing.

BACKGROUND

Conventional transportation management systems and methods used by business entities involve the use of scenario analysis, or route optimization, or delivery management, or telematics. The systems in existence represent a limited combination of these four approaches in the form of software that operates as stand-alone packages on computer or online. In these systems, the users interact by entering information and receiving information. In these systems, agents are represented as individuals that carry out tasks at multiple geographic locations, and the routes are between, and including, multiple locations.

While these systems may be adequate for simple snapshot analysis and static routing, they are not adequate for considering complex, dynamic, multi-point, multi-agent, and/or multi-route paths, in a real-time and integrated manner that incorporates the influences of uncertain external forces on the routes The existing systems are not dynamic, as they fail to leverage the benefit of using, simultaneously, real-time information sources and intelligent self-learning algorithmic programs to generate continually optimized routes. These systems require the individuals to select the starting and ending points for the route calculation. Additionally, these systems provide limited capability in the form and function of the means for communication and transmittal of the current optimal information to agents.

Furthermore, the existing systems are limited in delivering best practices for transportation and vehicular routing, scheduling and task management because these systems are not fully integrated into a comprehensive network of sensor edge nodes (as defined above) to collect and aggregate data for processing. The existing systems lack the robust integration into a plurality of data streams from a variety of network connected sensor edge nodes, and therefore, are unable to ascertain the wide-ranging visibility and real-time situational awareness of the transportation environment, which hinders the precision of these systems.

SUMMARY

This specification describes new and useful technologies for recommending optimal routing of transportation agents. This specification also describes new and useful technologies for a software-based route optimization platform that utilizes information from external forces along with specialized algorithms to provide a high degree of precision. This specification also describes new and useful technologies for a commercially practicable method for generating optimal route candidates, which reduces operational costs and improves efficiency while utilizing specialized algorithms and information in a novel fashion. This specification also describes new and useful technologies for an economically attractive method that quickly solves route optimization problems in a unique manner and that provides higher precision and accuracy than other current methods. This specification also describes new and useful technologies for a technique for a system that is able to learn from the results of the analysis and apply these knowledge insights toward the subsequent analysis iteration, thereby, further reducing the time needed to solve problems and increasing the accuracy, precision, and efficiency of results. This specification also describes new and useful technologies for communicating the recommendation results with human, and non-human, agents of request, facilitating the exchange of recommendation results to enable execution by any type of solution requestor. This specification also describes new and useful technologies for a way of computation of conveyance and transportation routing in a parallel processing, hardware and software, computing environment, for example, computer processing units (CPU), graphic processing units (GPU), and neural processing units (NPU), which are able to be operated distributed and/or virtualized configurations. This specification also describes new and useful technologies for efficient transmittal and receipt of information between an agent, customer, and other completion tools and resources, and the platform system by using a variety of multifaceted communication protocols that intelligently reformat the out-bound data structures to align with the most efficient in-bound readability format of the receiving object, for example, the system understanding that the request for a route originated from a smartphone, and therefore, the response can be optimally formatted for that smartphone. This specification also describes new and useful technologies for a method that prioritizes and confirms the communication between an agent and the system to coordinate the timeliest exchange of information, and if coupled with a dynamic learning feedback approach, also monitors the impact of the corresponding execution on the performance of the real-time transportation route to maintain optimality of the route plan. This specification also describes new and useful technologies for a system in which a request, as defined by for example, number of drivers, starting location and time, address or coordinates for each order, time window for each order, service time for each order, size, capacity, load or volume of each order, is provided a response, which is defined by, for example, optimized route manifest for each driver, specific estimated time of arrival (ETA) for each stop, calculated driving time and driver cost, and calculated mileage and fuel cost. This specification also describes new and useful technologies for a method for aggregating and processing of data stream inputs from sensor edge nodes, to include for example, Internet of Things (IOT) devices, RFID devices, and other web-based network devices, with the intent to augment the situational awareness of the transportation environment for the purpose of enhancing the accuracy and precision of the algorithmic calculations towards conveying the most efficient recommendations, based on real-time or historical data analytics.

This specification also describes new and useful technologies for a software utility, that may learn from heterogeneous sources of data, for example, feedback, historical, real-time information, and use the data to provide optimized multi-location scheduling, routing, and/or task management recommendations. This specification also describes new and useful technologies for the software utility to dispatch, visualize, and/or communicate information in a variety of protocols to heterogeneous agents.

This specification describes new and useful technologies for computing and recommending optimized multi-point conveyance routes by a software-based platform. This specification also describes new and useful technologies for a method for providing business process recommendations in the domain of task scheduling. This specification also describes new and useful technologies for scenario analysis, forecasting, and resource allocation of agents to minimize resource utilization associated with a delivery, for example, minimizing cost, fuel usage, and time. This specification also describes new and useful technologies for simultaneously increasing the precision for delivery time-windows by either static or dynamic route optimization. This specification also describes new and useful technologies for the management of vehicular fleets and use of telematics to control and optimize transportation routes. This specification also describes new and useful technologies for the application of specialized algorithms and mathematical methods by using heterogeneous sources of inputs, for example, past performance, current situations, and other information, to perform computational methods to generate actionable instructions for execution of multi-point conveyance routes. This specification also describes new and useful technologies for learning from a multitude of inputs, for example, past performance, current situations, other information, to make better recommendations.

This specification also describes new and useful technologies for optimizing agent-based transportation dispatch and routing method, whereby an agent includes, for example, people, automobiles, boats, trains, bicycles, electric vehicles, Internet of Things devices, other computer systems, and aerial devices. More particularly, this disclosure relates to computing and communicating optimized multi-point conveyance routes by a software-based platform. This specification also describes new and useful technologies for communicating business process recommendations by using a plurality of methods, in the domain of task scheduling, scenario analysis and forecasting, and resource allocation of agents to minimize the time of travel between multi-point destinations, while simultaneously reducing transportation costs through route optimization.

This specification also describes a new and useful software-based system configuration that operates and transmits multi-point route information in a communication network, and that considers numerous input parameters, including external forces functioning under the influence of uncertainty, and dynamically outputs optimal transportation route recommendations via a plurality of communications channels to a variety of agents forms, for example, biological, software, electronic, and mechanical objects, that function on land, air, water, or space.

This specification also describes a new and useful method for handling a variety of actions, for example, configuring, acknowledging, receiving, responding, and processing, of data streams from a plurality of sources, referred to as "sensor edge nodes", which are represented by, for example, Internet of Things (IoT) types of devices with IPv4 or IPv6 address schemes, Radio Frequency Identification Tags (RFID), transmitters, transponders, recorders, smart meters, electronic signs, counters, on-board computers, weight scales, chemical, actuation, pressure gauges, capacity levels, accelerometers, velocity measures, thermometers, odometers, altimeters, anemometer, udometers, pluviometers, ombrometers, luxmeters, barometers, flow rates, parking meters, toll bride meters, gas meters, through-put, weather meters, mobile devices, mobile phones, health monitors (e.g., blood pressure, blood sugar, oxygen, fitness activity), and, other internet-based systems, which can include, for example, web cameras, web calendars, and social media applications.

This specification also describes new and useful technologies for the integration of the sensor edge nodes provides a means for gaining augmented situational awareness. These technologies, when utilized within the context of a transportation supply chain environment, can derive a comprehensive and real-time view of reality, and can be used for the purposes of tuning, optimizing, conveying, identifying, or recommending best practices within the context of integrated multi-location vehicular routing, scheduling, and task management, the precision and recommendations of which are particularly effective at improving overall efficiency.

This specification also describes new and useful technologies for providing an integrated software-based system that utilizes a multitude of data and information parameters from external forces, and with prior historical and real-time information which influence the identification of transportation routes, to compute optimized candidate routes, and that utilizes heterogeneous sources real-time data input parameters and pre-existing information to dynamically learn and provide multi-location scheduling, routing and task management.

This specification also describes new and useful technologies in which a fleet of agents, for example, automotive, aeronautical, astronautical, locomotive, aquatic, pedestrians, cyclists, and other modes of land, air, sea, and space transportation systems, can be optimally configured to navigate through a multi-point route, whilst minimizing cost, time, and other resources.

This specification also describes new and useful technologies for a system which comprises of an integrated software-based system comprising of several information technology systems, arranged in an interlinked and redundant manner of modules, that uniquely work together to provide processing of inputs, computation analysis, and the output of actionable instructions to the agent. Inside each module of the system are data parameters which are stored in structured and unstructured databases, records that are logged and audited, algorithms that perform analysis for the best candidates of routes; additionally, the system preferably provides a method for an agent, both human and electrical, which are capable of receiving the recommendation in various formats. Preferably, the entire platform system, and all communication channels, are encrypted to ensure privacy and confidentiality of information. The platform system may consist of computer hardware, virtualized or otherwise, that are located physically on the same network, or dispersed throughout a Wide Area Network array. The computer infrastructure can be connected via secure tokens, Virtual Private Networks, and other means of private exchange of data. Preferably, the entire platform system is fault tolerant and operates in a redundant and duplicated manner to ensure expedient disaster recovery.

This specification also describes new and useful technologies for routing a transportation vehicle, or other human or non-human agents (e.g., flying drone, car, airplane, boat, Internet of Things (IoT) device), in accordance with the aspects presented and discussed within this disclosure, the user or agent submits a request into the platform system through a secure web-based portal, or other forms of internet communication portals. This request may trigger the platform system to begin processing the request through a series of actions that eventually leads to the optimal route recommendation. The system may continue to explore and compute optimal adjustments to the route, in response to factors including, but not limited to, the user, the agent and external factors.

This specification also describes new and useful technologies for providing a platform system that is connected to numerous in-bound data feeds which include sources of information that have been already been processed by external parties, for example, street maps, real-time traffic, 3D topological maps, weather, flight information, vehicle specifications, fuel prices, driver performance records, payload characteristics, loading dock configurations, and other specifications, which may be used by a specialized algorithm to compute route candidates, and, optionally, even to determine the optimal route, at that point in time. This specification also describes new and useful technologies for providing sensor edge nodes that function as collectors of various types of data information, for example, environmental conditions, physical characteristics, movement, and elevation, and that are capable of streaming the data that is collected to another source, for example, an aggregator and/or directly to another system, which may include for example, the platform system as described herein. The data can collected in numerous formats, for example, binary, nominal, cardinal, and ordinal, in various interval levels, for example, discrete, continuous, time-series, temporal, and sequential, and, optionally, controls over the degree of precision can be implemented, and further, the amplitude of the signal can be adjusted to address quality of service strength.

This specification also describes new and useful technologies for the platform system to provide users, agents, customers, and other completion tools and resources with the recommendation about the optimal route. The platform system is equipped with a dashboard type Graphic User Interface (GUI) system to allow a user and decision maker to control various aspects of the system, for example, upload information, make requests for route optimization, track progress, generate and communicate summary reports, make modifications to the parameters of the fleet of agents, as well as other forms of adjustments. Additionally, the platform system is capable of receiving the request from other automated systems and return information in a structured manner that can be used by a non-human agent (e.g., drone, robot), for example, an aerial drone for delivery of crop nutrients, an Internet of Things (IOT) device, or an automated tractor plowing a field.

This specification also describes new and useful technologies that enable the best planning and execution possible for a set of tasks for which different sequences imply different transportation costs. Those tasks can be deliveries, pickups, and/or services (including surveillance) to be performed at a physical location. The integration of the sensor edge node provides additional real-time perspectives about the transportation ecosystem and facilities improved decision making and recommendation to align with business objectives.

This specification also describes new and useful systems that are suited for fleets that transport, unload and load goods, or perform services between multi-point locations; for example, emergency first responder vehicles, crop field management, food distribution, airport commuter pools, taxis, school buses, public transportation, healthcare transportation, and various forms of deliveries, for example, grocery, laundry, passengers, and floral.

This specification also describes new and useful systems that are suitable for the management and configuration of automated drone vehicles. This specification also describes new and useful systems that are suitable for reducing the carbon footprint through precision routing of transportation vehicles. This specification also describes new and useful technologies for improved learning and control, static and/or dynamic, through the integration of heterogeneous sensor node data inputs that are coupled with machine learning and data analytics.

This specification also describes new and useful technologies that advance the art of conveyance-based routing using an integrated system consisting of specialized programmatic software modules that operate individually, and/or together, to calculate and communicate recommendations for travel routes; and can optionally provide improved methods for minimizing costs, and/or reducing the number of events associated with last arrival and departure outside the defined time-windows, thereby improving operations efficiency. This specification also describes new and useful technologies providing the capability for decision-makers to gain more accurate and meaningful insights about current operating environment through the integration of sensor nodes, as data collectors, and/or data aggregation, and that can be coupled with a data analytics processing platform.

In general, one innovative aspect of the subject matter described in this specification can be embodied in methods that include the actions of receiving a plurality of candidate routes, wherein each route is data specifying a particular ordering of a plurality of waypoints; obtaining a predictive model trained on training examples computed from trip log data, wherein each training example has feature values from a particular trip and a value of a dependent variable that represents an outcome of a portion of the particular trip, wherein the features of each particular trip include values obtained from one or more external data feed sources that specify a value of a sensor measurement at a particular point in time during the trip; receiving sensor values from one or more external data feed sources of a sensor network; generating, for each candidate route, feature values using the sensor values received from the one or more external data feed sources; computing, for each candidate route, a predicted score using the feature values for the candidate route; ranking the candidate routes based on the predicted score for each candidate route; and providing a highest-ranked candidate route, travel directions for the highest-ranked candidate route, or both in response to receiving the plurality of candidate routes. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The actions include generating, for each candidate route of the plurality of candidate routes, travel directions that specify how an agent should travel to each of the plurality of waypoints of the candidate route in the order specified by the candidate route, wherein generating, for each candidate route, feature values comprises generating feature values using the travel directions generated for the candidate route. The predictive model generates a predicted score for each waypoint of a route, wherein computing, for each candidate route, a predicted score using the feature values for the candidate route comprises summing the predicted scores for each waypoint of the candidate route. The predicted score for each waypoint is based on a predicted cost of (i) performing all tasks specified by the travel directions to be performed at the waypoint (ii) at a predicated time of presence at the waypoint specified by the candidate route. The predicted score for each waypoint is based on a predicted benefit for performing a task at the waypoint at a predicted time specified by the travel directions. The predicted score for each waypoint is computed from multiple terms, wherein the multiple terms include two or more of: a first term that represents a predicted cost of (i) performing all tasks specified by the travel directions to be performed at the waypoint (ii) at a predicated time of presence at the waypoint specified by the candidate route, a second term that represents a predicted benefit for performing a task at the waypoint at a predicted time specified by the travel directions; and a third term that represents a likelihood that a task performed at the waypoint at a predicted time will be completed successfully. The predicted score for each waypoint represents a likelihood that a task performed at the waypoint at a predicted time will be completed successfully. The trip log data indicates for each trip of one or more trips whether or not parking was available for one or more waypoints of the trip, and wherein the predicted score for each waypoint is based on a predicted likelihood of parking being available at the waypoint. The trip log data indicates for each trip of one or more trips whether or not a loading dock was available for one or more waypoints of the trip, and wherein the predicted score for each waypoint is based on a predicted likelihood of a loading dock being available at the waypoint. The trip log data indicates for each trip of one or more trips whether or not a recipient of a delivery had sufficient resources to accept a delivery for one or more waypoints of the trip, and wherein the predicted score for each waypoint is based on a predicted likelihood of a recipient of a delivery at the waypoint having sufficient resources to accept a delivery at the waypoint. The actions include computing, for each candidate route, a count of how many waypoints for the candidate route have predicted scores that satisfy a threshold score; and determining whether the count satisfies a threshold count; and rejecting candidate routes having a count that satisfies the threshold count. The actions include computing, for each candidate route, a ratio of (i) how many waypoints for the candidate route have predicted scores that are less than a minimum threshold score to (ii) how many waypoints are in the candidate route; and determining whether the ratio is greater than a ration threshold; and rejecting candidate routes having a ratio that is greater than the ratio threshold. The predictive model generates one or more predicted durations for an agent to travel one or more paths between waypoints for a candidate route, and wherein computing, for each candidate route, a predicted score using the features for the candidate route comprises summing the predicted durations for each of the one or more paths. The predictive model generates a predicted distance traveled on one or more paths between waypoints for a candidate route, and wherein computing, for each candidate route, a predicted score using the features for the candidate route comprises summing the predicted distances traveled for each of the one or more paths. The external data feed sources comprise data received from remote devices that generate vehicle data, passageway data, weather data, geopolitical data, facility data, or agent data.

Particular implementations of the subject matter described in this specification can be implemented so as to realize one or more of the following advantages. The system can compute update and distribute routes to agents in real-time throughout the day as conditions change. The system can use distributed processing techniques to explore a large space of routes in a relatively short amount of time. The system can use diversity scores to explore many different locally preferable portions of the routing space. The system can use predictive modeling techniques along with information from a sensor network to generate the best routes given historical data and current conditions. The system can use per-waypoint utility functions to increase the likelihood of all tasks on a route being completed successfully and as efficiently as possible. The quality of the data can be improved.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

This important aspects of the various examples described within this disclosure may be attained by examination of the appended figures, which depict examples of permutations and/or combinations of various forms and functions of the input/outputs, architecture, topology, modules, hierarchy, processes, systems, methods, and use cases for utility, and these examples should not to be considered as the limitation of scope, with regards to other possible permutations, combinations, means of execution, or other capabilities which are contemplated herein. Accordingly:

FIG. 25A, FIG. 25B, and FIG. 25C (collectively referred to as FIG. 25) illustrate an example use-case of using sensors to influence an understanding of what a driver is doing, at any given time.

DETAILED DESCRIPTION

Figure 1:
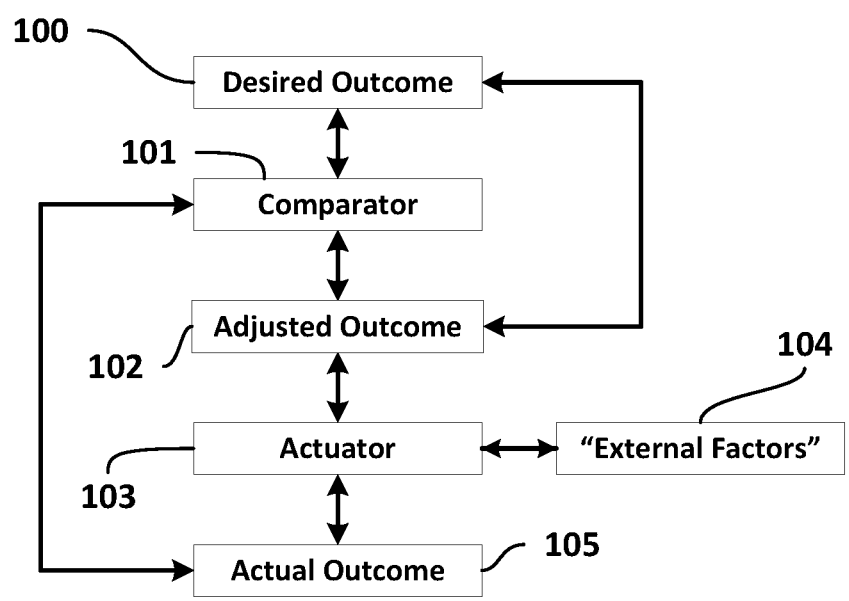
FIG. 1 illustrates an example of determining optimized outcomes of routing for multi-stop delivery, multi-stop pickup, and multi-stop service calls, in which the system is able to learn from actual outcomes to improve subsequent analysis.

This specification describes, among other things, a system that can determine and rank routes for a plurality of waypoints using external data sources. In this specification, a route refers to data that assigns an ordering to a group of waypoints. A waypoint is a data element that represents a physical geographic location, which is also referred to as a waypoint. When necessary to distinguish them, they may be referred to as a waypoint data element and a waypoint location. A waypoint location is typically represented in a waypoint data element by two- or three-dimensional coordinates, e.g., latitude, longitude, and altitude; their corresponding equivalents in another coordinate system; or by any other appropriate naming system, e.g., street intersections.

Each waypoint can implicitly or explicitly represent a task to be completed by an agent at or near the geographic location of the waypoint. For example, if a group of waypoints represent locations at which an agent will make deliveries, each of the waypoints also implicitly represents the delivery tasks to be made at or near the geographic delivery locations.

A route can include one or more instances of each waypoint in the group of waypoints. In other words, a route can specify that some waypoints are visited more than once. From a route, the system can then generate corresponding directions, specifically, information about how an agent could or should travel to each of the waypoint locations on the route. For example, the directions generated for a particular route can specify on which streets an agent should travel, in what direction, and in what order.

In this specification, an agent is an entity that is responsible for completing tasks. In some cases, agents can be assigned to vehicles to carry out tasks, in which case the agent and the vehicle are separate entities, e.g., a driver and a truck. In other cases, an agent may itself be a vehicle, e.g., a flying drone or a system controlling a self-driving truck. Examples of agents include people, animals, self-driving automobiles, and aerial devices. Example of vehicles for use by agents include boats, trains, bicycles, and electric vehicles.

Various other devices and systems can assist agents in completing tasks. These devices that aid an agent in completing tasks will be generally referred to as completion tools and resources devices, or, for brevity, CTR devices. CTR devices include, for example, telematics devices, Internet of Thing (IoT) devices, computer and software devices, e.g., mobile phones and tablet computers.

In this specification, a trip is a data element representing an agent's actual travel to one or more waypoints of a route. A trip can thus include information representing when an agent traveled to each of the waypoints of the route, how long an agent remained at each waypoint, how the agent actually traveled to each waypoint, the order in which the agent traveled to each waypoint, whether waypoints were skipped or visited multiple times, whether a task at the waypoint was successful or unsuccessful, a start time of the trip, an end time of the trip, a total duration of the trip, or any other appropriate information.

The system can use external data sources to inform the route generation process. Real-world factors, e.g., current weather and traffic conditions, can drastically affect how agents are able to travel to locations along a route. Thus, the system can collect external data using real-world sensors to generate better routes for current conditions based on historical data.

The system can also periodically or continually update routes in real-time as each day progresses. In this specification, a route being generated in "real-time," or near real-time, means that the system generates a route based on current conditions in enough time for an agent to travel at least part of the route while those conditions apply. Usually, this means that the system generates new routes for all agents in a matter of seconds or minutes rather than hours or days. Thus, the system is real-time in the sense that the agents observe no appreciable delays from processing limitations of the system. And in fact, in most cases, the system can compute and distribute updated routes in the time it takes an agent to perform a task at a waypoint or to travel between waypoints, rather than only computing an updated route at the beginning of each working day as in prior art systems.

In FIG. 1 is shown a process flow that begins with a desired outcome 100 which is passed to a comparator 101 that is tasked with evaluating the outcome. This evaluation is considered in the adjusted outcome 101, which then either moves the result of the outcome to the actuator 103 to initiate the task or returns the task back to the start to evaluate another desired outcome 100. At the actuator 103 there are external factors 104, for example, weather, load information, vehicle specifications, and traffic, which then influence the actual outcome 105.

Figure 2:
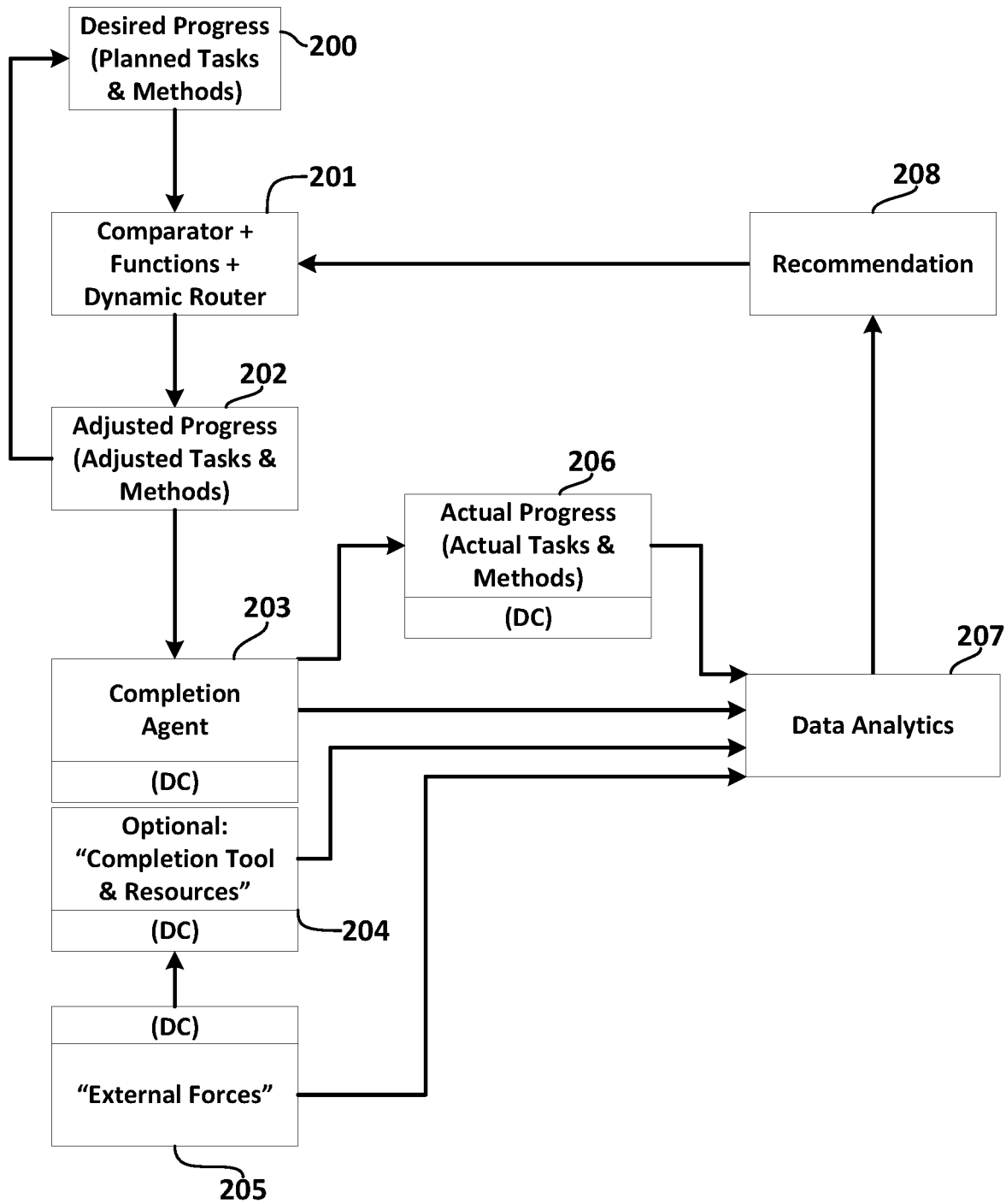
FIG. 2 illustrates an example of dynamically computing, and learning from, a recommendation from the multi-point vehicular progress inputs and the corresponding data analysis computation output from a completed agent, under the influence of known and/or uncertain external factors.

FIG. 2 illustrates an example process flow for tracking progress of the completion for computational requests and delivery of a recommendation. The flow begins with a request for desired progress 200 which then moves this request to be processed by the comparator, functions, and a dynamic route generator 201 which considers and learns from the recommendations 208 from a previous analysis, if one exits. Once the route is established the adjusted progress 202 is determined and fed back to the desired progress 202 request. The completion agent 203 is then notified, which can include an optional completion and resources tool, 204, which assists in the completion of the job, and includes, for example, telematics devices, Internet of Thing (IoT) devices, computer and software devices, and staff members. Both 203 and 204 receive input from the external forces 205, which includes, for example, weather patterns, traffic patterns, driver behavior patterns, topographic patterns, geopolitical patterns, maps, loading dock specifications, payload specifications, delivery earliest arrival, delivery latest departure, vehicle specifications, vehicle maintenance costs, fuel and oil costs, driver costs, business preferences, business goals, business objectives, business constraints, and competitor dynamics. The completion agent 203 than updates the actual progress 206, which then passes the information to the data analytics systems 207, and then a recommendation 208 is generated, which then provides feedback into the comparator, functions, and a dynamic route generator 201, and facilities the system learning and augmentation for subsequent analysis. The DC notation in 203, 204, and 206 refers to data that is digitally captured (DC).

Figure 3:
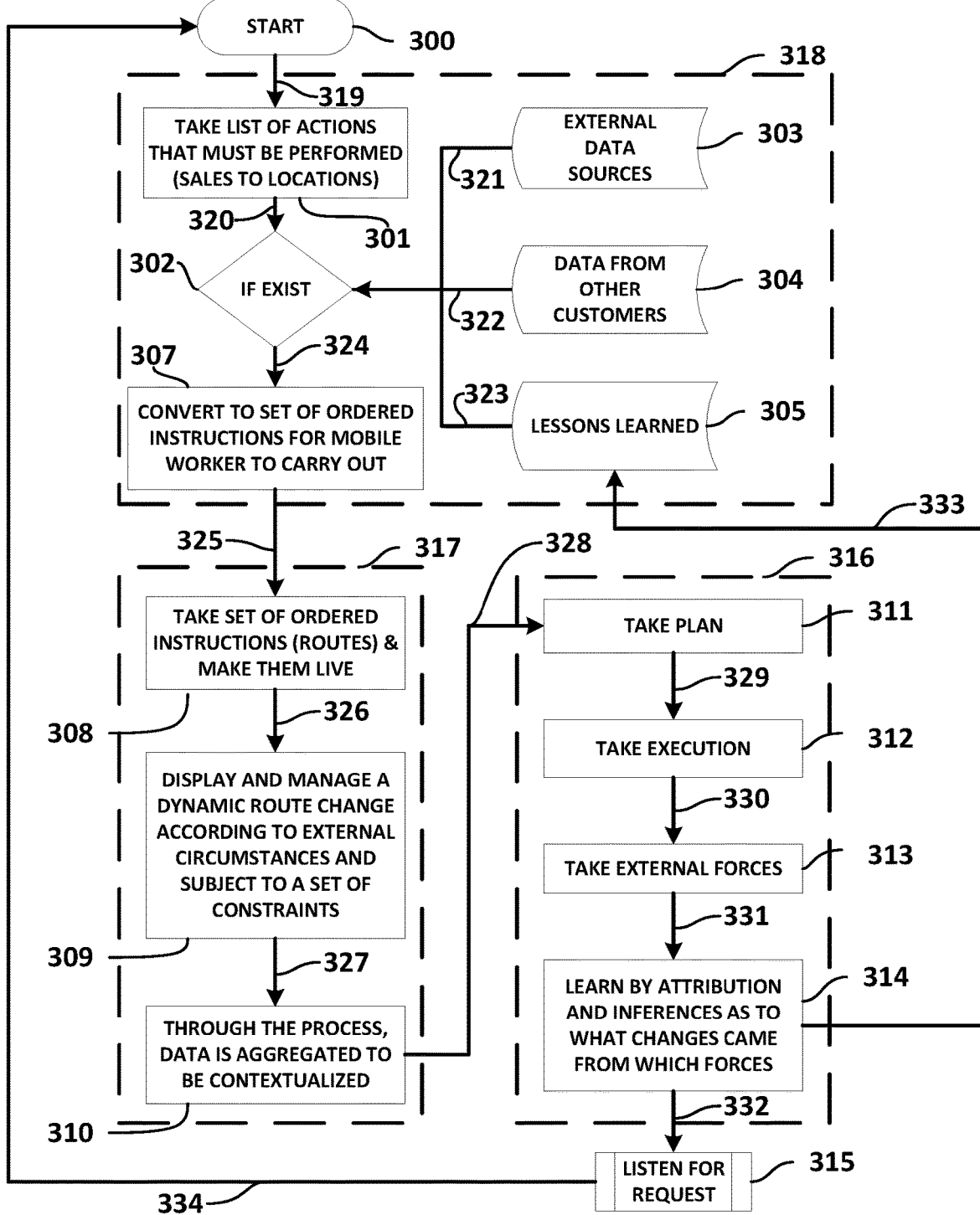
FIG. 3 illustrates an example of a process by which the platform system plans, executes, communicates, and learns.

FIG. 3 is a process flowchart for a multi-phase approach for 1) planning 318, 2) execution 317, and 3) learning 316. The process can be performed by a platform system 413, shown, i.e., in FIG. 4, which may referred to as the "platform," the "system," or the "platform system." The process starts 300 when a request is received. A task list of actions 301 is generated, and then if additional information exists 302 in the form of external data sources 303, the likes of which includes, for example, maps, weather, or traffic, or data from other customers 304, or lessons learned 305, then it leads to the conversion of instructions to be executed 307. Shifting to the execution phase 317, the instructions to be executed 307 are then utilized, enabled, and made live 308 in the system, and then routes, either static or dynamic, based on external information and constraints are established 309. Then the results are aggregated and prepared to be contextualized 310. The system then evaluates the results by considering the plan 311, the execution of the plan 312, the external forces 313, and learns by attribution and inferences 314 how the change came about from all the input forces. With this updated systems-based knowledge, the platform shifts 332 to a listener mode to receive the next request 315, growing smarter and more capable of making more precise and accurate recommendations with every iteration.

The planning phase 318 seeks out relevant data sources inputs and prepares for processing, which then may communicates to the execution phase 317, which then may performs dynamic analysis and prepares the results for contextualization and dispatch of information, and then may communicate to the learning phase 316, which utilizes external forces inputs to develop deeper insights into possible recommendations.

FIG. 3 illustrates a method for communication between the planning 318, execution 317, and learning 316 modules. The communication and dispatch of information occurs at 319, 320, 321, 322, 323, 324, 325, 326, 327, 328, 329, 330, 331, 332, 333, and 334. The planning module 318 communicates to the execution module 317 by way of 325. The execution module 317 communicates to the learning module 316 by way of 328. The learning modules communicates back to the planning module 318 by way of 333, and informs 332 the listener 315 to prepare for inbound requests, such that when a request is received, an initiation 334 then starts 300 another iteration of process. Each of the planning phase 318, execution phase 317, and learning phase 316 can be performed simultaneously, in sequence, or in parallel, on multi-core, multi-thread, or multi-processor computing resources, such as, for example, Computer Processing Units (CPU), Graphic Processing Units (GPU), and Neural Processing Units (NPU).

Still referring to FIG. 3, at 319 depicts the communication trigger to begin task 301. At 320 depicts the communication trigger to begin task 302, a decision node for considering 303, 304, and 305. At 321 depicts the communication signal that determines if external data sources 303 exist for consideration, and if so, to move this information to 302. At 322 depicts the communication signal that determines if new data from other customers exists for consideration, and if so, to move this information to 302. At 323 depicts the communication signal if new lessons learned 303 exist for consideration, and if so, to move this information to 302. At 324 depicts the movement of the new information data to 307, whereby the data and information is reformatted, converted, and otherwise transformed into a set of instructions that can be meaningfully understood by a mobile worker. At 325 depicts the shift from the planning module 317 to the execution module 317, in which the set of ordered instructions 307 are then enabled 308 and made live in the system so that the instruction become available for use. At 326 is depicted the movement of the live ordered instruction 308 to a state which is displayed 309 to a vehicle driver, or other agent. The form of display includes, for example, mobile phone, tablet, watch, helmet, goggles, glasses, contact lens, windshield, optical head-mounted display, masks, monitor, and television. At 327 depicts the shift from display 309 to contextualization 310 of the data. At 328 depicts the shift from execution 317 to learning 316, in which the contextualized information 310 is now organized into a sequence of tasks 311, 312, 313, and 314 that promote the continuous learning of the system. At 329 depicts taking the computed and contextualized plan 311, then concatenating that information by way of 330 to the execution plan 312, which is then further concatenated with the external force 313, and as a whole set of information moved 331 into a state that can be analyzed so that insights can be learned for improvement 314. The results of the learning from 314 are then feed back into the planning module 318 into the dataset for the lessons learned 305. At 332 depicts the trigger of completion and a shift of the process from active to listener 315 so the system is available to accept another request to process. At 334 depicts the acceptance of a request and the dispatch to start processing a new iteration.

Figure 4:
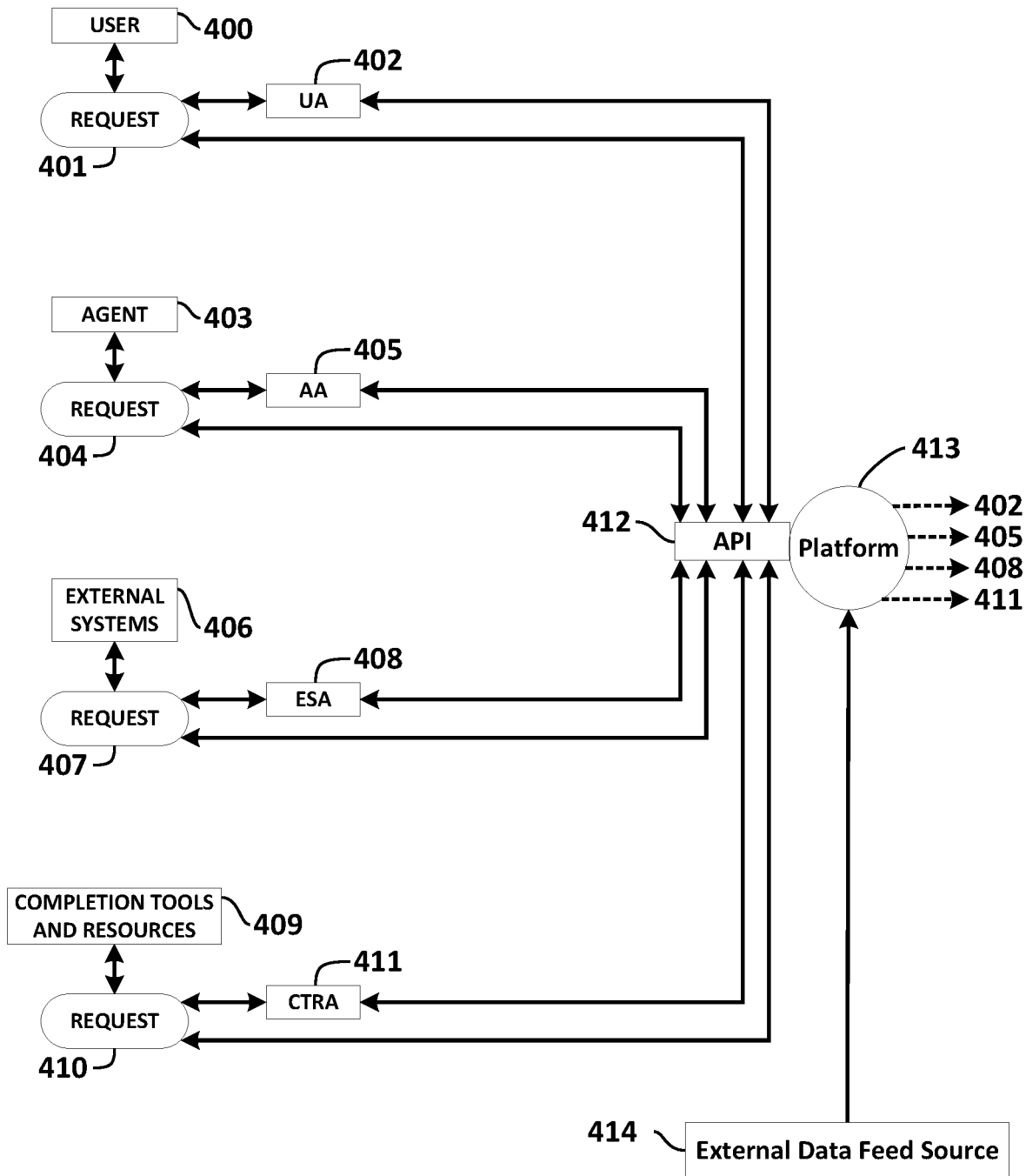
FIG. 4 illustrates an example of a topological relationship of communication inputs of the users, agents, customers, and completion tools and resources, in relation to the system API and platform system.

FIG. 4 is an illustration of an example topological architecture of the relationship between the user 400, referring to those interacting with the platform system 413 that is managing the system, agent 403, which refers to other forms of systems that may interact-with the system and doing the work, for example, other computers systems, Internet of Things (IoT) devices, drones, and vehicle drivers, external systems 406, which refers to other systems that may interact with the system to exchange information, for example, warehouse systems, scheduling systems, and fleet management systems, and completion tool and resources 408, which refers to other forms of supplementary objects, that may support the completion of a task, for example, Internet of Things (IoT) devices, computer systems, and employee/staff members, cranes, tractors, drones, lifts, and staff members. For all those accessing the system to the API service 412, for example, user 400, agent 403, external systems, completion tool and resources 408, is an interface option, for example, UA 402, AA 405, ESA 408, CTRA 411. Additionally or alternatively, there could exist direct connections that circumnavigate the interface applications, and communicate directly into the API.

The user 400 submits a request 401, for example, create routes, reoptimize, create delivery, edit routes, which may be delivered in the form of information, for example, unordered unassigned tasks (UUT), unordered assigned task (UAT), and ordered assigned tasks (OAT), through either a user application (UA) 402, or alternatively, directly to the API 412, in order to make a request of the platform system for optimized routes. The user 400 may initiate a request 404, for example, a read request and/or or a write request. The read request, which includes, for example, getting an update, generating a report, looking up information, searching, polling, or otherwise reading information, may communicate directly through to the API 412 and/or through the user application 402. The write request, which includes, for example, writing an update, generating a report, writing information, updating, querying, amending, editing, deleting, or otherwise writing information may communicate directly through to the API 412 and/or through the UA 402.

The agent 403 submits a request 404, for example, create routes, reoptimize, create delivery, edit routes, which may be delivered in the form of information, for example, unordered unassigned tasks (UUT), unordered assigned task (UAT), and ordered assigned tasks (OAT), through either an agent application (AA) 405 and/or directly to the API 412, to make a request for optimized routes. The agent 403 may initiate a request 404, for example, a read request and/or or a write request. The read request, which includes, for example, getting an update, generating a report, looking up information, searching, polling, or otherwise reading information, communicates directly through to the API 412 or through the agent application 405. The write request, which includes, for example, writing an update, generating a report, writing information, updating, querying, amending, editing, deleting, or otherwise writing information, communicates directly through to the API 412, and/or through the AA 405.

The external systems 406 submits a request 407, for example, create routes, reoptimize, create delivery, edit routes, which may be delivered in the form of information, for example, unordered unassigned tasks (UUT), unordered assigned task (UAT), and ordered assigned tasks (OAT), through either an external systems application (ESA) 408 or directly to the API 412 to make a request for optimized routes. The external system 406 initiate's requests 407, for example, a read request or a write request. The read request, which includes, for example, getting an update, generating a report, looking up information, searching, polling, or otherwise reading information, communicates directly through to the API 412, and/or through the external system application 408. The write request, which includes, for example, writing an update, generating a report, writing information, updating, querying, amending, editing, deleting, or otherwise writing information communicates directly through to the API 412, and/or through the ESA 408.

The completion tools and resources 408 submits a request 410, for example, create routes, reoptimize, create delivery, edit routes, which may be delivered in the form of information, for example, unordered unassigned tasks (UUT), unordered assigned task (UAT), and ordered assigned tasks (OAT), through either a completion tools and resources application (CTRA) 411 and/or directly to the API 412 to make a request for optimized routes. The completion tools and resources 408 initiate's requests 410, for example, a read request and/or a write request. The read request, which includes, for example, getting an update, generating a report, looking up information, searching, polling, or otherwise reading information, communicates directly through to the API 412 and/or through the completion tools and resources application 411. The write request, which includes, for example, writing an update, generating a report, writing information, updating, querying, amending, editing, deleting, or otherwise writing information communicates directly through to the API 412 and/or through the CTRA 411.

Still referring to FIG. 4, the platform 413 can accept inputs from various sources, for example, the user 400, user application 402, agent 403, agent application 405, external systems 406, external systems application 408, completion tools and resources 408, completion tools and resources applications 411, and external data feed sources 414, which 414 can include, for example, vehicle specifications, past performance of driver behavior, maps, weather information, and traffic. The platform system 413 provides direct feedback communication to the UA 402, AA 405, ESA 408, and CTRA 411.

Still referring to FIG. 4, the bi-directional communication request link between the user 400 and the API 412, in which the API 412 is able to adapt and receive information requests 401 from the user 400 in various forms, for example, documents, spreadsheets, programmatic entry of parameters, and configuration files. As the system can be bi-directionally linked between the user 400 and the API 412, the API 412 is intelligently aware of the interface and the optimal communication protocol for the user 400, and therefore, optimizes the transmittal of information to the user 400 in the optimal data structure format for that receiver, thereby establishing an intelligently-aware communication stream that exchanges and transmits information data in an optimally configured format.

FIG. 4 illustrates the bi-directional communication request link between the user 400 and the user application (UA) 402, in which the UA 402 is able to adapt and receive information from the user 400 in various forms, for example, documents, spreadsheets, programmatic entry of parameters, configuration files, telephone, voice commands, keyboard type entry, ocular gestures, mouse gestures, body-motion gestures, joysticks, and other electronic or software-based devices coupled and controlled by the user 400. As the system is bi-directionally linked between the user 400 and the UA 402, the UA 402 is intelligently aware of the interface and optimal communication protocol for the user 400, and therefore, optimizes the transmittal of information to the user 400 in the optimal data structure format for that receiver, thereby establishing an intelligently-aware communication stream that exchanges and transmits information data in an optimally configured format.

FIG. 4 illustrates the bidirectional communication request link between the UA 402 and the API 412, in which the UA 402 is able to adapt and receive information from the API 412 in various forms, for example, electronic signals, documents, spreadsheets, parameter or configuration files, and programming languages, for example, Java, JavaScript, JSON, Scala, Closure, Swift, XML, CSS, HTML, HTML5, PHP, VBA, C #/C++, Angular.js, SQL, Node.js, Python, Ruby, and parallel processing languages, for example, CUDA, MapReduce, Julia, OpenMP, and other means for software-based information exchange, which may include, for example, artificial intelligence programming languages, audio programming languages, mathematical programming languages, procedural programing languages, metaprogramming languages, and dialect translator programming languages. As the system is bi-directionally linked between the UA 402 and the API 412, the API 412 is intelligently aware of the interface and optimal communication protocol for the UA 402, and therefore, optimizes the transmittal of information to the UA 402 in the optimal data structure format for that receiver, thereby establishing an intelligently-aware communication stream that exchanges and transmits information data in an optimally configured format.

FIG. 4 illustrates the bi-directional communication link between the agent 403 and the API 412, in which the API 412 is able to adapt and receive requests 404 from the agent 403 in various forms, for example, programming code, documents, spreadsheets, parameters, configuration changes, audio signals, digital signals, optical signals, electronic signals. As the system is bi-directionally linked between the agent 403 and the API 412, in which the API 412 is intelligently aware of the interface and optimal communication protocol for which the agent 403 is using for communication, and therefore, can optimize the transmittal of information to the agent 403 in the optimal data structure format for that receiver, thereby establishing an intelligently-aware communication stream that exchanges and transmits information data in an optimally configured format.

FIG. 4 illustrates the bi-directional communication request 404 link between the agent 403 and the agent application (AA) 405, in which the AA 405 is able to adapt and/or receive information from the agent 403 in various forms, for example, documents, spreadsheets, parameters, configuration changes, data commands, fax, email, SMS, electronic signals, digital signals, analog signals, optical signals, voice commands, keyboard type entry, ocular gestures, mouse, body motion gestures, joysticks, and other electronic or software-based devices coupled to the agent 403. As the system is bi-directionally linked between the agent 403 and the AA 405, the AA 405 is intelligently aware of the interface and optimal communication protocols for the agent 403, and therefore may optimize the transmittal of information to the agent 403 in the optimal data structure format for that receiver, thereby establishing an intelligently-aware communication stream that exchanges and transmits information data in an optimally configured format.

FIG. 4 illustrates the bidirectional communication link between the AA 405 and the API 412, in which the AA 405 is able to adapt and receive information from the API 412 in various forms, for example, documents, spreadsheets, parameter and configuration files, and various programming languages, for example, Java, JavaScript, JSON, Scala, Closure, Swift, XML, CSS, HTML, HTML5, PHP, VBA, C #/C++, Angular.js, SQL, Node.js, Python, Ruby, and parallel processing languages, such as, CUDA, MapReduce, Julia, OpenMP, electronic signals, and other means for software-based information exchange, for example, artificial intelligence programming languages, audio programming languages, mathematical programming languages, procedural programing languages, metaprogramming languages, and dialect translator programming languages. As the system is bi-directionally linked between the AA 405 and the API 412, the API 412 is intelligently aware of the interface and optimal communication protocol for the AA 405, and therefore, may optimize the transmittal of information to the AA 405 in the optimal data structure format for that receiver, thereby establishing an intelligently-aware communication stream that exchanges and transmits information data in an optimally configured format.

FIG. 4 illustrates the bi-directional communication link between the external systems (ES) 406 and the API 412, in which the API 412 is able to adapt and/or receive requests 407 from the external systems (ES) 406 in various forms, for example, programming code, documents, spreadsheets, parameters, configuration changes, audio signals, digital signals, optical signals, electronic signals. As the system is bi-directionally linked between the external systems (ES) 406 and the API 412, in which the API 412 is intelligently aware of the interface and optimal communication protocol for which the external systems (ES) 406 is using for communication, and therefore, may optimize the transmittal of information to the external systems 406 in the optimal data structure format for that receiver, thereby establishing an intelligently-aware communication stream that exchanges and transmits information data in an optimally configured format.

FIG. 4 illustrates the bi-directional communication link between the external systems application (ESA) 408 and the API 412, in which the ESA 408 is able to adapt and/or receive information from the API 412 in various forms, for example, documents, spreadsheets, parameter and configuration files, and programming languages, for example, Java, JavaScript, JSON, Scala, Closure, Swift, XML, CSS, HTML, HTML5, PHP, VBA, C #/C++, Angular.js, SQL, Node.js, Python, Ruby, and parallel processing languages, for example, CUDA, MapReduce, Julia, OpenMP, electronic signals, and other means for software-based information exchange, for example, artificial intelligence programming languages, audio programming languages, mathematical programming languages, procedural programing languages, metaprogramming languages, and dialect translator programming languages. As the system is bi-directionally linked between the ESA 408 and the API 412, the API 412 is intelligently aware of the interface and optimal communication protocol for the ESA 408, and therefore, may optimize the transmittal of information to the ESA 408 in the optimal data structure format for that receiver, thereby establishing an intelligently-aware communication stream that exchanges and transmits information data in an optimally configured format.

FIG. 4 illustrates the bi-directional communication link between the completion tools and resources (CT&R) 409 and the API 412. The completion tools and resources (CT&R) 409, which include for example, other computer system, IoT devices, and staff members, which might be relevant sources of information that help get the job done, receive information various forms, for example, programming code, documents, spreadsheets, parameters, configuration changes, audio signals, digital signals, optical signals, electronic signals.

FIG. 4 illustrates the bi-directional communication link between the completion tools and resources application (CTRA) 411 and the API 412, in which the CTRA 411 is able to adapt and/or receive information requests 410 from the API 412 in various forms, for example, documents, spreadsheets, parameter and configuration files, and programming languages, for example, Java, JavaScript, JSON, Scala, Closure, Swift, XML, CSS, HTML, HTML5, PHP, VBA, C #/C++, Angular.js, SQL, Node.js, Python, Ruby, and parallel processing languages, for example, CUDA, MapReduce, Julia, OpenMP, electronic signals, and other means for software-based information exchange, for example, artificial intelligence programming languages, audio programming languages, mathematical programming languages, procedural programing languages, metaprogramming languages, and dialect translator programming languages. As the system is bi-directionally linked between the CTRA 411 and the API 412, the API 412 is intelligently aware of the interface and optimal communication protocol for the CTRA 411, and therefore, may optimize the transmittal of information to the CTRA 411 in the optimal data structure format for that receiver, thereby establishing an intelligently-aware communication stream that exchanges and transmits information data in an optimally configured format.

FIG. 4 illustrates the directional communication link between the external data feed source (EDFS) 414 and the platform 413, in which the platform 413 is able to adapt and/or receive information from the EDFS 414 in various forms, for example, programming code, documents, spreadsheets, parameters, audio signals, digital signals, optical signals, electronic signals, and imagery. As the system is linked between the EDFS 414 and the platform 413, the platform 413 is intelligently aware of the interface and optimal communication protocols for the EDFS 414, and therefore, optimizes the receipt of information in the optimal data structure format from that transmitting source, thereby establishing an intelligently-aware communication stream that exchanges and transmits data in an optimally configured format.

Figure 5:
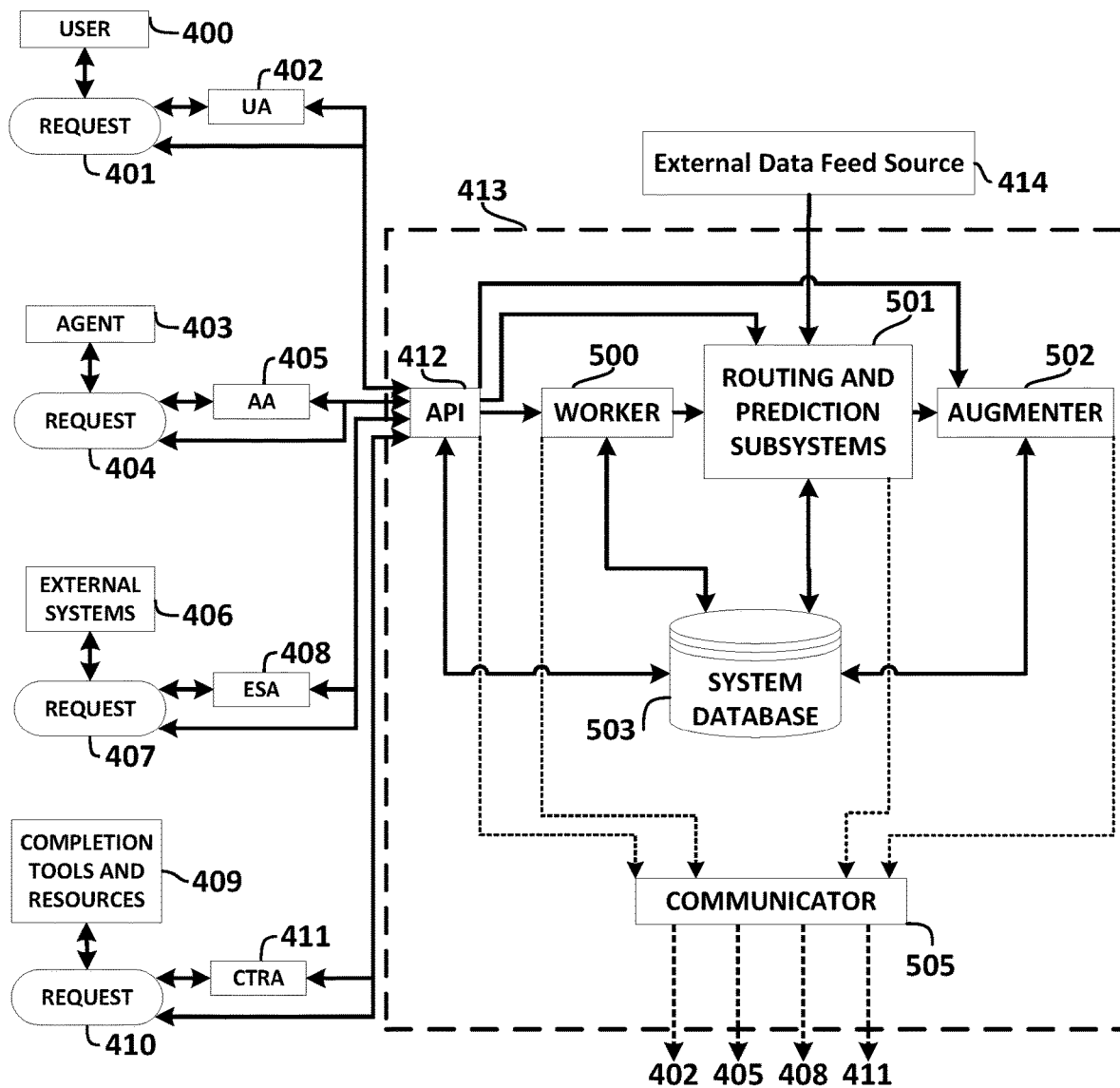
FIG. 5 illustrates an example of a system architecture of the main software and computational platform system.

FIG. 5 is an illustration of an example method for integration of the communication requests by the user 400, agent 403, external systems 406, and/or completion tools and resources 409 with the platform system 413. With a request (401 404 407 410) made from a user 400, an agent 403, external systems 406, and completion tools and resources 409, respectively, through the API 412, the requests are then distributed to three main micro-services, a worker 500, a routing subsystem 501, and an augmenter 502. Some examples of the connections include one embodiment in which the API 412 commands can go from the API 412 to worker 500, from worker 500 to routing subsystem 501 to database 503, from the API 412 to worker 500 to routing subsystem 501 to database 503, from the API 412 to database 503, from the API to routing subsystem 501, and from the API 412 to worker 500 to database 503. In another embodiment an indirect connection is also made to a communicator 505 in charge of handling the coordination of micro-services task queues and outbound communication to the user application 402, customer applications 405, external system applications 408, or completion tool and resources applications 411. In another embodiment, the worker 500 is tasked with receiving the request and preforming preprocessing tasks on the data, for example, cleaning and formatting information, standardizing parameters and units of measure. In another embodiment, the routing subsystem 501 performs computational analysis through a programmatic structured problem solving approach, while under the influence of external data sources 414, and is capable of learning. In another embodiment, the augmenter 502 performs tasks, for example, summing up total number of routes, total number of waypoints, total distance, total time, and total cost. In another embodiment, the transactions of the micro-services 501, 502 and 503 and the API 412 are stored in a database system 503. In another embodiment, the communicator 505 receives instructions and manages task processing queues between workers, and sends progress updates to the user application 402, agent application 405, external systems application 408, and completion tools and resources applications 411. In another embodiment, the permutations and combinations of the preceding embodiments can function together in various configurations.

The routing and prediction subsystems 501 can include additional various capabilities to augment the platform 413, for example: 1) constrained optimization, which defines rules that must be obeyed in the sequencing of routes, for example, a delivery to Point C must always occur prior to delivery to Point B, or delivery time-window at point A cannot exceed 15 minutes; 2) dynamic improvements, which could model the current conditions and model hypothetical conditions of various scenarios, for example, simulating the effect of a potential delay during a delivery, or simulating the impact of time-delay associated with refueling; 3) allow waiting, which defines the ability for a driver to wait before delivering or go elsewhere and come back; 4) machine learning for tuning, which defines a method for training the platform to make better choices based on training and validation of test data through computational analysis; and/ or 5) scheduling calls to initiate the dynamic route improvement to provide an opportunity to meaningfully improve the route, for example, when a delivery is completed, successfully or otherwise, when the driver is moving slowly, suggesting a delivery in progress or that the vehicle is stuck in traffic, when city level traffic changes, on a specific time duration, and/or the ability for scheduled calls to schedule subsequent scheduled calls for dynamic route improvement.

Figure 6:
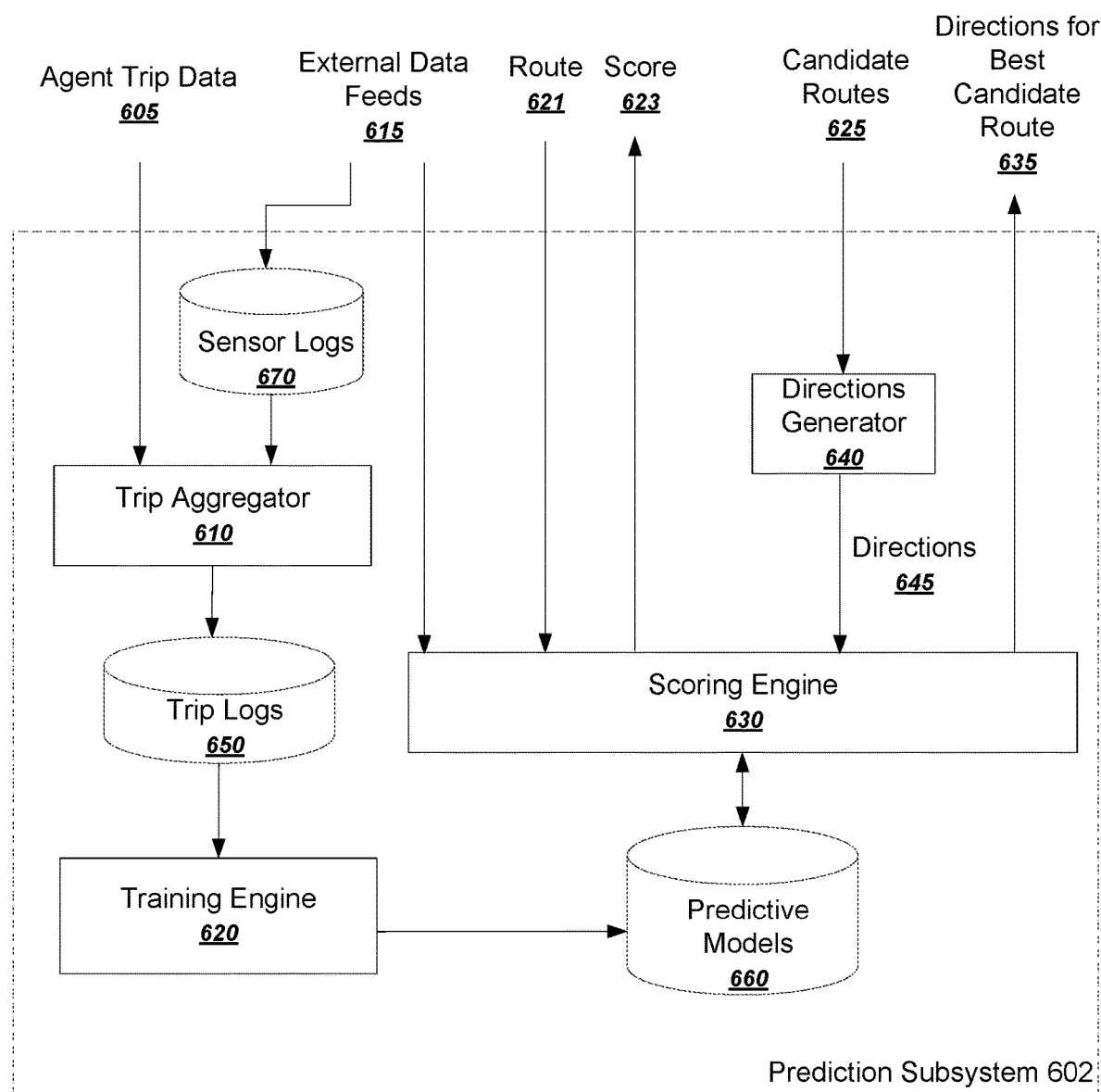
FIG. 6 is a diagram of an example prediction subsystem.

FIG. 6 is a diagram of an example prediction subsystem 602. The prediction subsystem 602 can build a predictive model using previous trip data in order to evaluate candidate routes using present readings of system sensors.

The prediction subsystem 602 includes a trip aggregator 610, a training engine 620, a scoring 630 engine, and a directions generator 640. These components of the prediction subsystem 602 can be implemented as computer programs installed on one or more computers in one or more locations that are coupled to each other through a network.

The prediction subsystem 602 can make predictions about candidate routes using previously recorded trip information. As described above, a trip is a data element representing one or more features of an agent's actual travel to one or more waypoints of a route.

The agent trip data 605 includes information associated with agents conducting trips. The agent trip data 605 can include information provided by the agents themselves, including whether or not a task at a particular waypoint was completed successfully, whether there was a problem with a customer of a task at a particular waypoint, whether there were other problems with the trip, or any other information relating to the trip. The agent trip data 605 can also include information about specific or general directions that the agent was given by the platform system about how to complete a particular route.

The external data feeds 615 include values from various sensors in communication with the prediction subsystem 602. These values can include, for example, traffic conditions on various road segments at particular times, weather conditions in particular geographic areas, telemetry data describing how an agent traversed a route, to name just a few examples.

The sensors supplying data for the external data feeds 615 can be referred to collectively as a sensor network. A more comprehensive description of sensors that can be included in a sensor network as well as corresponding information that can be provided by the sensor network as the external data feeds 615 is described in more detail below with reference to FIGS. 14-21. The external data feeds 615 can also include information gathered from other sources, for example, information reported by agents, e.g., that it is currently raining; information obtained from online sources, e.g., microblog messages; or any other appropriate information.

The prediction system 602 can continually receive the external data feeds and store the received values in sensor logs 670. Generally, the sensor logs 670 record a sequence of measurements from each sensor in the sensor network, which may be time synchronized. For example, the system can record one value from each sensor for each hour of each day.

A trip aggregator 610 can aggregate agent trip data 610 and sensor values from the sensor logs 670 and stores the result in the trip logs 660. For example, the trip aggregator 610 can associate information provided by an agent with corresponding values from the external data feeds 615. The trip aggregator 610 can then store and index the information in the trip logs 650.

A training engine 620 can read information in the trip logs 650 and generate one or more predictive models 660. To do so, the training engine 620 first generates training data by converting the data in the trip logs 650 into one or more features for the model 660. Each training example for the training data has one or more features derived from the trip logs 650 along with a dependent variable for the model. The dependent variable can be any appropriate value to be predicted, e.g., a total score for a particular route, a predicted sensor value for a particular time period, a predicted score for a waypoint, or a predicted score for a path. For example, the score can be a measure of the benefit of visiting waypoints on the route compared to the cost for traveling to those waypoints.

The training engine 620 can use any appropriate model, e.g., supervised or unsupervised machine learning models including classification models that classify routes as advantageous or not or regression models that assign a score to a particular model, e.g., Naïve Bayes, Support Vector Clustering (SVC), Ensemble Classifiers, Kernel Approximation, Stochastic Gradient Boosting (SGB) regression, Lasso, SVC (kernel='rbf'), Ensemble Repressor's, Randomized Principle Component Analysis (PCA), Isomap, Spectral Embedding, Local Linear Embedding (LLE), Meanshift, Variational Bayesian Gaussian Mixture Model (VBGMM), MiniBatch, KMeans, Spectral Clustering, Gaussian Mixture Models (GMM), a support vector machine, a neural network, or a reinforcement learning model, to name just a few examples. In some implementations, the system 602 can use models having preprogrammed parameter values rather than training models from scratch. For example, the system can use a preprogrammed model that specifies that routes take 30% longer to complete in the rain.

After generating the route scoring model 660, the prediction subsystem 602 can use the route scoring model 660 to rank candidate routes.

The system can use the scoring engine 630 to generate scores using objective functions that may use real-time data from the sensor network. For example, the scoring engine 630 can receive a route 621 and access per-waypoint prediction data for the route. The scoring engine 630 can then compute a score 623 for the route 621 using a predictive model for the route, for each waypoint, or some combination of these.

The scoring engine 160 can also generate scores by generating travel directions for candidate routes6 625. For example, the candidate routes 625 can be those routes generated by the routing subsystem described above with reference to FIG. 9. A directions generator 640 uses the sequence of waypoints for each route to generate travel directions 645 for completing the route. In some implementations, the directions generator 640 generates multiple alternative sets of directions 645 for each candidate route The directions 645 represent how an agent should travel to the waypoints on a route, e.g., where to turn, what streets to take, and what exits to take. The directions 645 can also represent other information related to how an agent should complete a task at a particular waypoint, e.g., where to park, where to unload, and where to load.

The directions 645 thus represent explicitly or implicitly paths between waypoints. A path is data the specifies how an agent will travel between two or more waypoints. For example, if the agent is operating a truck, a path can specify one or more streets or roads on which the agent should drive the truck to travel from a first waypoint to one or more other waypoints.

The prediction subsystem 602 can make predictions about entire routes as well as predictions about discrete portions of a route. In particular, the prediction subsystem 602 can make discrete predictions about waypoints and paths. For example, the prediction subsystem 602 can make waypoint-specific predictions about tasks to be completed at waypoints on the route, e.g., the likelihood that a particular task will be successful if attempted within a particular time window. The prediction subsystem 602 can also make path-specific predictions about an expected duration for an agent to travel a path between waypoints under particular conditions, e.g., a number of minutes to travel the path during a particular time window given particular weather conditions.

The scoring engine 630 can receive data from the external data feeds 615 and the directions 645 generated for a candidate route 625. The scoring engine 630 can use the route scoring model 660 to generate a score for the route that represents a prediction for using the directions 645 to complete the route. In some implementations, the score represents a predicted measure of success based on the training data generated from the trip logs. The predicted measure of success can represent factors including predictions for efficiency, time, successful or failed tasks, costs, benefits, or other problems, to name just a few examples.

The scoring engine 630 can then rank all of the candidate routes 625 according to the predicted score for each route. The scoring engine 630 can then provide directions for the best candidate route 635, which represents travel directions for the best route of the candidate routes 625.

Figure 7:
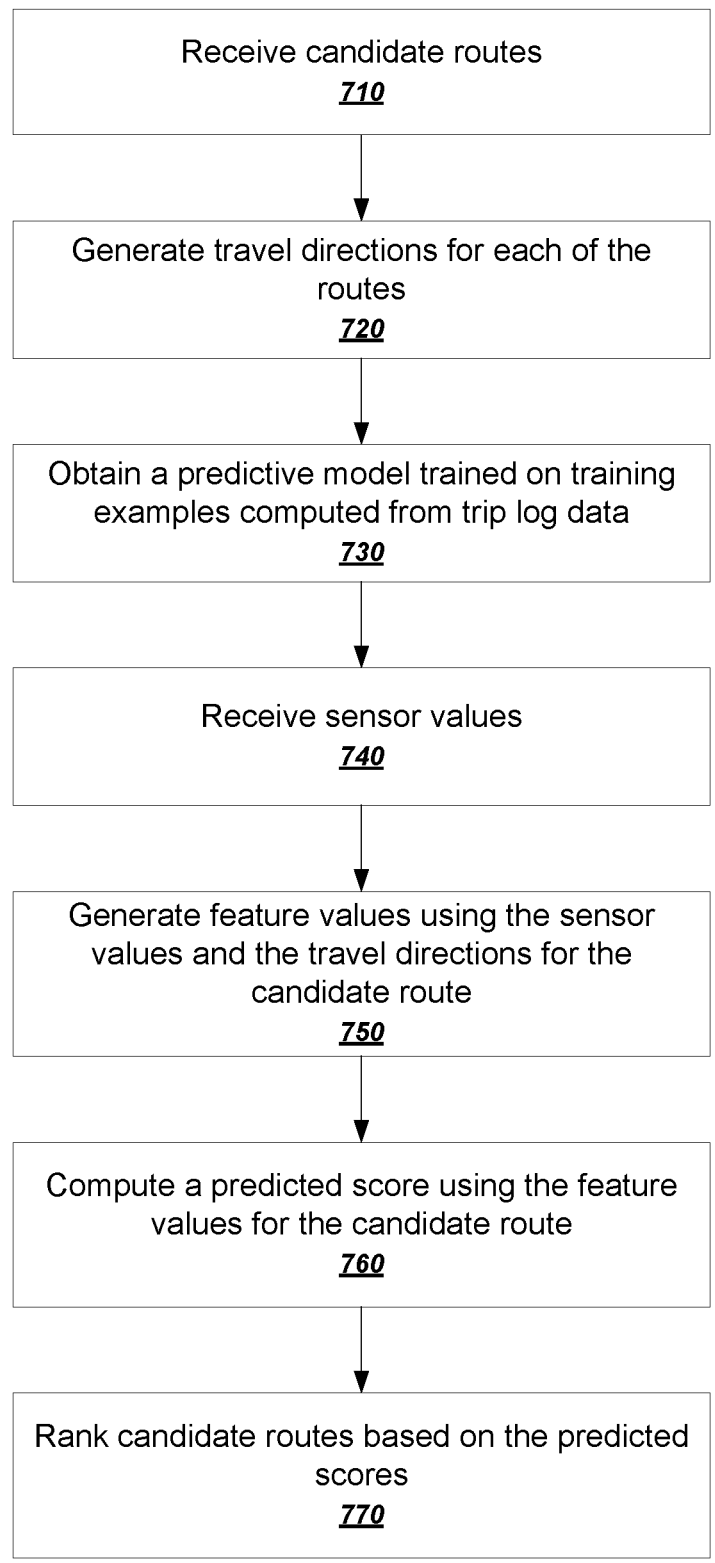
FIG. 7 is a flow chart of an example process for scoring candidate routes using one or more predictive models.

FIG. 7 is a flow chart of an example process for scoring candidate routes using one or more predictive models. The example process can be performed by an appropriately programmed system of one or more computers, e.g., the prediction subsystem of FIG. 6. The process will be described as being performed by a system of one or more computers.

The system receives candidate routes (710). As described above, each route assigns a sequence to a group of waypoints. Each waypoint implicitly or explicitly represents a task to be performed by an agent at or near the geographic location of the waypoint.

The system generates travel directions for each of the routes (720). The system can use any appropriate procedure or external service for generating travel directions for a particular route. For example, the system can use Google Maps provided by Google Inc. or OpenStreetMap provided by the OpenStreetMap Foundation.

The system obtains a predictive model trained on training examples computed from trip log data (730). As described above, the trip log data stores for each trip a plurality of features. Each of the features can be data input by an agent or obtained from an external data feed. Each training example also includes the value of a dependent variable that is predicted by the model, e.g., waypoint-specific or path-specific dependent variables.

The system receives sensor values (740). As described above, the system can use a sensor network to obtain external data feeds. The system can obtain current values or the most-recently available values from the sensor network. Example sensors that are part of the sensor network are described in more detail below with reference to FIGS. 5-12.

Alternatively or in addition, the system can use predicted sensor values obtained from predictive models or obtained from other sources. For example, the system can generate a predictive model that predicts rainfall for a particular time period. This predictive model can be used, e.g., when other external data sources are unavailable, e.g., external weather data services.

The system generates, for each candidate route, feature values using the sensor values from the one or more external data feed sources and the travel directions for the candidate route (750). In some cases the system reformats the values received from the sensors to be values in the same domain that was used to train the predictive model.

The system computes, for each candidate route, a predicted score using the feature values for the candidate route (760). The system can compute the predicted score by using an output of one or more predictive models.

As one example, the dependent variable of the predictive model is an aggregate success value that represents how successful the trip was as a whole. Thus, given a set of features of the candidate route and the sensor network, the predictive model generates a score that represents a prediction for how successful the trip will be as a whole.

To train a model to predict an aggregate success value, the system can compute an aggregate success value for each trip in the trip logs. For example, the trip data can include benefit and cost information for each trip. Trip costs can include fuel costs, estimated vehicle wear costs, time costs, agent-related costs, redelivery costs, or storage costs, to name just a few examples. Trip benefits can include indicators of whether or not tasks at particular waypoints were successful or unsuccessful, e.g., whether a delivery was successfully made. The system can then compute for each trip in the trip logs, an aggregate success value by summing the benefits and subtracting the sum of the costs.

As another example, the predictive model can generate waypoint-specific predictions, e.g., a predicted score for each waypoint of a route. To train a model to make a waypoint-specific prediction, the system can compute a value of the dependent variable that represents the success, failure, costs, benefits, or some combination thereof, for each waypoint.

As another example, the predictive model can generate path-specific predictions, e.g., an expected duration for each path between two or more waypoints. To train a model to make a path-specific prediction, the system can compute a value of the dependent variable that represents the duration, length, or cost, for each path of a route.

To provide a concrete example of a path-specific prediction, the system can use the predictive model to determine that some drivers and some vehicles perform better on some streets than other drivers and vehicles. To do so, the system can define the dependent variable as some measure of performance on a path, e.g., fuel used, duration, and so on. The system can then generate features of a plurality of paths in trip logs, e.g., length, number of turns, altitude gain, altitude loss, neighborhood, to name just a few examples. The system can also generate features for agents that have driven those paths, e.g., years of experience, experience in hilly regions, experience in particular areas or neighborhoods, which the system can extract from the trip logs or obtain from another source. The system can then train a predictive model by generating training examples from the trip data that each include values for the path features and the agent features as well as a performance value as the dependent variable. Then, the system can make future predictions for other agents and other paths, even for agents and paths that have not yet been used. Thus, for two different drivers, the system can predict different measures of performance for the exact same path.

In addition or in the alternative, the system can also use vehicle-specific features. Thus, for two different vehicles, the system can predict different measures of performance for the exact same path.

In addition or in the alternative, the system can also use passageway-related features, weather-related features, geopolitical-related features, or any other features described below, to predict performance on a particular path. For example, some of these features can be provided by a sensor network, e.g., as described below with reference to FIGS. 5-11.

In some implementations, the system combines multiple outputs of potentially multiple predictive models to compute the predicted score for the candidate route. For example, the system can compute a waypoint-specific prediction for each waypoint on the candidate route and combine all of the waypoint-specific predictions, e.g., by computing a sum or other function of the waypoint-specific predictions. The system can similarly compute a path-specific prediction for each path on the candidate route and combine all of the path-specific predictions, e.g., by computing a sum or other function of the path-specific predictions. The system can also combine all path-specific and waypoint-specific predictions into a single prediction score.

The system ranks the candidate routes based on the predicted score for each candidate route (1470). The system can then provide a highest-ranked candidate route, travel directions for the highest-ranked candidate route, or both in response to receiving the plurality of candidate routes.

Figure 8:
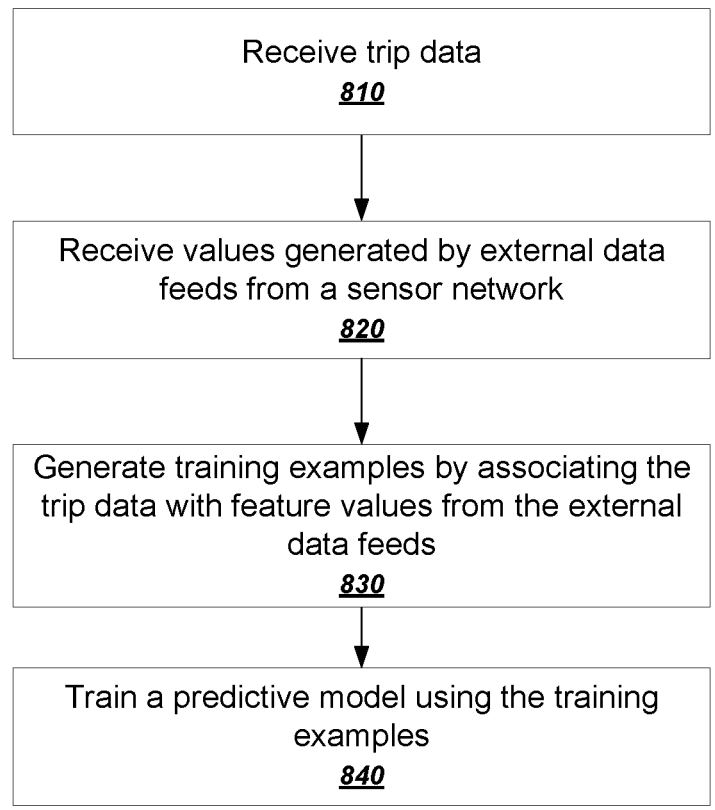
FIG. 8 is a flow chart of an example process for training a predictive model for scoring candidate routes using a sensor network

FIG. 8 is a flow chart of an example process for training a predictive model for scoring candidate routes using a sensor network. The example process can be performed by an appropriately programmed system of one or more computers, e.g., the prediction subsystem of FIG. 6. The process will be described as being performed by a system of one or more computers.

The system receives trip data (810). As described above, the trip data represents how an agent actually traveled to a plurality of waypoints and can include information about whether or not a task at each waypoint was successfully completed. The trip data can also include a cost, a benefit, or both of completing or not completing a particular task at each waypoint.

The system receives values generated by one or more external data feeds from a sensor network (820). This data can be obtained from sensor logs that store a sequence of sensor values.

The system generates training examples by associating the trip data with feature values from the external data feeds (830). In other words, the system determines for each portion of a trip, which values from the sensor network to associate with the trip data. For example, if on a particular day it was rainy in the morning but sunny in the afternoon, for a trip that occurred in the morning, the system will store a feature value that indicates rain, and for a trip that occurred in the afternoon, the system will store a feature value that indicates sun.

The system can also derive some feature values from the trip data. As one example, for a particular path a system can compute a net altitude gain or loss by obtaining a first reading from a vehicle altitude sensor as the vehicle started traveling the path and a second reading from the vehicle altitude sensor as the vehicle ended the path. The system can then use the net altitude gain as a feature value for the path.

The system can also compute an appropriate value for a dependent variable for each training example, as described above. What the dependent variable represents depends on the type of predictive model being trained. For example, the dependent variable for a path-specific predictive model can represent a performance metric for an agent on a path, while the dependent variable for a waypoint-specific predictive model can represent a measure of success or failure for completing a task at a waypoint.

The system trains a predictive model using the training examples (840). As described above, the system can use any appropriate machine learning techniques to train a predictive model from the training examples.

Figure 9:
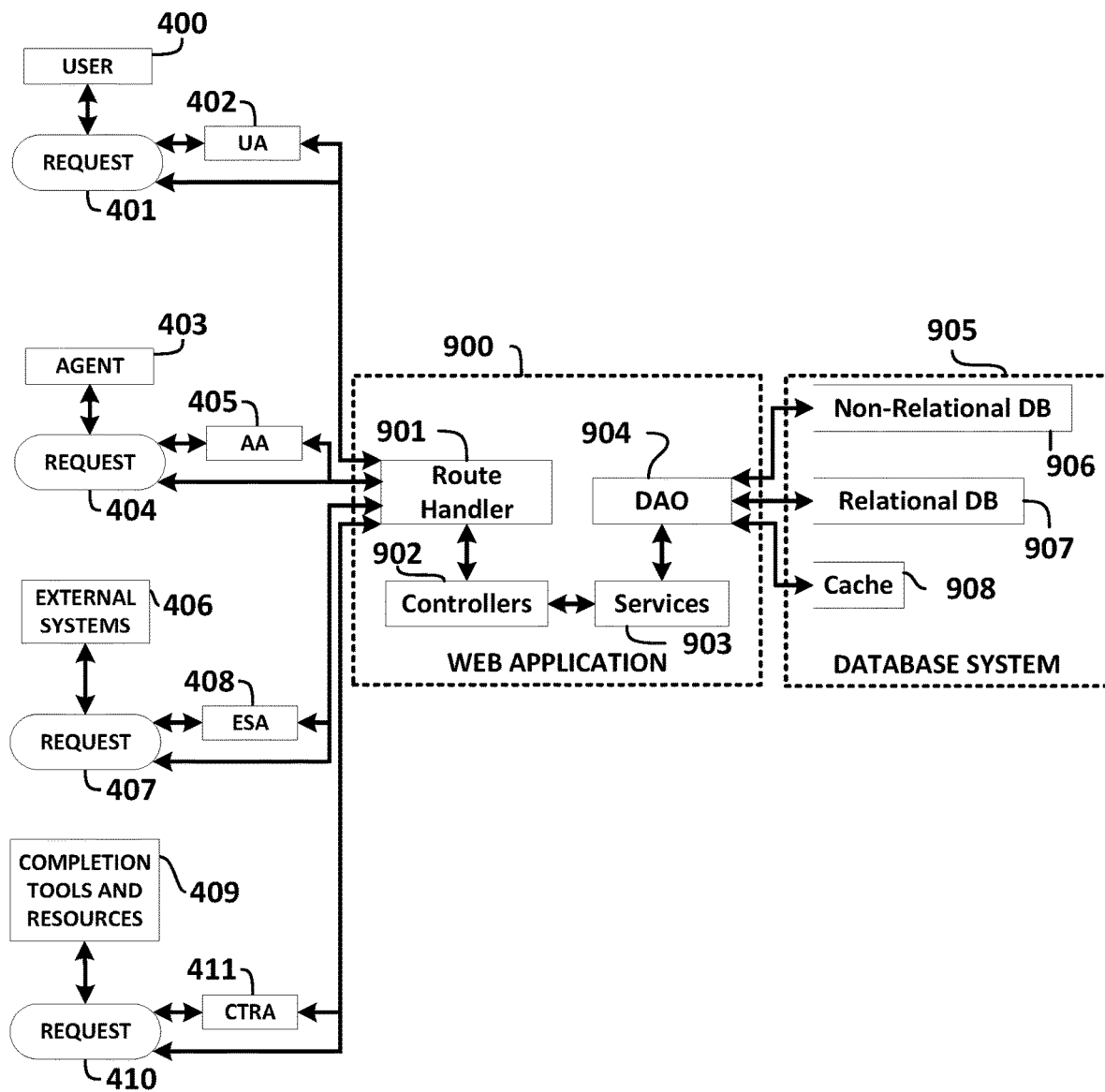
FIG. 9 illustrates an example of a web application system and the corresponding services that operate to record, monitor, trigger, queue, control, compute, communicate, and/or report transaction-based information, through interaction with various database systems.

FIG. 9 illustrates an example relationship between user 400, user application 402, agent 403, agent application 405, external systems 406, external system application 408, completion tool and resources 409, completion tool and resources application 411, the web application system 900 and the database system 905. The user 400, agent 403, external systems 406, or a completion tools and resources 409 initiate a request command, either directly or through the UA 402, AA 405, ESA 408, CTRA 411, to the route handler 901, which is responsible for making a connection to the system controllers 902. The route handler communicates with the controller 902 which performs functions for example, performing error checking, coordination of tasks to be performed, determining the modules to serialize, which in turn communicates to the services 903, which contains processes for example, waypoint management, user management, route management, audit log, response logging, system parameters tracking, and tracking transaction identification. The services 903 communicate with a Database Object (DAO) 904 responsible for the interface to the database system 905, consisting of any of three possible three database types, for example, a non-relational type 906, a relational type 907, and cache 908.

Figure 10:
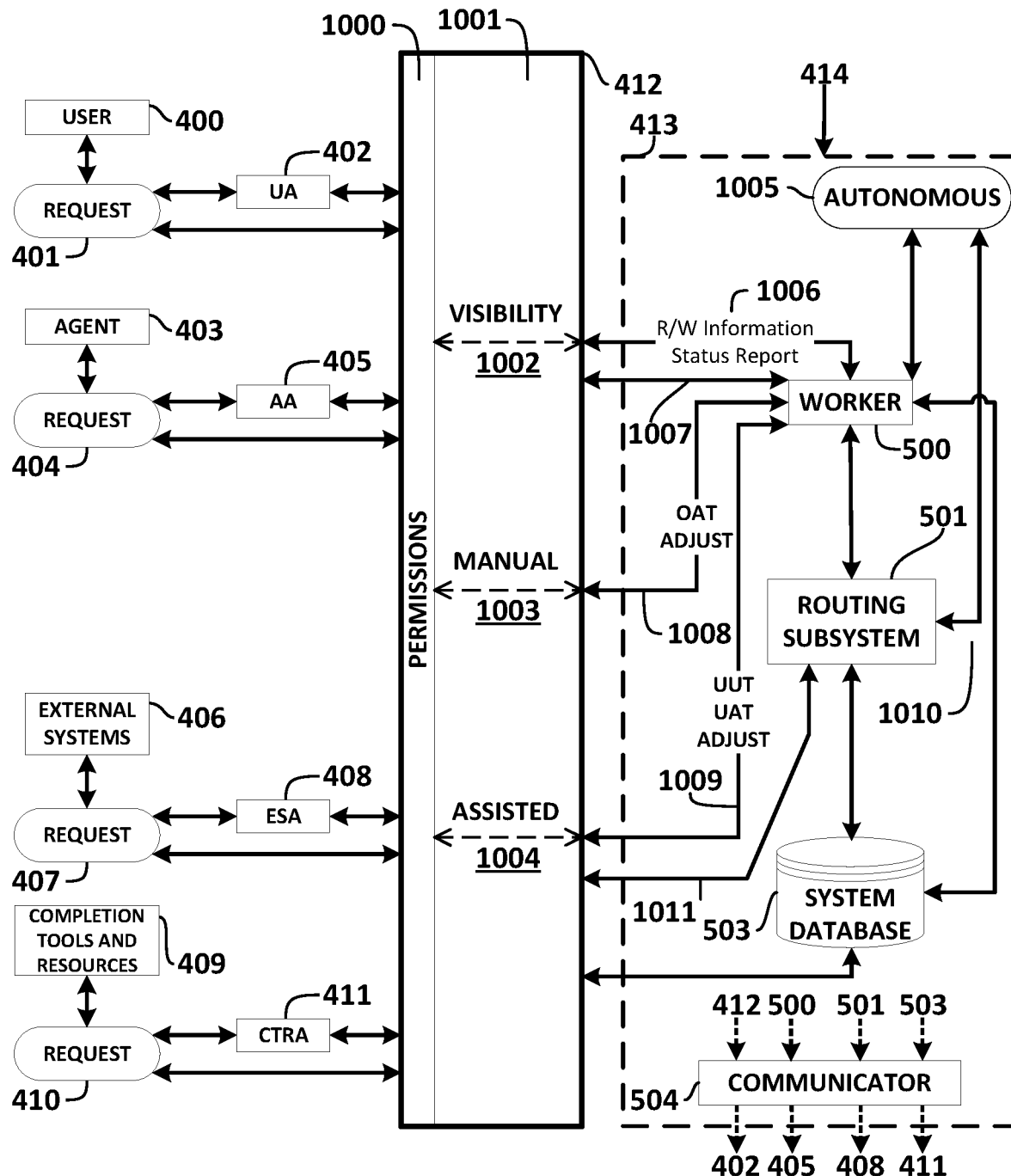
FIG. 10 illustrates an example of passing requests by the user, agents, external systems, and completion tools and resources through the system API to the system platform.

FIG. 10 illustrates an example of the integration of the communication requests by the user 400, user application 402, agent 403, agent application 405, external systems 406, external systems application 408, completion tools and resources 409, and the completion tools and resources application 411, with the API 412, which has may have several layers, for example, a permissions or security layer 1000, and 1001, with the corresponding communication with the platform system 413.

One such layer in the API 412 is a permissions layer 1000 which authenticates requests, both in-bound and out-bound. The permissions layer 1000 handles authentication which can be performed by means for example, token keys, passwords, biometrics, IP address, MAC address, and behavioral patterns. Another layer of the API 412 is a request processing layer 1001 that handles the various types of requests, for example: 1) visibility type requests 1002, intended for information aggregation and sharing by reading status reports and writing information; 2) manual type of requests 1003, intended for manual task creation and adjustment and by handling requests that contain ordered and assigned tasks (OAT) or other adjustment-based requests; and 3) assisted types of requests 1004, intended for assisted task creation & adjustment, which handles unordered unassigned tasks (UUT), unordered assigned tasks (UAT), or other adjustment-based requests. The permissions layer 1000 and the request process layer 1001 are programmatically inter-linked to ensure bi-directional privacy, encryption, security, and optimal processing of requests through the API 412.

Still referring to FIG. 10, and as described in FIG. 4, the user requests 401 are submitted to the API 412 directly from a user 400 or through an interface user application 402, the agent requests 404 are submitted to the API 412 directly from an agent 403 or through an interface agent application 405, the external system requests 407 are submitted to the API 412 directly from external systems 406 or through an interface external systems application 408, the completion tools and resources requests 410 are submitted to the API 412 directly from a completion tools and resources 409 or through an interface completion tool and resources application 411.

Still referring to the FIG. 10, within the API 412, the requests from the user 400, agent 403, external systems 406, or completion tools and resources 409, make directly or the in-directly through the respective interface applications (402, 405, 408, 411), are passed to the permissions layer 1001 of the API 412 which handles the authentication and passing the authenticated request to the appropriate processing handler in the request processing layer 1001. The request processing layer 1001 handles the visibility, manual, or assisted type of request and direct through request, programmatically, to the appropriate services within the platform 413.

Still referring to FIG. 10, the visibility type of requests initiates read or write of information 1006, such as status reports, adjusting routes, monitoring progress, completing records, viewing records, appending information, deleting information, editing information, amending information, getting an update, generating a report, looking up information, searching, polling, or otherwise reading or writing execute type information, or updating parameter information 1006 to the worker 500. The manual type requests 1003 initiates the communication with the worker 500 for OAT and adjustment requests 1008. The assisted type of requests 1004 initiates the UUT, UAT, and adjust communication 1009 with the worker 500. The API 412 can communicate directly 1007 with the worker 500, passing relevant information. Additionally, the autonomous 1005 requests, which intends to handle autonomous task creation and adjustment, communicates these task create requests to the worker 500. The autonomous services 1005 is a time-sensitive process that is running in the background, capable of flagging relevant changes and performing immediate changes to the route based on the current requirement, at that moment in time. Additionally, the autonomous services 1005 is consistently learning from the accuracy of previous decisions and recommendation to improve the subsequent accuracy, and therefore, a form of Artificial Intelligence (AI), in that it is consistently monitoring, thinking, learning about the routes.

Still referring to FIG. 10, a worker 500 can receive various types of task creation requests, for example, visibility requests 1002 to process tasks for read/write of information 1006, manual requests 1003 to process ordered assigned tasks (OAT) and adjustments tasks 1008, assisted requests 1004 to process unordered unassigned tasks (UUT), unordered assigned tasks (UUT), and adjustments tasks 1009, direct API 412 task processing assignment, and autonomous 1005 tasks, and the worker 500 communicates the task request processing to the routing subsystem 501. The routing subsystem 501 can receive communication triggers to initiate analysis from several sources, including, for example, the autonomous services 1005 running in the background can trigger analysis requests in real-time and provides dynamic feedback on accuracy and recommendation improvements for self-learning augmentation 1010, for example, to update, augment, infer, attribute, forecast, update, predict, optimize, calibrate, organize, summarize, translate, instruct, assimilate, digest, examine, detect, realize, and other learning. Additionally, the routing subsystem 501 can receive communication triggers from the API 412 directly 1011 or the worker 500. The self-learning augmentation 1010, allows the system to augment and expand the knowledge-base for decision making through iterative learning, by creating a dynamic loop mechanism which directs all the prior knowledge back into the planning 316, execution 317, and learning 318 modules, thereby developing an intelligently aware system that is capable of self-augmentation, and therein creating a dynamic artificial intelligence learning and knowledge-based platform that utilizes external forces 414 to drive optimal solutions. The routing subsystem 501 communicates bi-directionally with the database 503 by reading and writing results. The system database 503 receives (in-bound information writing) and provides (out-bound information reading) results to the API 412, routing subsystem 501, autonomous services 1005. The communicator 504 receives in-bound signals from API 412, worker 500, routing subsystem 501, and system database 503 and sends the signals out-bound to the user application 402, agent application 405, external systems application 408, or completion tools and resources application 411. The entire platform 413 is under the influence of the external data source feed 414, which provides inputs of various types of information that can be used by the platform components to augment and perform more accurate analysis, recommendations, and learning.

Figure 11:
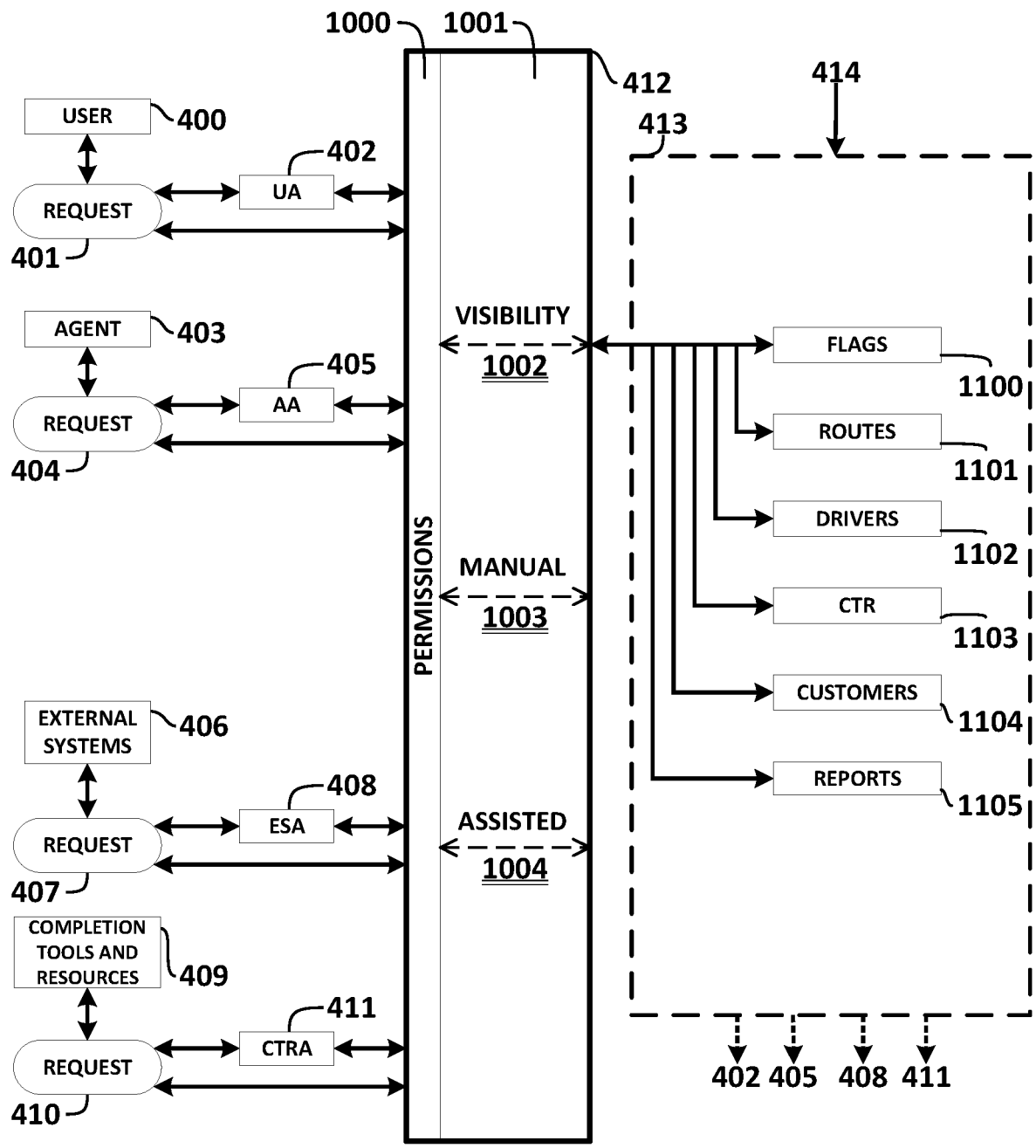
FIG. 11 illustrates an example of passing visibility type of requests by the user, agents, external systems, and completion tools and resources through the system API to the system platform.

FIG. 11 illustrates an example integration of the communication requests by the user 400, user application 402, agent 403, agent application 405, external systems 406, external systems application 408, completion tools and resources 409, and the completion tools and resources application 411, the API 412, and with the platform processes that occur as a result of the visibility type requests 1002 through the API 712.

The visibility requests 1002 handles various types of read or write request of information, for example, flagging of results 1100 which may be useful for the autonomous services 1005 to notice, updates on the routes 1101, information on the drivers 1102, various information about completion tools and resources (CT&R) 1103 that help complete a job, information about customers 1104, and other various type of reports 1105, which can include operational, financial, and technical information.

The entire platform 413 is under the influence of the external data source feed 414 which inputs various types of information that can be used by the platform 413 components to augment and perform more accurate analysis, recommendations, and learning. The platform 413 is able to communicate updated information to the user application 402, agent application 405, external systems application 408, or completion tools and resources application 411.

Figure 12:
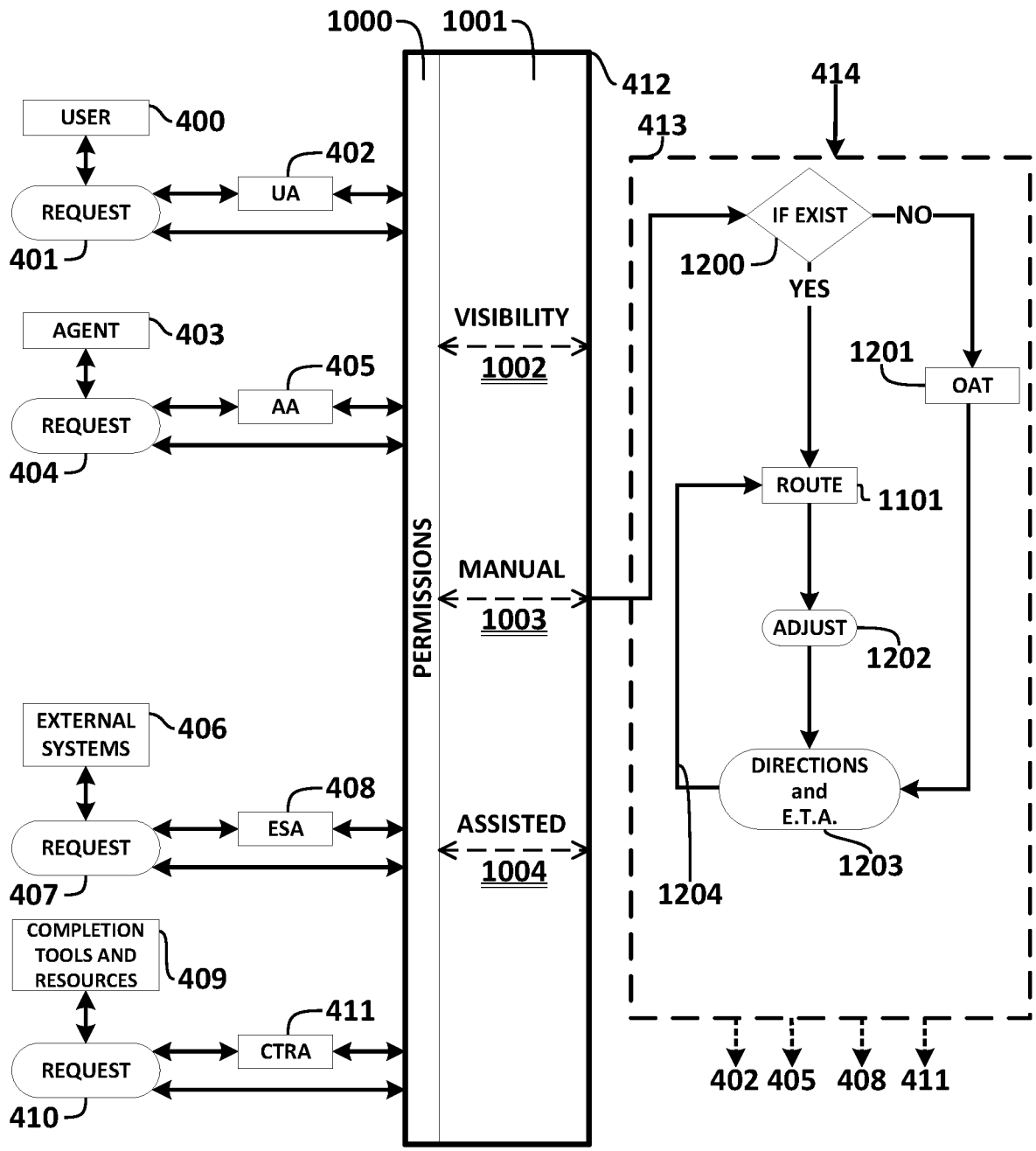
FIG. 12 illustrates an example of passing manual type of requests by user, agents, external systems, and completion tools and resources through the system API to the system platform.

FIG. 12 illustrates an example of the integration of the communication requests by the user 400, user application 402, agent 403, agent application 405, external systems 406, external systems application 408, completion tools and resources 409, and the completion tools and resources application 411, the API 412, and with the platform 413 processes that occur as a result of the manual type requests 1003 through the API 712.

The manual requests 1003 are handled in the platform 413 by starting with a decision 1200, of whether the travel directions for a route 1801 already exist or not. If the travel directions exist, (i.e., yes), than the travel directions for the route 1801 may be manually adjusted 1202, which leads to the presentation of the directions and estimated time of arrive (E.T.A.) 1203 back the requestor through the API 412. However, at the decision node 1200, if the travel directions for the route 801 do not exist (i.e., no), then the platform 413 initiates the tasking sequence of the ordered and assigned tasks 1201, and then generate directions and estimated time of arrival 1203, which can iteratively feedback to present the route.

The entire platform 413 is under the influence of the external data source feed 414 which inputs various types of information that can be used by the platform components to augment and perform more accurate analysis, recommendations, and learning. The platform 413 is able to communicate updated information to the user application 402, agent application 405, external systems application 408, or completion tools and resources application 411.

In one example embodiment, the process for scheduling involves passing a request through the sequence of the route 1101, adjust 1202, and directions and E.T.A., and then back to route 1101. In another example embodiment, the route 1101 is presented, then adjusted 1202 and the directions and E.T.A. are determined, and then presented, via 402, 405, 408, and/or 411. In both example embodiments described, the corresponding receiver can invoke various forms of consideration and actions, for example, accept, deny, change, confirm, or perform another task associated with the information.

Figure 13:
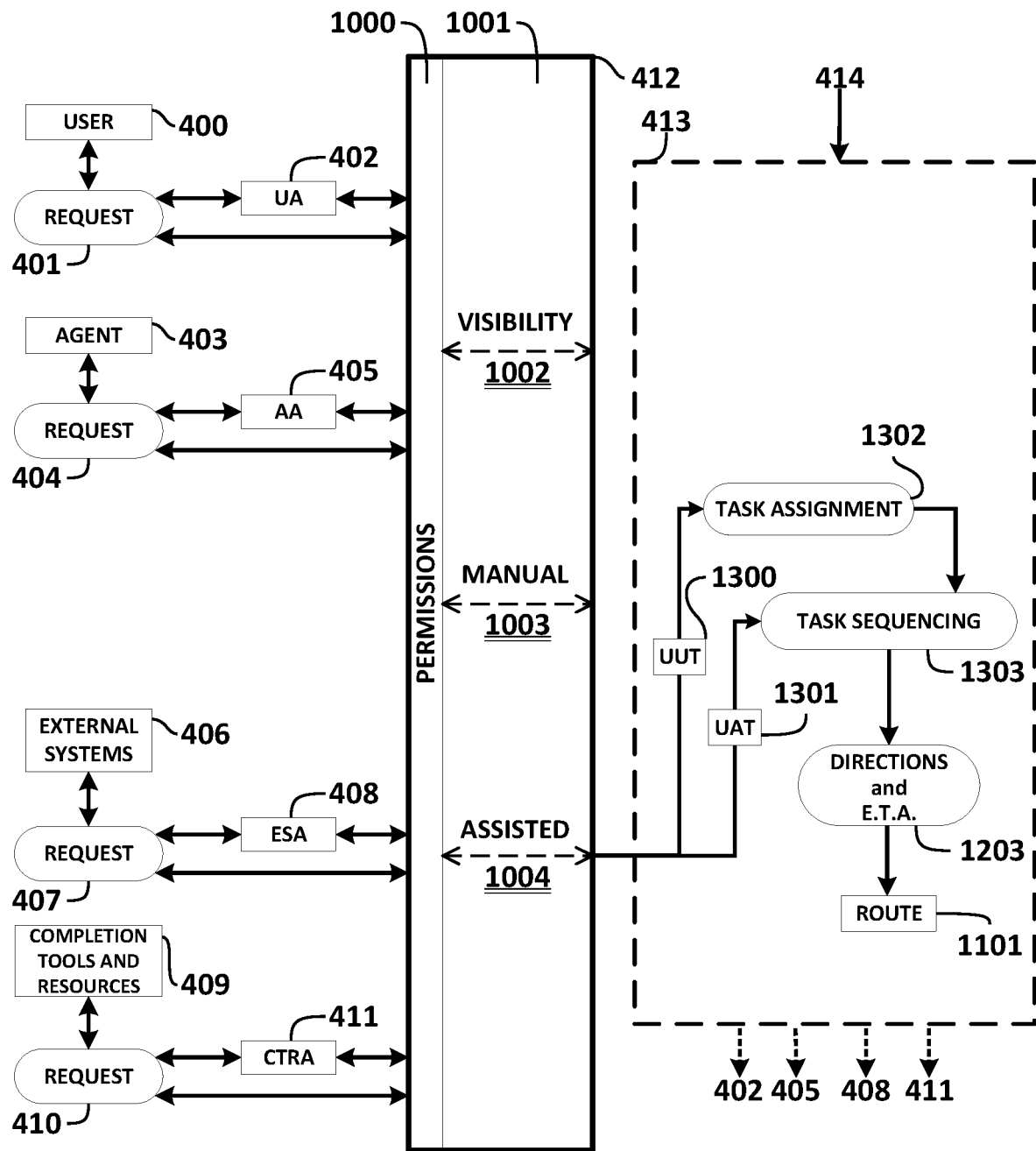
FIG. 13 illustrates an example of passing assisted type of requests by the user, agents, external systems, and completion tools and resources through the system API to the system platform.

FIG. 13 illustrates an example of an integration of the communication requests by the user 400, user application 402, agent 403, agent application 405, external systems 406, external systems application 408, completion tools and resources 409, and the completion tools and resources application 411, the API 412, and with the platform processes that occur as a result of the assisted type requests 1004 through the API 1012.

The assisted type of requests are handled by passing the unorganized unassigned tasks (UUT) 1300 requests from the API 412, and leads to a process that is responsible for task assignment 1302, which then leads to task sequencing 1303, and then to generating the directions and the estimated time of arrival (E.T.A.) 1203, which leads to the definition of the route 1101. The task assignment 1302 is the process by which the system decides, establishes, and makes commitments as to which tasks to assign to which agents, completion tools, and others, with the intent of delegating the effort to the most appropriate resource for completing the task. Additionally, the assisted type of request can handle the requests for the unorganized assigned tasks (UAT) 1301, leads to a process that is responsible for task sequencing 1303, and then generating directions and the estimated time of arrival (E.T.A.) 1203, which leads to the definition of the route 1101. The task sequencing 1303 is the process by which the system performs an ordering of the tasks, for example, generating the optimal sequence of the tasks, using computational methods, for example, indexing, clustering, partitioning, allocating, dividing, multiplying, adding, cleaving, subtracting, enumerating, algorithms, and other quantitative and qualitative methods, that can include, but not limited, to natural language processing, image processing, heuristics, deterministic and stochastic approaches, with the intended purpose to establish the optimal sequence for completing the tasks.

The entire platform 413 is under the influence of the external data source feed 414 which inputs various types of information that can be used by the platform 413 components to augment and perform more accurate analysis, recommendations, and learning. The platform 413 is able to communicate updated information to the user application 402, agent application 405, external systems application 408, or completion tools and resources application 411.

Figure 14:
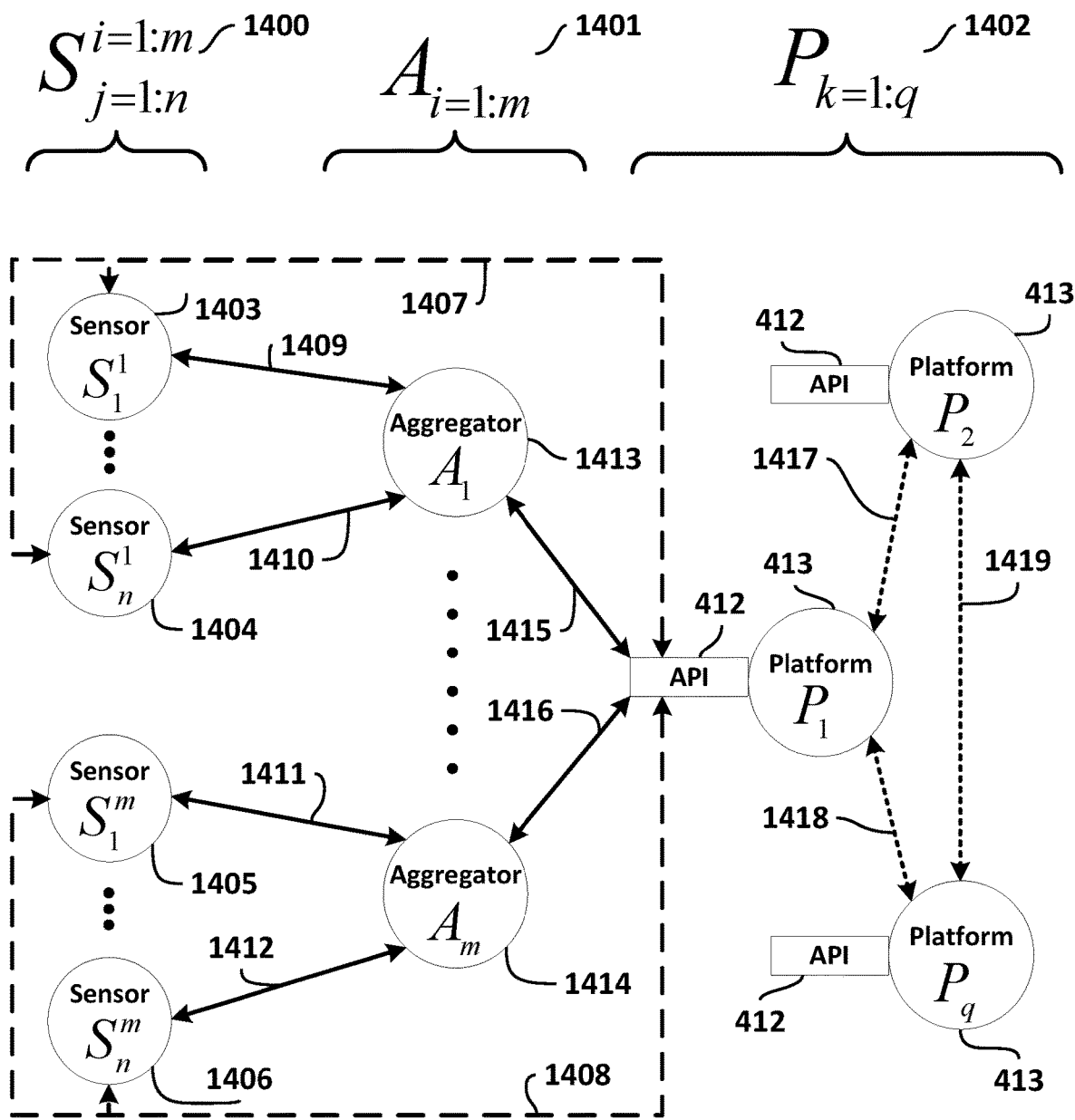
FIG. 14 illustrates an example of a communication topology for a sensor edge node and aggregator application, which communicate with the system API and platform, in a fault tolerant redundant network design.

FIG. 14 illustrates an example of an integrated system topology. In this topology, the platform is a sensor network of nodes and aggregators. Each node of the sensor network is a sensor device, which may also be referred to as a sensor node. Each aggregator is a computing system of one or more computers that receives and aggregates data from one or more sensors and forwards the aggregated data to other locations in the sensor network.

The sensor network can include one or more sensors, where n is the number of sensors. The sensors can include one or more different types, wherein m is the number of different types. For example, the sensor network can include vehicle, weather, facility, or other information sensors ($S_j^i$) 1400, for example, sensors 1403, 1404, 1405, and 1406. Each sensor is capable of providing situational data to one or more aggregators, e.g., aggregator 1401, or directly to the API 412 of the platform 413. In some implementations, the sensors can provide real-time streaming situational data. For example, aggregators 1413 and 1414 can continually feeding data to the API 412 of the platform 413.

The platform 413 can then handle the computational processing, using various data analysis methods, for example, machine learning and artificial intelligence algorithms, to determine and rank routes using the data generated by the sensors 1400.

In some implementations, the sensor network includes multiple instances of the platform 413, where q is the number of instances of the platform 413. The multiple instances of the platform 1417, 1419, 1418 can synchronize data received from the sensor network so that the entire platform functions in a redundant manner. This redundancy can improve the overall up-time of the service and the quality of the service through fault tolerance services. For example, the platform 413 can use techniques including data duplication, distributed computing, and system redundancy, across a distributed network, for example, internet cloud, virtual private network, and/or local area network.

Figure 15:
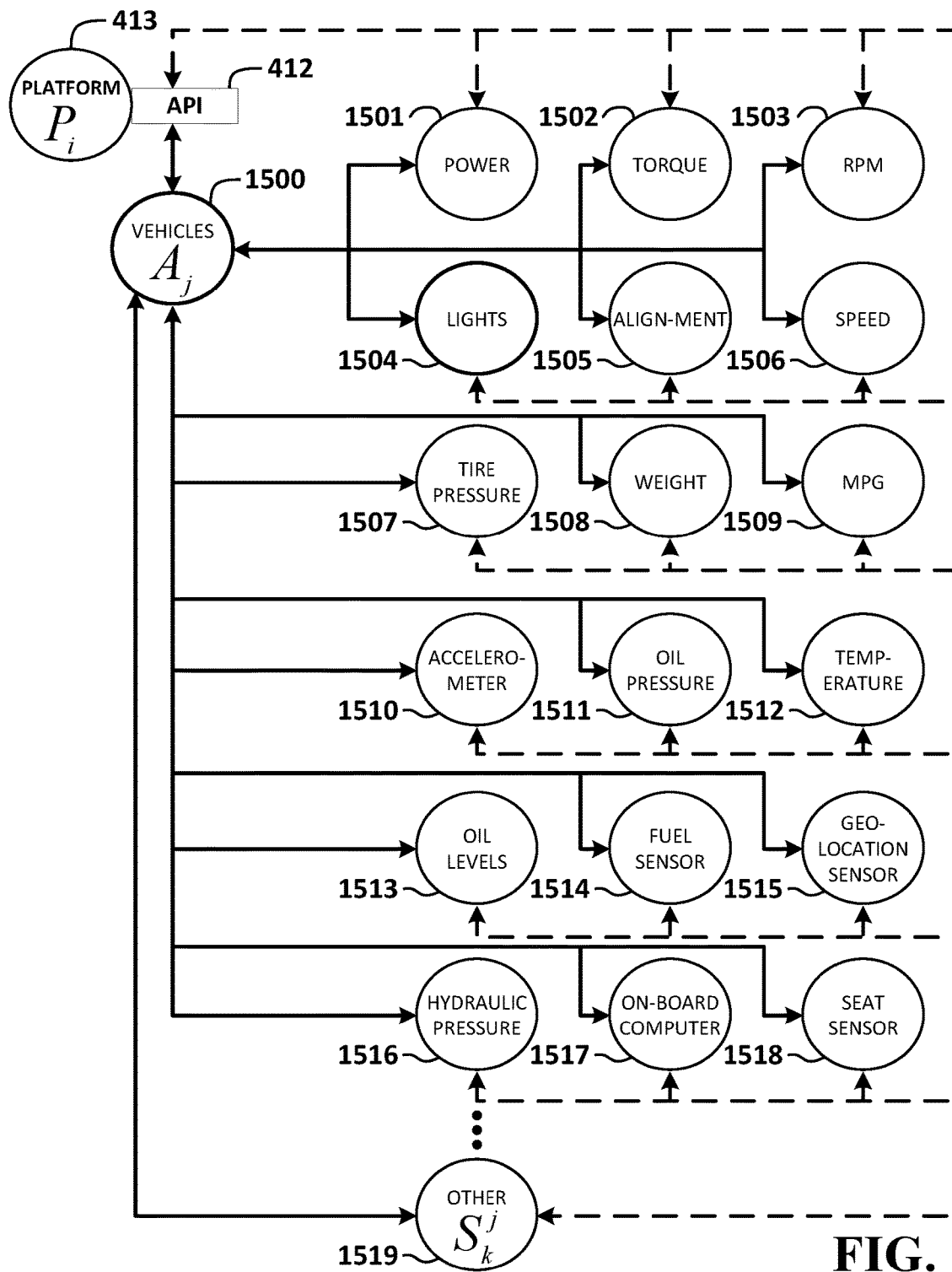
FIG. 15 illustrates an example of a communication topology for a vehicle sensor edge nodes and an aggregator application, which communicate with the system API and platform.

FIG. 15 illustrates an example vehicle aggregator 1500 and the various example of the sensor nodes that may feed data to the vehicle aggregator 1500. These sensor nodes are typically installed on a vehicle itself. These sensors may include, for example, power 1501, torque 15202, RPM 1503, lights 1504, alignment 1505, speed 1506, tire pressure 1507, weight 1508, Miles Per Gallon (MPG) 1509, accelerometers 1510, oil pressure 1511, temperature 15212, oil levels 1513, fuel sensor 1514, geo-location sensor 1515, hydraulic pressure sensor 1516, on-board computer 1517, center of balance sensor 1518, and/or potentially other sensors 1519. These sensors may communicate and feed data to the aggregator 1500, and optionally or alternatively, may communicate directly with the API 412 if enabled with a capability, for example, a built-in API communication module, virtual private network system, or other means to communicate directly with the API 412. In some implementations, the aggregator 2200 is installed on a mobile computing device that communicates with the sensors, e.g., by a short-range wireless communication protocol, to obtain the sensor data and provides the resulting data to the API 412.

Figure 16:
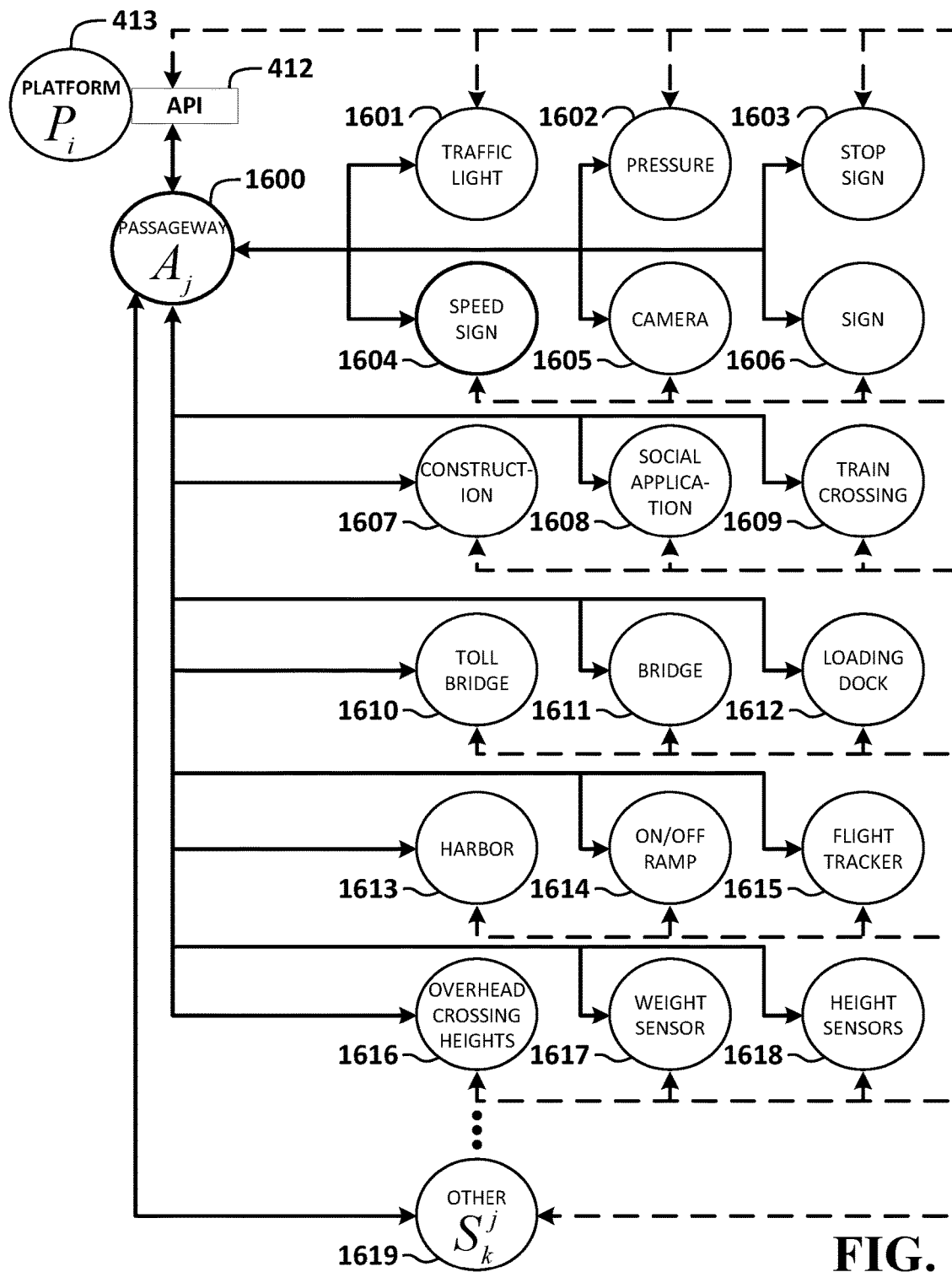
FIG. 16 illustrates an example of a communication topology for a passageway sensor edge node and aggregator application in one permutation, of many options, for a network design which communicates with the system API and platform.

FIG. 16 illustrates an example passageway aggregator 1600 and the various examples of the sensor nodes that may feed data to the aggregator. These sensors may include, for example, traffic light 1601, pressure 1602, stop sign 1603, speed sign 1604, camera 1605, sign 1606, construction 1607, social application 1608, train crossing 1609, toll bridge 1610, loading dock 1612, harbor 1613, on/off ramp 1614, flight tracker 1615, overhead crossing heights 1616, weight sensor 1617, height sensor 1618, and/or potentially other sensors 1619. These sensors may communicate and feed data to the aggregator 1600, and in optionally or alternatively, may communicate directly with the API 412 if enabled with a capability, for example, a built-in API communication module, virtual private network system, or other means to communicate directly.

Figure 17:
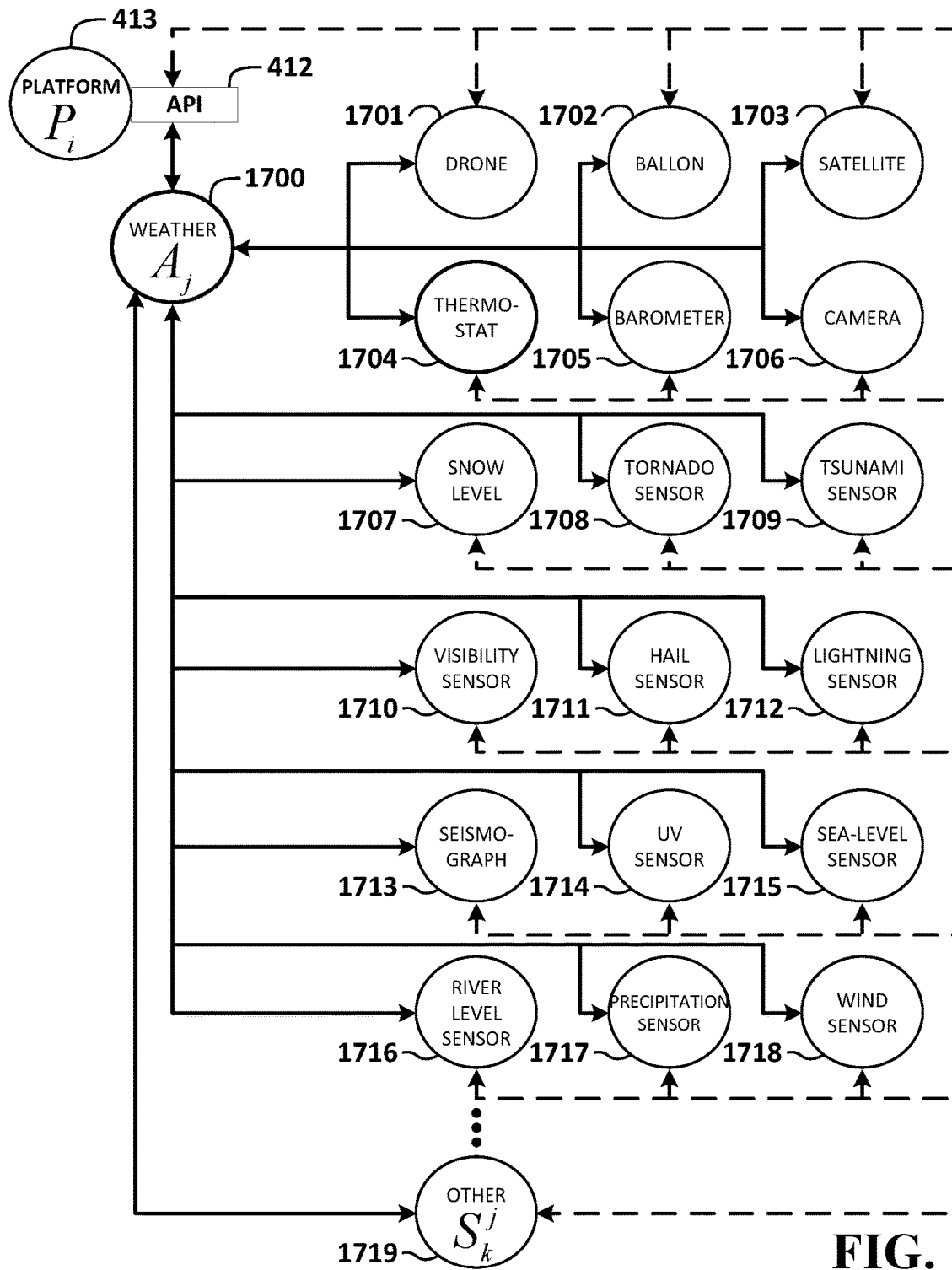
FIG. 17 illustrates an example of a communication topology for a weather sensor edge node and aggregator application in one permutation, of many options, for a network design which communicates with the system API and platform.

FIG. 17 illustrates an example weather aggregator 1700 and the various examples of the sensor nodes that may feed data to the aggregator. These sensors may include, for example, drone 1701, balloon 1702, satellite 1703, thermostat 1704, barometer 1705, camera 1706, snow level 1707, tornado sensor 1708, tsunami sensor 1709, visibility sensor 1710, hail sensor 1711, lightning sensor 1712, seismograph sensor 1713, UV sensor 1714, sea-level sensor 1715, river level sensor 1716, precipitation sensor 1718, wind sensor 1718, and/or potentially other sensors 1719. These sensors may communicate and feed data to the aggregator 1700, and optionally or alternatively, may communicate directly with the API 412 if enabled with a capability, for example, a built-in API communication module, virtual private network system, or other means to communicate directly.

Figure 18:
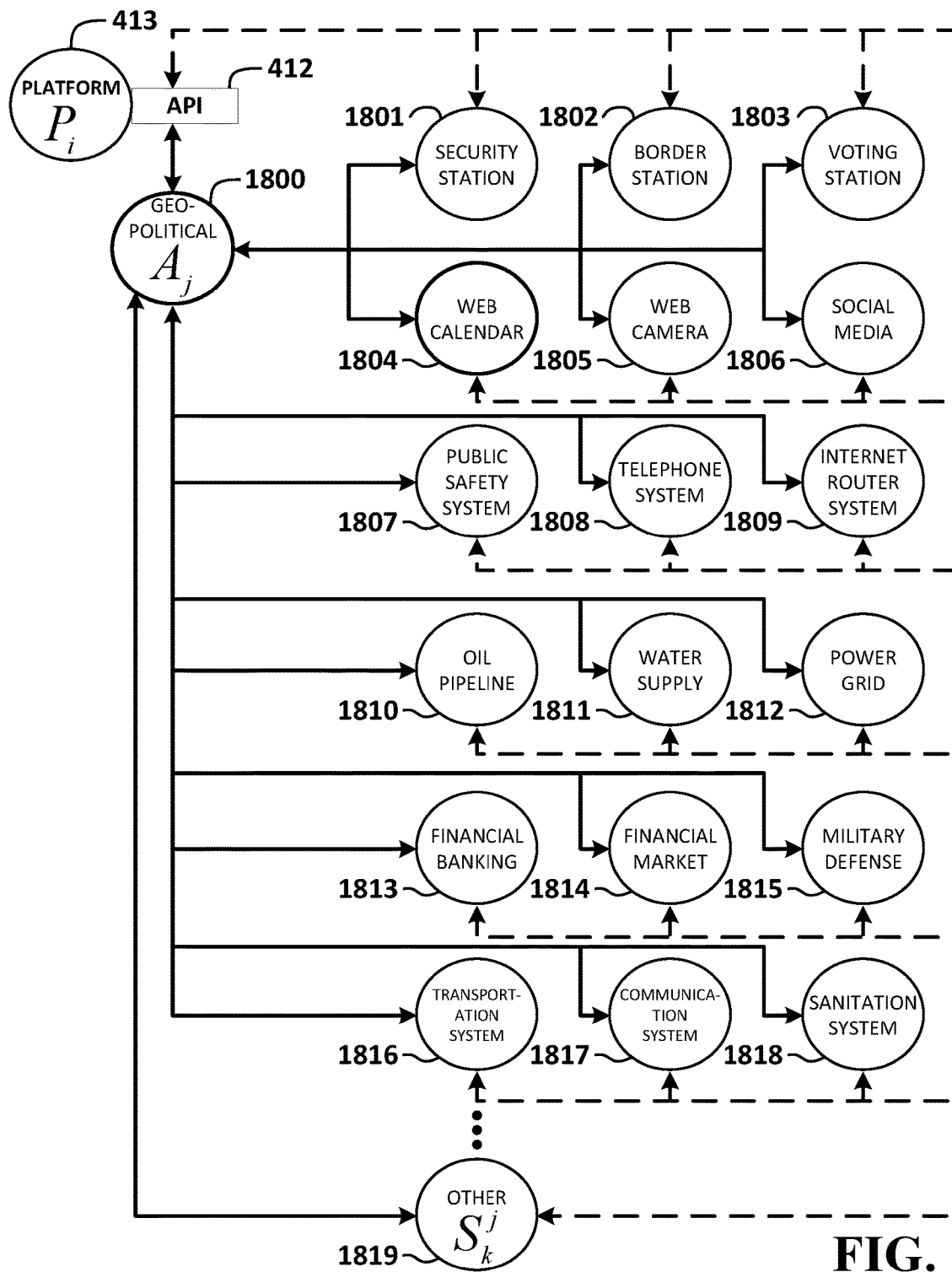
FIG. 18 illustrates an example of a communication topology for a geo-political sensor edge node and aggregator application in one permutation, of many options, for a network design which communicates with the system API and platform.

FIG. 18 illustrates an example geo-political aggregator 1800 and the various example of the sensor nodes that may feed data to the aggregator. These sensors may include, for example, security station 1801, border station 1802, voting station 1803, web calendar 1804, web camera 1805, social media 1806, public safety systems (e.g., Police, Fire) 1807, telephone system 1808, internet router system 1809, oil pipeline 1810, water supply 1811, power grid 1812, financial banking 1813, financial market 1814, military defense 1815, transportation system 1816, communication system 1817, sanitation system 1818, and/or potentially other sensors 1819. These sensors may feed data to the aggregator 1800, and optionally or alternatively, may communicate directly with the API 412 if enabled with a capability, for example, a built-in API communication module, virtual private network system, or other means to communicate directly.

Figure 19:
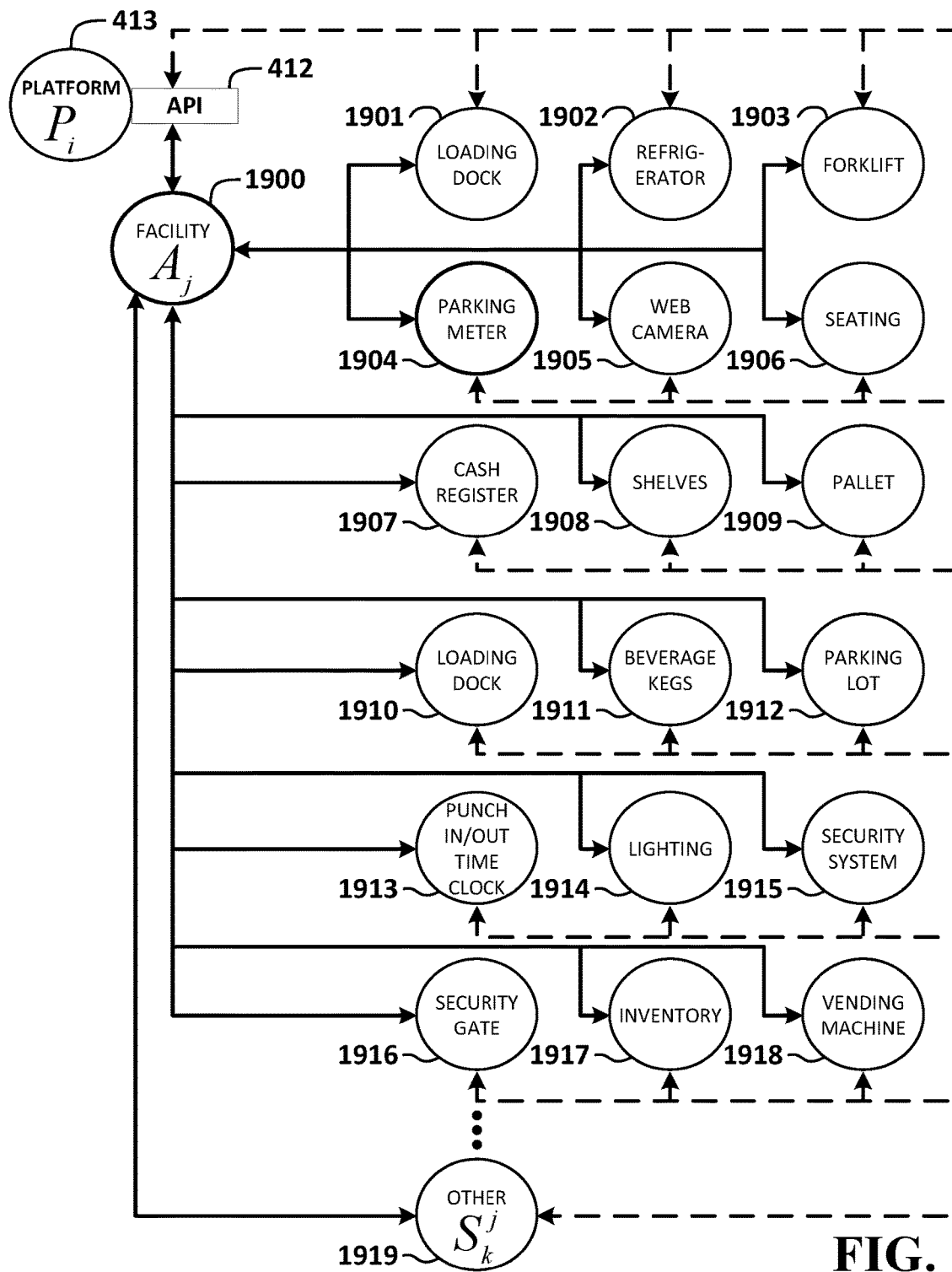
FIG. 19 illustrates an example of a communication topology for a facility sensor edge node and aggregator application in one permutation, of many options, for a network design which communicates with the system API and platform.

FIG. 19 illustrates an example facility aggregator 1900 and the various example of the sensor nodes that may feed data to the aggregator. These sensor may include, for example, loading dock 1901, refrigerator 1902, forklift 1903, parking meter 1904, web camera 1905, seating 1906, cash register 1907, shelves 1908, pallet 1909, loading dock 1910, beverage kegs 1911, parking lot 1912, punch in/out time clock 1913, lighting 1914, security system 1915, security gate 1916, inventory 1917, vending machine 1918, and/or potentially other sensors 1919. These sensors may communicate and feed data to the aggregator 1900, and optionally or alternatively, may communicate directly with the API 412 if enabled with a capability, for example, a built-in API communication module, virtual private network system, or other means to communicate directly.

Figure 20:
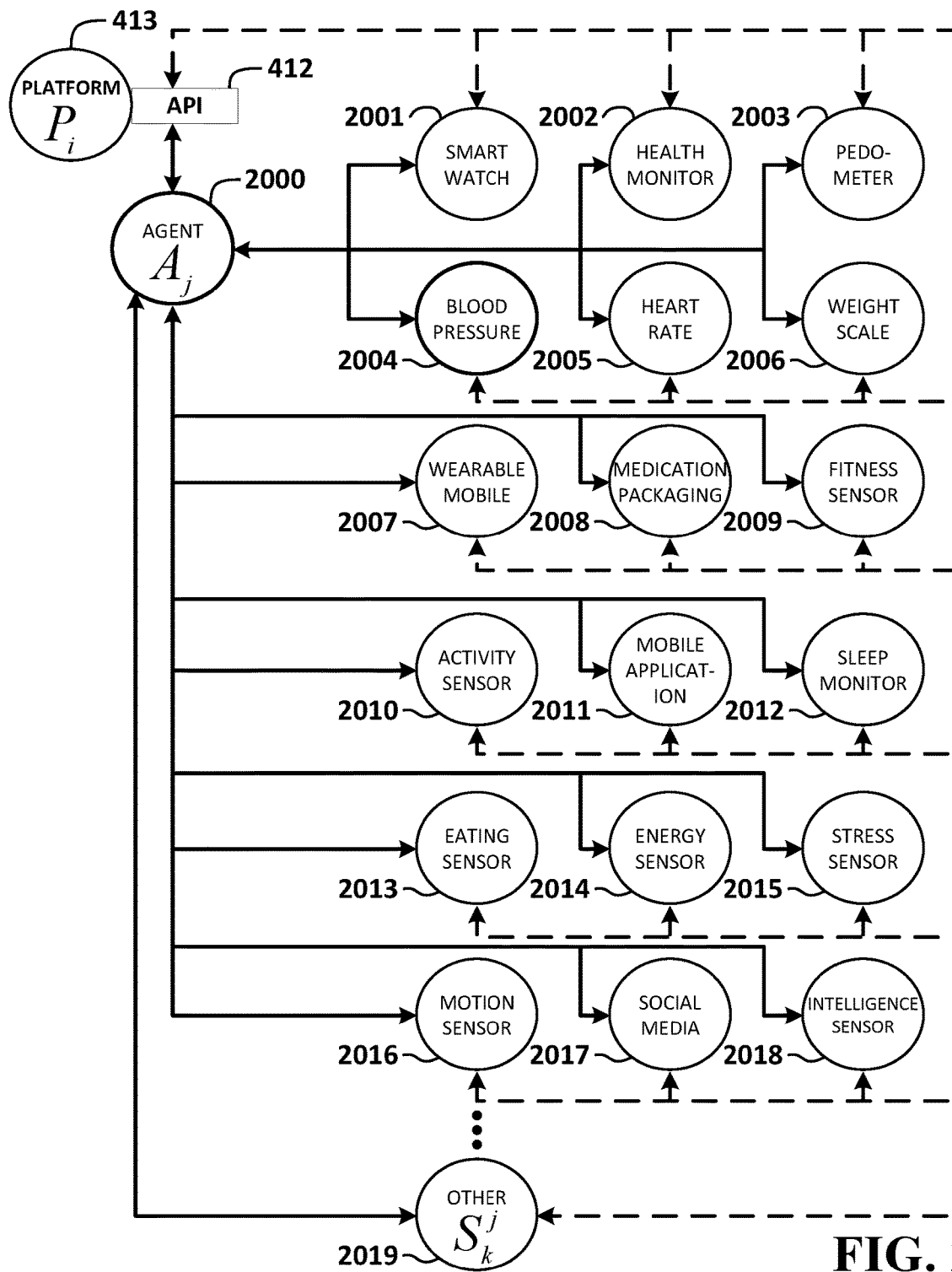
FIG. 20 illustrates an example of a communication topology for a human-agent sensor edge node and aggregator application in one permutation, of many options, for a network design which communicates with the system API and platform.

FIG. 20 illustrates an example agent aggregator 2000 and various examples of sensor nodes that may feed data to the aggregator. These sensor may include, for example, smart watch 2001, health monitor 2002, pedometer 2003, blood pressure 2004, heart rate 2005, weight scale 2006, wearable mobile 2007, medication packaging 2008, fitness sensor 2009, activity sensor 2010, mobile application 2011, sleep monitor 2012, eating monitor 2013, energy monitor 2017, stress sensor 2015, motion sensor 2016, social media 2017, intelligence sensor 2018, and/or potentially other sensors 2019. These sensors may communicate and feed data to the aggregator 2000, and optionally or alternatively, may communicate directly with the API 412 if enabled with a capability, for example, a built-in API communication module, virtual private network system, or other means to communicate directly.

Figure 21:
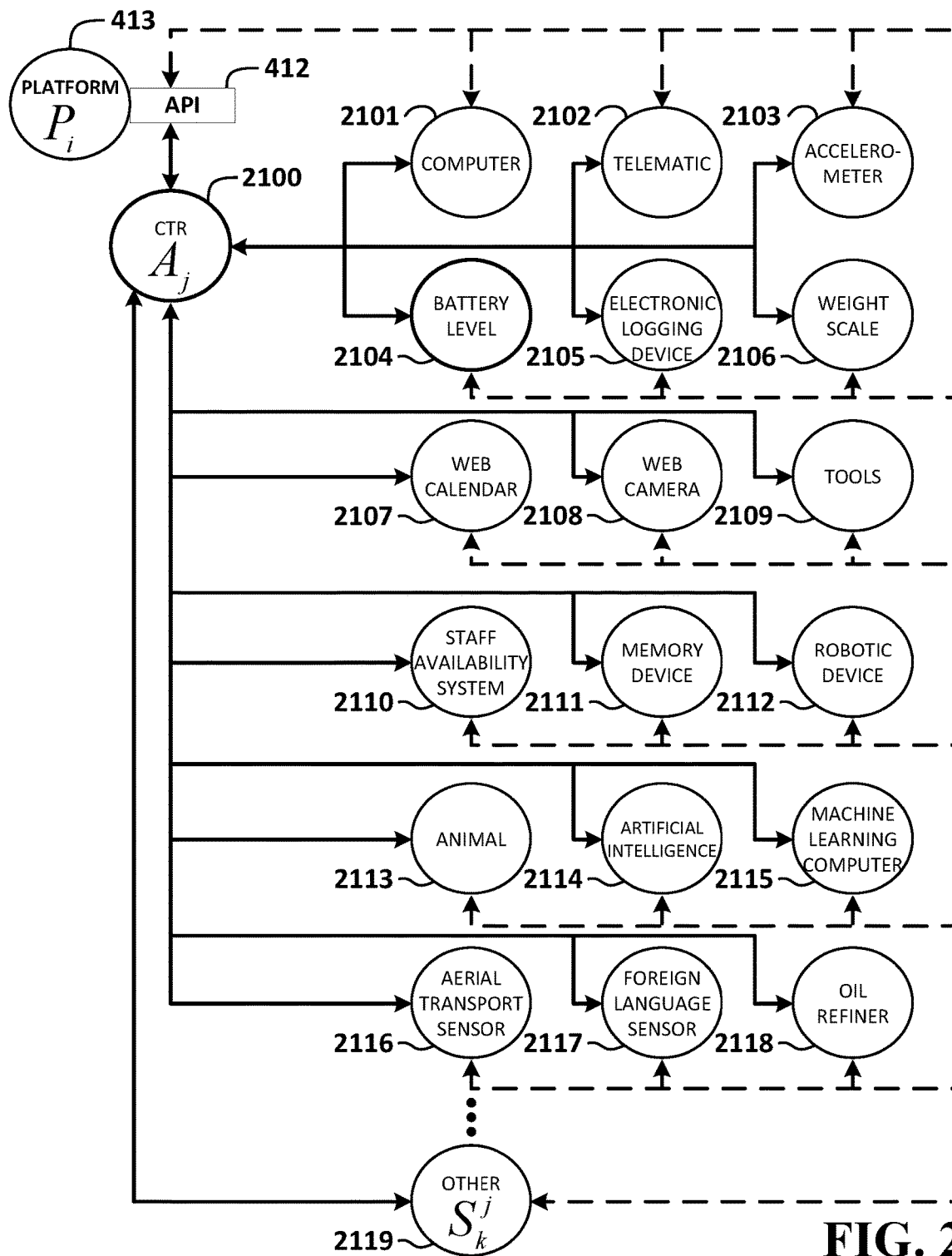
FIG. 21 illustrates an example of a communication topology for a completion tool and resources (CT&R) sensor edge node and aggregator application in one permutation, of many options, for a network design which communicates with the system API and platform.

FIG. 21 illustrates an example completion tool and resource(s) (CTR) aggregator 2100 and the various example of the sensor nodes that may feed data to the aggregator. These sensors may include, for example, computer 2101, telematics 2102, accelerometer 2103, battery level 2104, electronic logging device (ELD) 2105, weight scale 2106, web calendar 2107, web camera 2108, tools 2109, staff availability system 2110, memory device 2111, robotic device 2112, animal 2113, artificial intelligence 2114, machine learning computer 2115, aerial transport sensor 2116, foreign language sensor 2117, oil refiner 2118, and/or potentially other sensors 2119. These sensors may communicate and feed data to the aggregator 2100, and optionally or alternatively, may communicate directly with the API 412 if enabled with a capability, for example, a built-in API communication module, virtual private network system, or other means to communicate directly.

Figure 22:
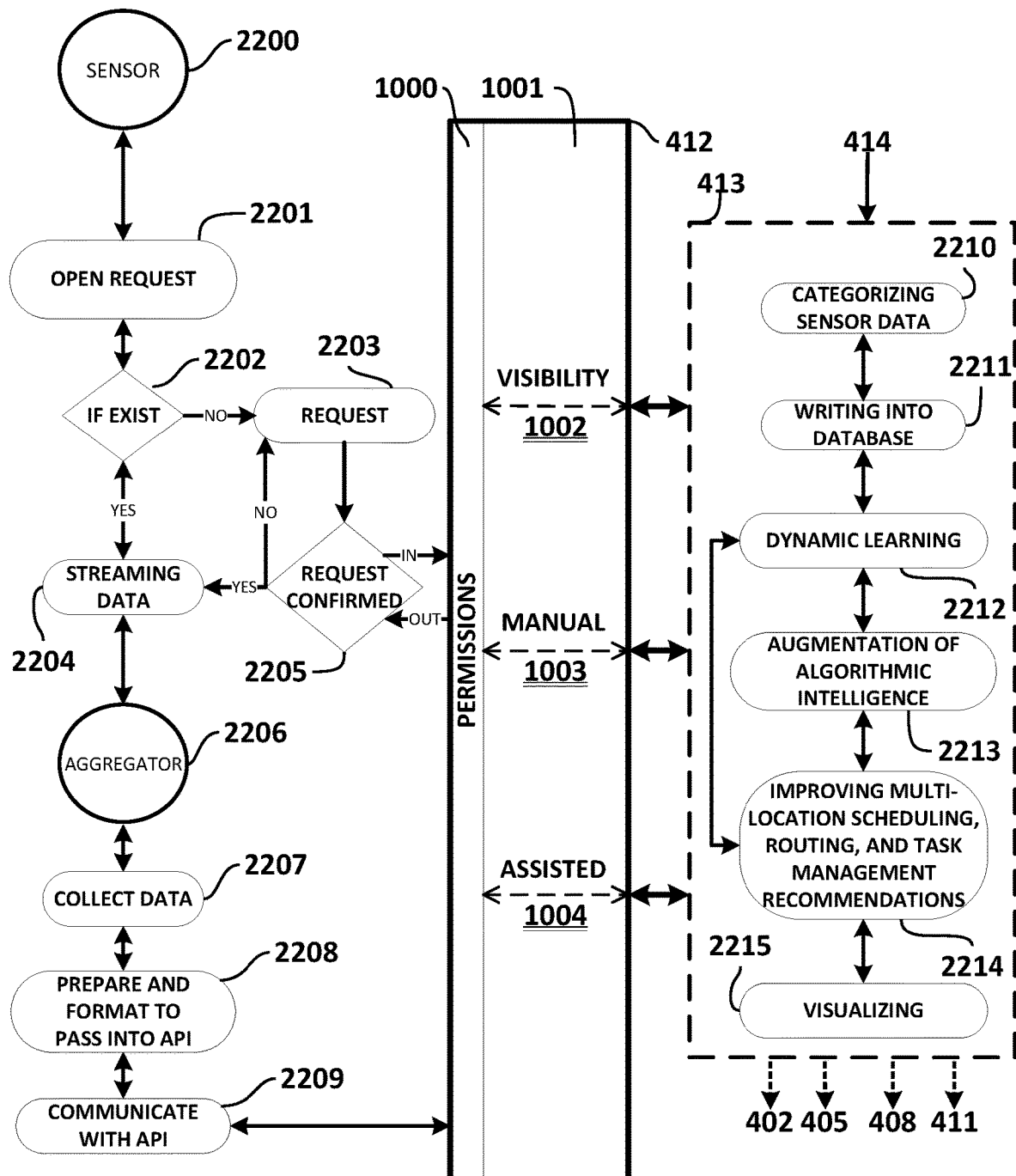
FIG. 22 illustrates an example of a process for handling sensor edge nodes data in an intelligent manner and influence the algorithmic based dynamic learning of the platform system.

FIG. 22 illustrates an example integration of the sensor node 2200, aggregator 2206, with the API 412 and the platform 413 to enable a sensor-based augmented algorithmic learning system. In this example, the sensor 2200 initiates and opens a request 2201, for example, to initiate a route optimization, read a file, establish an open port off communication, or make an another type of update to the system. If the request is another approved or exists in the system 2202, then the sensor is able to start streaming the data 2204 to the aggregator 2206. If the request is not present 2202, then the request 2203 is formalized and sent into 2205 the API 412. Once the request is confirmed then data can begin to start stream 2204, otherwise, the request loops back to the formalization 2203 and resubmitted 2205. The aggregator 2206 will collect the data 2207 and prepare the format, which can include for example, parsing, and restricting, indexing, will then feed the data via a communication channel 2209 to the API 412. Once data arrives to the API 412, it will pass through a permissions application layer to ensure allowance and compliance and the data will feed to the platform 413. Within the platform, the sensor data is than categorized 2210 and written into a database 2211. The system begins the dynamic learning on the new database information 2212 by taking into consideration the new information. From the learning 2212, the algorithm will augment the approach, such as those used to attain convergence, tolerance, or other aspects of data precision. With the algorithm gaining higher orders of intelligence 2213, improved recommendations are generated 2214. Then the recommendations may be visualized to the various requesters 402, 405, 408, 411.

Figure 23:
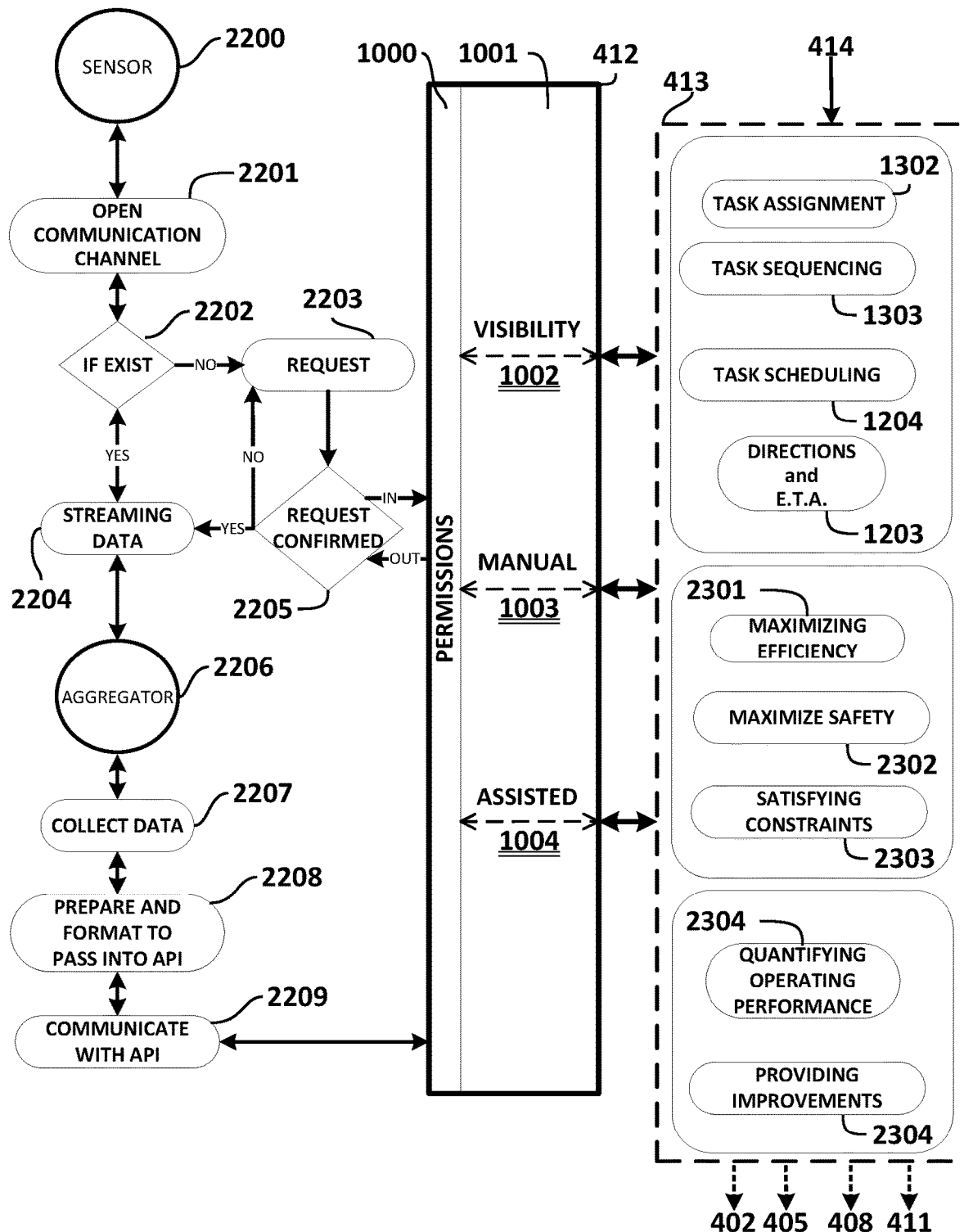
FIG. 23 illustrates an example of general purposes and/or uses of sensor information in several use case examples for integrated multi-location scheduling, routing, and task management of operations.

FIG. 23 illustrates an example integration of the general uses of the sensor data. The integration can enable the sequencing 1302, scheduling, 1303, assigning of new tasks 1302, and/or direction and ETA 1203, either ahead of time, or in real-time. In another example embodiment, the integration enables the quantifying operation performance 2304 and/or providing improvements 2304 for integrated multi-location scheduling, routing and task management operations. The integration can enable continual maximization of efficiency 2301, safety 2302, and/or satisfying constraints 2303, for example, timeliness, for sequencing or scheduling of previously assigned tasks.

The various permutations and combinations of the platform processes, for example, 1302, 1303, 1204, 1203, 2301, 2302, 2303, 2304, and/or 2304, can be integrated to provide more, or less, different types of results to support various other use cases permutations and combinations.

Figure 24:
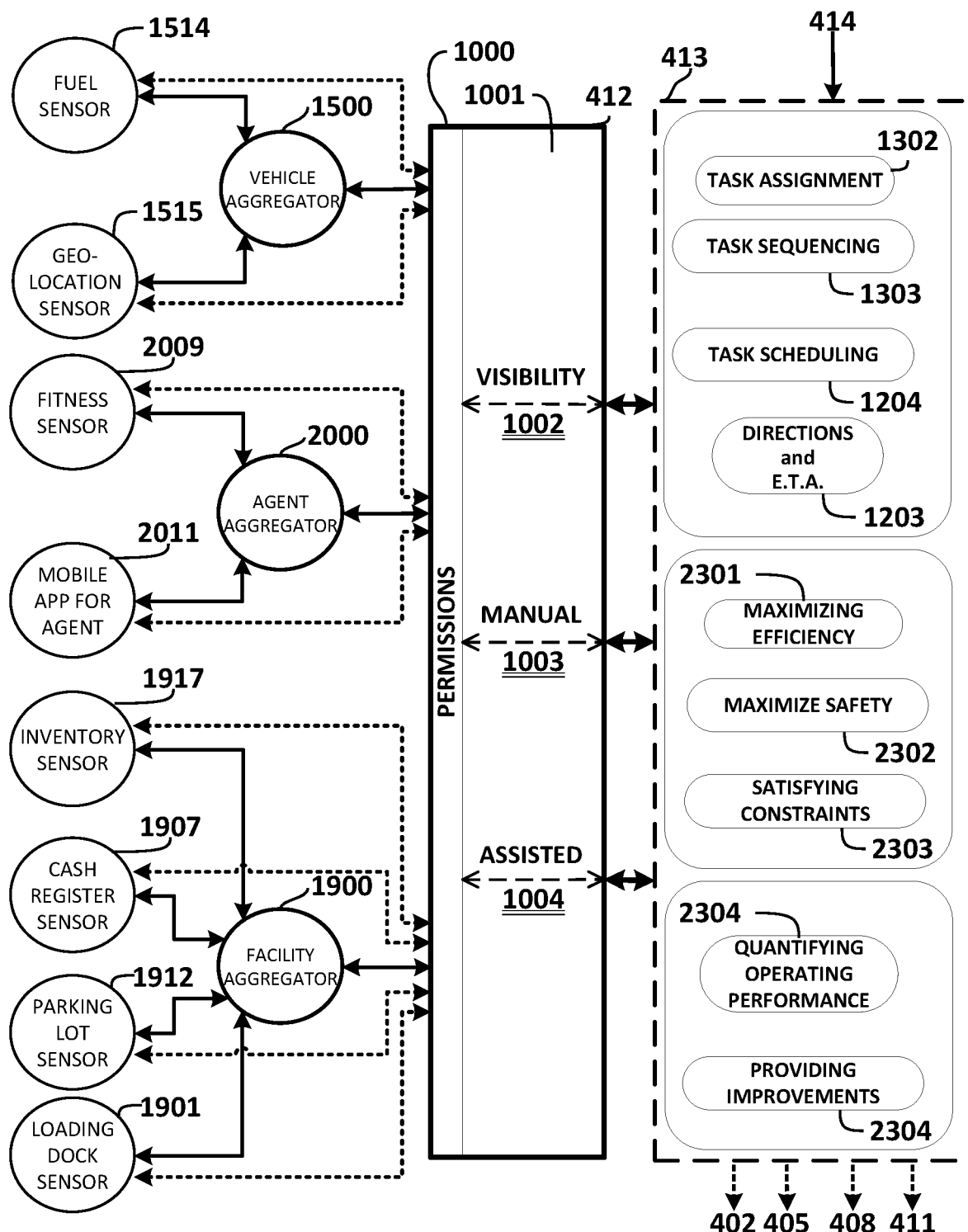
FIG. 24 illustrates example use cases for integrating sensors.

FIG. 24 illustrates an example use case integrating sensors 1514, 1514, 2009, 2011, 1917, 1907, 1912, 1901, aggregators 1500, 2000, 1900, the system API 412, and the platform 413, with various system processes, for example, 1302, 1303, 1904, 1903, 2301, 2302, 2303, 2304, and/or 2304. Described below are three use case examples:

Still referring to FIG. 24, one use case is for the integration and general use of sensor information to enable sequencing, scheduling and assigning of new tasks, ahead of time, and/or in real-time.

The fuel use 1514 sensor indicates the immediate fuel consumption, which can inform which vehicle is best suited to handle a new task 1302 given how much fuel it currently carries and how much fuel it burns. The geo-location sensor 1515 provides information which can be used to determine which agent & CTR devices should be assigned to a new task in order to satisfy constraints 2303 and maximize efficiency 2301. A fitness sensor, for example, a Fitbit activity tracker, provides information which can be used to determine whether new tasks 1302 should be assigned to certain agent based on the health condition of the agent and the agent's suitability to handle new job. The mobile app for agent sensor 2011 informs by monitoring location, and by allowing driver to designate status of each delivery, thereby informing which agent & CT&R should be assigned 1302 to a new task 1303 in order to satisfy constraints 2303 and maximize efficiency 2301. The parking availability sensors 1912 help to determine when and if a new task 1302 can be scheduled 1904 based on the understanding of the availability of parking. The loading dock sensor 1901 can be used to determine when and if a new task 1302 can be scheduled 1904 based on understanding of the availability of loading dock space/time. The cash register sensor 1907 can be used to determine when and if a new task 1302 can be scheduled 1904 based on understanding of the availability of cash and ability of customer to pay. The inventory sensor 1917, for example, sensors in shelving, storage, refrigerator, inventory, cases, containers, receptacles, can be used to provide information on inventory that helps augment when to trigger or automatically create a new delivery without having to talk to the customer or wait for them.

Still referring to FIG. 24, another use case is for the integrated enablement to continually maximize efficiency 2301, safety 2302, and satisfaction of constraints 2303, e.g., timeless for sequencing and scheduling of tasks. The fuel use sensor 1514 can help determine the immediate fuel consumption, which can inform when a vehicle has to refuel, prompting the platform 413 to locate the best gas station from which to fuel up. The platform 413 can also adjust the route to accommodate the re-fueling. Another option is to determine which vehicles have enough fuel to continue working, and which ones may have to transfer their jobs to another vehicle in order to refuel.

The geo-location sensor 1515 can monitor the location of each agent, CTR device, or both. The monitoring of the relevant forces that can influence tasks and can be used for maximizing efficiency 2301 and satisfying constraints 2303 using the most recent location information. The fitness sensor 2009, for example, a Fitbit activity tracker, allows the system to determine whether an agent can satisfy current tasks 1302 or whether they should be reassigned 1302, based on an agent's suitability to safely finish tasks for the day. The mobile application sensor 2011 provides information by monitoring location, and by allowing an agent to designate status of each delivery, allowing the platform 413 to monitor the relevant forces that would affect their tasks, aimed at ensuring maximizing of efficiency 2301 and/or satisfaction of constraints 2303, given the most refreshed information. The parking availability sensor 1912 provides information to help ensure that a certain task 1302 can be delivered 1603 as circumstances change, and, based on the platform system 413 understanding of the availability of parking, to potentially reschedule 1904 that appointment. The loading dock sensor 1901 can help by ensuring that a certain task 1302 can indeed be delivered as circumstances change, and based on the availability and timing of loading dock, and if not, to reschedule 1904. The cash register sensor 1907 can help by ensuring that a certain task 1302 can indeed be delivered based on understanding of the availability of cash and ability of customer to pay, as it changes thru the day. The inventory sensors 2317, for example, sensors in shelving, storage, refrigerator, inventory, cases, containers, receptacles, can provide information on inventory that helps augment when to trigger or automatically and dynamically create a new delivery, without having to talk to the customer, or wait for them to provide information.

Still referring to FIG. 24, another use case is for the integrated enablement in order to quantify operation performance and provide improvements for integrated multi-location scheduling, routing and task management. The fuel sensor 1514 can inform about consumption per truck and information, for example, which customers spend the most fuel on and are thus most expensive to serve, which vehicles use the most fuel and when, thus allowing users to know what trucks are most expensive, thereby quantifying operating performance 2304 and maximizing efficiency 2301. The geo-location sensor 1515 informs where each driver and vehicle have been for accountability and operating performance purposes 2304. The health sensor 2009, for example, a Fitbit activity tracker, informs about a drivers' health, for example, for purposes of insurance, accountability 2304, and, can invoke safety actions 2302, for example, make emergency calls if needed. The mobile-app sensor for agent sensor 2011 can be perform several functions, for example, monitoring of the location, and by allowing drivers to designate status of each delivery, or allowing the customer to know where each driver and vehicle have been for accountability purposes 2304 and to track when each customer was visited. The parking lot sensor 1912 or the loading dock sensor 1901 can inform the understanding of how constrained/complicated a customer's delivery is, which can inform pricing in the future 2304. The inventory sensors, for example, sensors in shelving, storage, refrigerator, inventory, cases, containers, receptacles, help augment knowing when to plan for production 2304, even before logistics and fulfillment, without having to talk or wait for customer information.

Still referring to FIG. 24, the various permutations and combinations of the simultaneous use cases of various sensors, for example, those identified in reference to FIGS. 15, 16, 17, 18, 19, 20, and 21, and other sensors, can be integrated to provide more, or less, different types of information, to support various other use case's permutations and combinations.

FIG. 25A, FIG. 25B, and FIG. 25C illustrate another example use-case of integrating sensors and understanding more about developing an understanding of what an agent is doing at any given time. The illustrations in FIG. 25A, FIG. 25B, and FIG. 25C are independently, and collectively, demonstrative of a system and method of utilizing sensors 1515, 1518, 1506 towards determining if a driver is delivering 2507 by meeting certain logic conditions 2505 and 2506, at various example scenarios waypoints 2515, 2516, 2500 along an example route. These examples illustrate how the gathering of information with sensors can develop an understanding of the predicted optimal time to make a delivery, and that by building such an understanding by translating data into utility curve functions, it may be possible to make more informed decisions.

Shown in FIG. 25A is an example location sensor 1515, seat sensor 1518, and a speed sensor 1506, that each may communicate with a vehicle aggregator 1500, or directly to the API 412, which is connected to the platform 413 that is communicating with various stakeholders, for example, 402, 405, 408, and/or 411. In this example, the sensors 1515, 1518, and 1506, may be communicating via encrypted or other secure channels, using various means, for example, radio, electrical, and internet protocols, for example, TCP IPv4, TCP IPv6. The sensors may be collecting data at various time increments, for example, seconds, minutes, hours, days, weeks, and years.

Shown in FIG. 25B is an example in which the sensors 1515, 1518, 1506, operate independently, and collectively, to determine, for example, that no one is seated for greater or equal to some value, W, minutes 2500; OR 2505, for example, that the engine is off for greater or equal to some value, X, minutes 2502; OR 2505, for example, that the vehicle is parking and the engine is idle for greater or equal to some value, Y, minutes 2502; OR 2505, for example, the vehicle is stopped for greater or equal to some value, Z, minutes 2203. With just one condition of 2500, 2501, 2502, or 2503 accepted as meeting the W, X, Y, or Z value criteria's, AND 2506 the determination that vehicle is near the customer 2504, a conclusion is reached that the vehicle/driver is delivering 2507, and which feeds 2508 this information back to the system, for further consideration with the routing subsystem 501. The feedback loops 2508 may advance the system to collect new data and improve the routing subsystem 501 through learning 316 and convergence of the computations. The system may store this data in trip logs as described above with reference to FIG. 13.

Shown in FIG. 25, and more specifically in FIG. 25C, is an example of the use of sensor data from 2500, 2501, 2502, 2503, and 2504 into an approach to determine what the vehicle/driver is doing at a given point in time along a route consisting of, for example, three waypoints, waypoint A 2515, waypoint B 2516, and waypoint C 2520, in which the sensor data may be used to quantitatively gain an understanding and/or insights that will help make better decisions. In the example of FIG. 25C at waypoint A 2515, the vehicle/driver 2510 is identified as being within the boundary 2509 that defines as being near the customer 2504, thereby meeting one of the AND conditions 2506, additionally, the vehicle engine is off for greater than X minutes 2501, thereby meeting the second AND condition 2506, and thus, the routing subsystem 501 determines that the driver is delivering 2507. Along the example route, at 2511, the vehicle does not meet any of the OR conditions 2502, 2501, 2502, nor 2503, and, is not within the boundary of waypoint A 2515 or within the boundary of waypoint B 2516, therefore, the routing subsystem 501 determines the driver is not delivering. At waypoint B 2516, the vehicle 2512 is within the waypoint B boundary 2517, thereby meeting one AND condition 2506 of being near the customer 2504, yet, none of the OR conditions 2502, 2501, 2502, nor 2503 are met, thereby failing to meet the AND conditions 2506, and therefore, the routing subsystem 501 determines the vehicle is not delivering. Along the example route at 2513, the vehicle/driver has been stopped for greater than Z minutes 2503, satisfying one of the OR conditions 2505, yet, the vehicle is not within the boundary of waypoint B 2517 or waypoint C 2518, thereby failing to meet the AND condition 2506, and therefore, the routing subsystem 501 determines the vehicle is not delivering. Along the route, for example, the vehicle 2514 has been determined by sensors 1515, 1518, 1506 to be within the boundary 2518 that defines the near the customer 2504 at waypoint C 2520, which may be a larger or different criteria, for example a wider radius, than waypoint B, and thereby meeting one AND condition 2506. Additionally, at 2514, for example, the sensors 1515, 1518, 1506 indicate that no one is seated for greater than W minutes 2500, satisfying an OR 2505 condition, and thereby, meeting the second AND condition at 2506. Therefore, the routing subsystem 501 determines that both AND conditions 2506 are met at 2514, and that the driver is delivering 2507. The system may then store this information in trip logs as described above with reference to FIG. 13.

FIG. 25A, FIG. 25B, and FIG. 25C present one example of sensors 1400 and the aggregators 1401, in general, and the API/platform 1402, as specifically disclosed herein, in an example use-case of how to gain a better understanding of current events, with the intent of facilitating improved business decisions and learning 333. Other permutations and combinations of other sensors are possible and may be considered. The examples depicted in FIG. 25A, FIG. 25B, and FIG. 25C, illustrate the method by which insights can be made, not only forecasting on past critical data points, but also on actual real-time data collected from sensors, that augment the routing subsystem 501 capabilities to compute or learn 316 about operational efficiencies, for example, when is optimal to make a delivery, what are the better routes, and minimizing wasted resources.

Figure 26A:
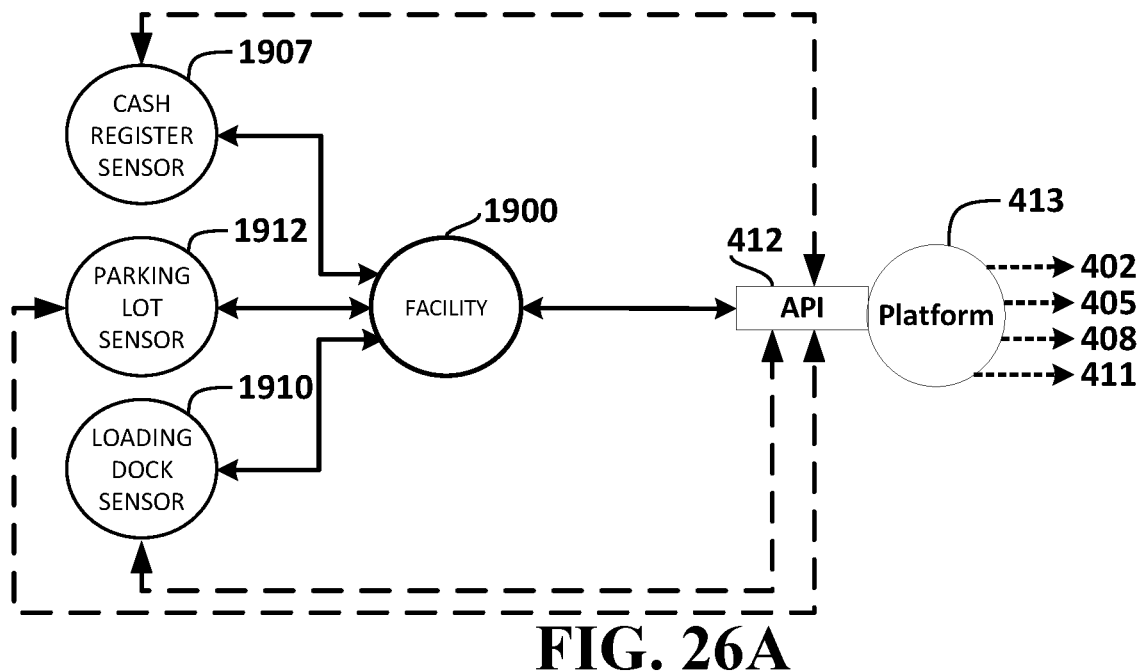
FIG. 26A, FIG. 26B, and FIG. 26C (collectively referred to as FIG. 26) illustrate an example of using facility sensors to determine the optimal delivery time, as influenced by utilization of various resources.
Figure 26B:
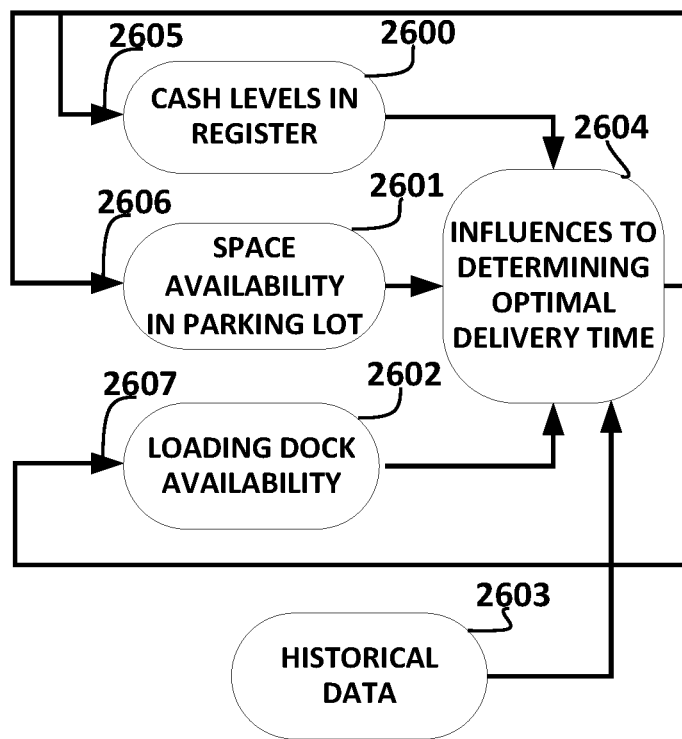
Figure 26C:
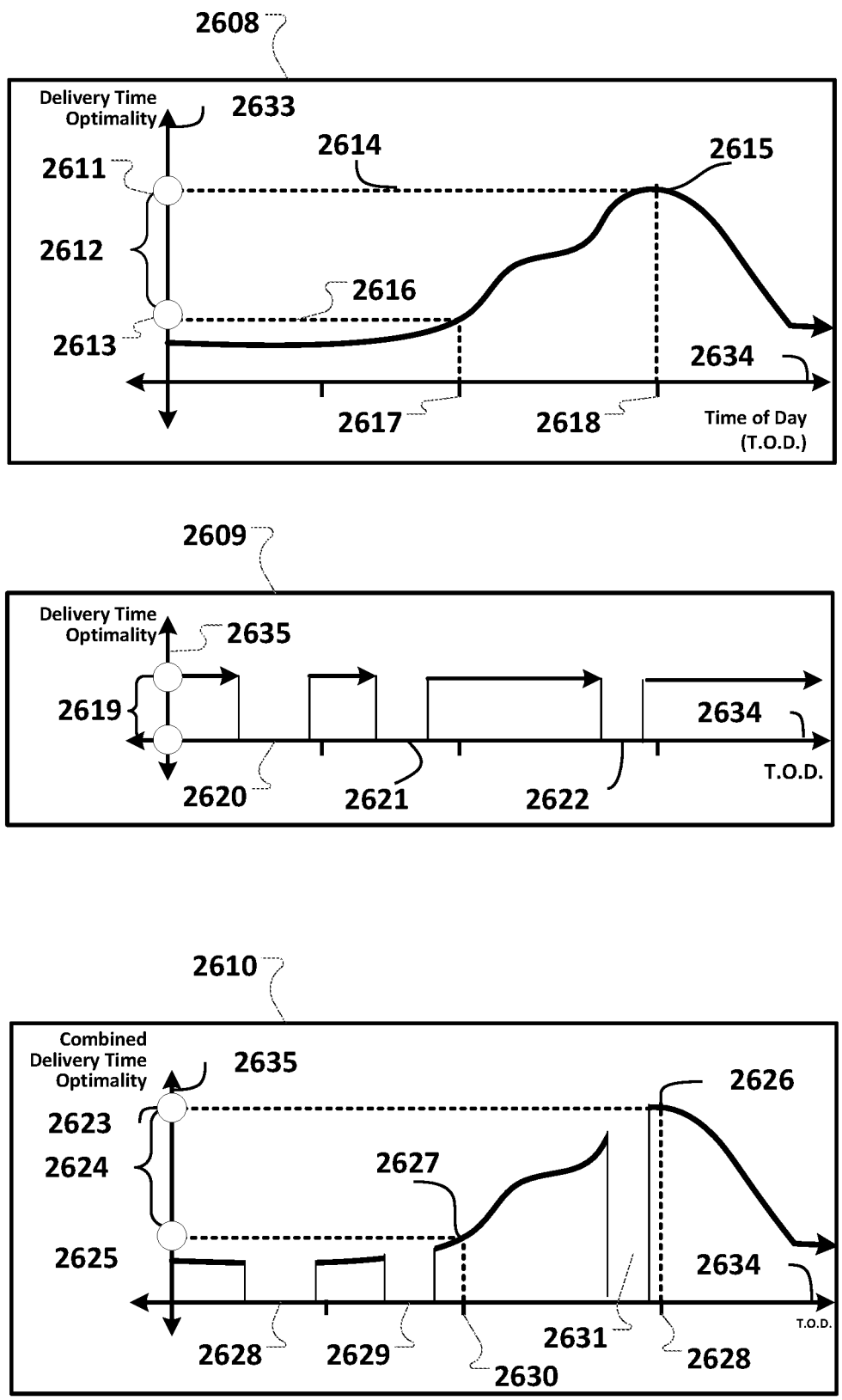

FIG. 26A, FIG. 26B, and FIG. 26C illustrate another example use-case of integrating sensors and understanding more about the approaches to compute a utility function that can be used to determine the predicted optimal time to deliver according to facility factors (e.g., ability to park, receive payment, receive product, etc.). The illustrations in FIG. 26A, FIG. 26B, and FIG. 26C are independently, and collectively, demonstrative of a system and method of utilizing sensors 1907, 1912, and 1910 towards gaining an understanding of the collective influences for determining optimal delivery times 2604. These examples illustrate how the gathering of information with sensors 1907, 1912, and 1910 can develop an understanding of the influences 2604 to computing the predicted optimal delivery times 2608, 2609, and 2610, and that by building such an understanding by translating sensor data 1907, 1912, and 1910 into utility functions 2608, 2609, and 2610, it may be possible to make more informed decisions.

Shown in FIG. 26, and more specifically in FIG. 26A, is an example system using a cash register sensor 1907, parking lot sensor 1912, and a loading dock sensor 1910. Each of these devices may communicate with a facility aggregator 1900, or directly to the API 412, which is connected to the platform 413 that is communicating with various stakeholders, for example, 402, 405, 408, and/or 411. The sensors 1907, 1910, 1912 may be communicating via encrypted or other secure channels, using various means, for example, radio, electrical, and internet protocols, for example, TCP IPv4, TCP IPv6. The sensors may be collecting data at various time increments, for example, seconds, minutes, hours, days, weeks, and years. The system can store this information in sensor logs, e.g., as described above with reference to FIG. 13.

Specifically shown in FIG. 26B is an example of cash level sensor data 2600, space availability in parking lot sensor data 2601, loading dock availability sensor data 2602, that may be utilized to influence and determine the optimal delivery time 2604. Additionally, historical data 2603 may also be used to influence and determine the predicted optimal delivery time 2604. The feedback loops 2605, 2606, and 2607 may promote the system to collect new data and update the predicted optimal delivery time determination periodically or in real-time.

Specifically shown in FIG. 26C is an example of the use of sensor data from 2600, 2601, and 2602 into various types of curve graph plots, for example, 2608, 2609, and 2610, in which the sensor data may be used to quantitatively gain an understanding and/or insights that will help make better decisions.

FIG. 26C shows a graph plot 2608 of an example utility function that is using continuous time. In one alternative, the utility function illustrated by the plot 2608 is defined with a measure of utility named "Delivery Time Optimality" in the vertical axis 2633 and Time of Day (T.o.D.) in the horizontal axis 2634. The utility function illustrated by the plot 2308 may inform the predicted delivery optimality with a function defined by inputs of the sensor and historical data, for example in Equation (1):

$$\text{Delivery Time Optimality}(T) = \text{function}(C, P, L, H) \quad (1)$$

where T represents a time of day, C is a sensor value representing cash levels in a register, P is a sensor value indicating a number of open parking spots, L is a sensor value indicating the availability of a loading dock, and H is aggregate statistical measure of historical success for a particular time window.

The platform will generate the predicted utility function illustrated by the plot 2608 utilizing various methods, discussed in more detail above, with sensor data as influences towards defining the utility function. In another alternative, the current sensor data 2600, 2601, and 2602, with the historical data information, 2603, determines that at time 2617 the predicted measure of utility for delivery time 2616 will be at 2613; and at time 2618, the predicted measure of utility for delivery time 2614 will be at time 2611, and that at 2615 will be the peak of the curve. The difference between 2611 and 2613, identified by 2612, can represent the additional time, or the additional delay of delivery time caused by delivering at 2618 instead of 2617.

Shown in FIG. 26C is a graph plot 2609 of another example utility function with delivery time optimality in the vertical axis 2655 and time of day along the horizontal axis 2634, that is illustrating the use of discrete-time, for example, yes/no availability, and that sensor data 2600, 2601, and 2602, with the historical data information, 2603. The system may determine that at time 2620, 2621, and 2622 no delivery may occur, and that 2619 represents the difference in the optimal time of delivery.

Shown in FIG. 26C is a graph plot 2610 that illustrates another example utility function to represent the combined delivery time optimality of utility functions illustrated by graph plots 2608 and 2609, in which the vertical axis becomes the combined delivery time optimality 2635 and horizontal axis remains as time of day 2634. In one example embodiment, the combined graph plot 2610 is the cumulative summation, for example in Equation (2), over the entire time of day (T.O.D.) of 2608 and 2609:

$$\text{Combined Delivery Time Optimality}(2610) = \Sigma(2608 + 2609)_{T.O.D.} \quad (2)$$

and represents that at a given time of day, for example, 2628, 2629, or 2631, there is a zero optimal time for delivery, while reading at time of day 2630, the point at the curve function 2627 will indicate an optimal delivery time 2625, and at time of day 2632 the delivery point on the curve 2626 will yield the delivery time 2623. The difference between 2623 and 2625, represented by a value of 2624, will define the additional time for delivering later in the day, 2632, versus earlier in the day 2630.

FIG. 26A, FIG. 26B, and FIG. 26C present one example of sensors 1400 and the aggregators 1401, in general, and the API/platform 1402, as specifically disclosed herein, in an example use-case of how to gain a better understanding of current events, with the intent of facilitating improved business decisions and learning 333. Other permutations and combinations of other sensors are possible and may be considered. The examples depicted in FIG. 26A, FIG. 26B, and FIG. 26C, illustrate the method by which insights can be made, not only forecasting on past critical data points, but also on actual real-time data collected from sensors, that augment the routing subsystem 501 capabilities to compute or learn 316 about operational efficiencies, for example, when is optimal to make a deliveries, what are the better routes, and minimizing wasted resources.

Figure 27A:
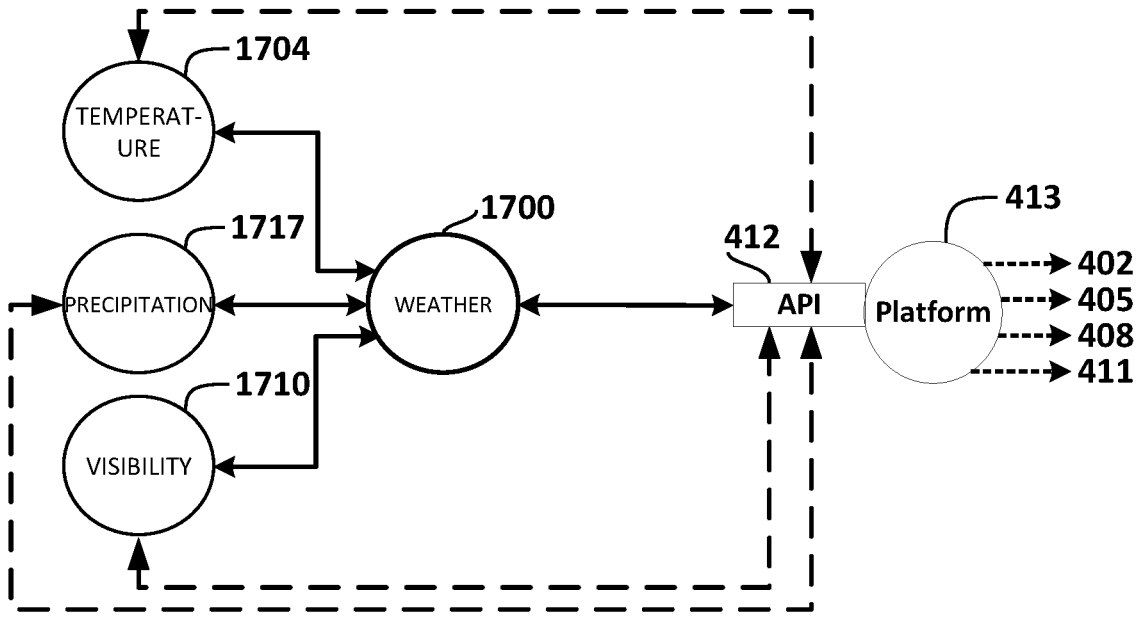
FIG. 27A, FIG. 27B, and FIG. 27C (collectively referred to as FIG. 27) illustrate an example use-case of using weather sensors to determine the optimal delivery time, as influenced by various environmental conditions.
Figure 27B:
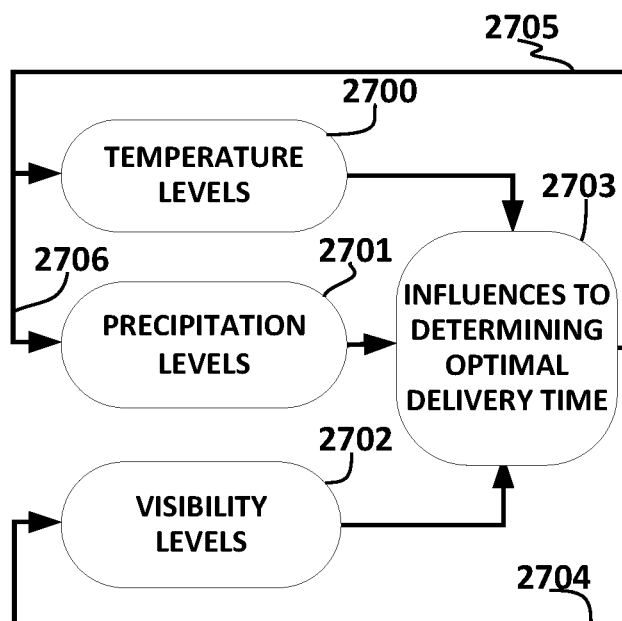
Figure 27C:
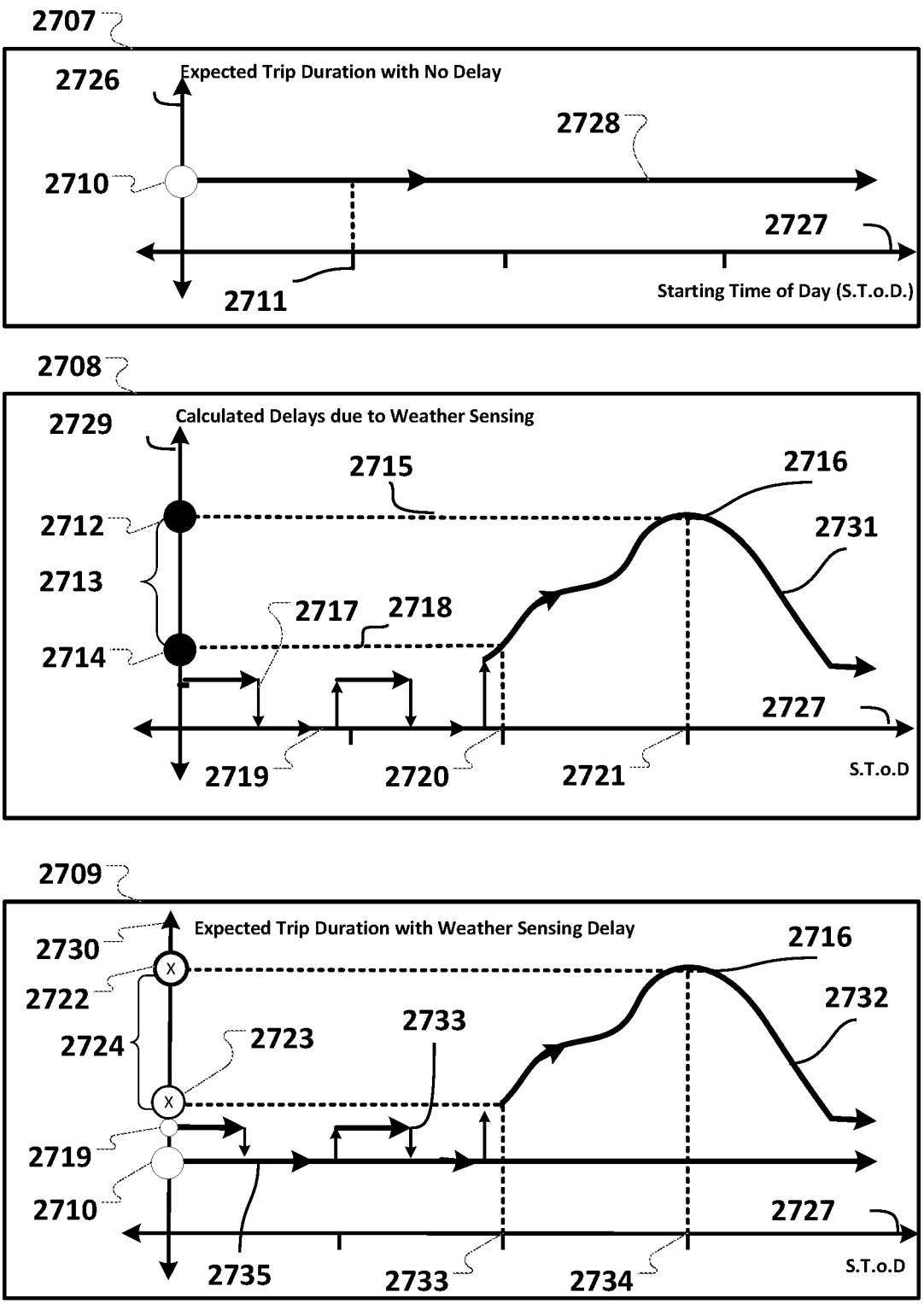

FIG. 27A, FIG. 27B, and FIG. 27C illustrate another example use-case of integrating sensors and understanding more about the calculations of predicted trip duration for a certain segment. The illustrations in FIG. 27A, FIG. 27B, and FIG. 27C are independently, and collectively, demonstrative of a system and method of utilizing sensors 1704, 1717, and 1710 towards gaining an understanding of the collective influences for determining optimal delivery times 2703. These examples illustrate how the gathering of information with sensors 1704, 1717, and 1710 can develop an understanding of the influences 2703 to computing expected trip duration with no delay 2726, calculated delays due to weather 2729, and the expected trip duration with weather sensing delay 2730, and that by building such an understanding by translating sensor data 1704, 1717, and 1710 into utility curve functions 2707, 2708, and 2709, it may be possible to make more informed decisions.

Shown in FIG. 27, and more specifically in FIG. 27A, is an example temperature sensor 1704, precipitation sensor 1717, and a visibility sensor 1710, that each may communicate with a weather aggregator 1700, or directly to the API 412, which is connected to the platform 413 that is communicating with various stakeholders, for example, 402, 405, 408, and/or 411. The sensors 1704, 1717, and 1710 which may be communicating via encrypted or other secure channels, using various means, for example, radio, electrical, and internet protocols, for example, TCP IPv4, TCP IPv6. The sensors may be collecting data at various time increments, for example, seconds, minutes, hours, days, weeks, and years.

Shown in FIG. 27, and more specifically in FIG. 27B, is an example of temperature levels sensor data 2700, precipitation levels sensor data 2701, and visibility levels (e.g., fog, clouds, mist) sensor data 2702, that may be utilized to influence the optimal delivery time 2703. The feedback loops 2704, 2705, and 2706 may promote the system to collect new data and update the optimal delivery time determination.

Shown in FIG. 27, and more specifically in FIG. 27C, is an example graph plot 2707 that illustrates an example utility curve function that is using continuous time. In one example embodiment, the curve function 2728 is defined with Expected Trip Duration with No Delay in the vertical axis 2726 and Starting Time of Day (S.T.o.D.) in the horizontal axis 2727. The curve 2728 illustrates the expected trip duration with no delay 2710 of a trip route, based on a starting time of day, 2711. The platform will generate the predicted curve 2728 utilizing various methods, discussed herein. In one example, at a starting time of day 2711, the predicted trip duration with no delay will be determined to be at 2710.

Shown in FIG. 27, and more specifically in FIG. 27C, is an example graph plot 2708 that illustrates an example utility curve function that is using continuous, for example 2731, and discrete time, for example 2717. In one example embodiment, the curve function 2731 is defined with Calculated Delay due to Weather Sensing in the vertical axis 2729 and Starting Time of Day (S.T.o.D.) in the horizontal axis 2727. The curve 2731 illustrates the calculated delay due to weather sensing 2729 of a trip route, based on a starting time of day, 2727, as may be defined, for example, by Equation (3):

$$\text{Calculated Delay Due to Weather Sensing}(2729) = \text{function}(2700, 2701, 2702)_{2727} \quad (3)$$

The platform will generate the predicted curve 2341 utilizing various methods, discussed herein, with sensor data influences towards defining the equation of the curve 2731. In one example, at a starting time of day 2720, based on the influence of 2700, 2701, and 2702, the calculated delay due to weather sensing 2729 will be determined 2718 to be at 2714. In another example, at a starting time of day 2721, based on the influences of 2700, 2701, and 2702, the calculated delay due to weather sensing 2729 will be determined 2715 to be at 2712. The difference in values between 2712 and 2714, is the additional time delay 2713 incurred by weather for starting at 2721 versus 2720. Additionally, it may be inferred that the most calculated delay will be at 2716 and that at 2719, there is zero calculated time delay.

Shown in FIG. 27, and more specifically in FIG. 27C, is an example graph plot 2709 that illustrates an example utility curve function that is using continuous, for example 2732, and discrete time, for example 2733. In the example embodiment, the curve function 2732 is defined with Expected Trip Duration with Weather Sensing Delay in the vertical axis 2730 and Starting Time of Day (S.T.o.D.) in the horizontal axis 2727. The graph plot of 2709 is the summation of the graph plots 2708 and 2709, over the entire starting time of day 2727. The curve 2732 illustrates the cumulative calculated expected trip duration with weather sensing 2730 of a trip route, based on a starting time of day, 2727, as defined, for example, by Equation (4):

$$\text{Expected Trip Duration with Weather Sensing}(2709) = \Sigma(2707+2708)_{S.T.O.D} \quad (4)$$

The platform will generate the predicted curve 2642 utilizing various methods, discussed herein, with sensor data influences towards defining the equation of the curve. In one example, at a starting time of day 2733, based on the influence of 2700, 2701, and 2702, the expected trip duration with sensing delay 2730 may be determined to be at 2723. In another example, at a starting time of day 2734, based on the influences of 2700, 2701, and 2702, the expected trip duration with weather sensing delay 2730 may be determined to be at 2722. The difference in values between 2722 and 2723, is the additional expected time duration 2724 incurred by weather for starting at 2734 versus 2733. Additionally, it may be inferred that the most expected trip duration will be at 2716, and that at 2735, there is zero calculated time duration delay, meaning that the expected trip duration with weather sensing will be equal to the expected trip duration with no delay 2728.

FIG. 27A, FIG. 27B, and FIG. 27C illustrate one example implementation of sensors 1400 and the aggregators 1401, in general, and the API/platform 1402, as specifically disclosed herein, in an example use-case of how to gain a better understanding of current events, with the intent of facilitating improved business decisions and learning 333. Other permutations and combinations of other sensors are possible and may be considered. The example embodiments depicted in FIG. 27A, FIG. 27B, and FIG. 27C, illustrate the method by which insights can be made, not only forecasting on past critical data points, but also on actual real-time data collected from sensors, that augment the routing subsystem 501 capabilities to compute or learn 316 about operational efficiencies, for example, when is optimal to make a deliveries, what are the better routes, and minimizing wasted resources.

Figure 28A:
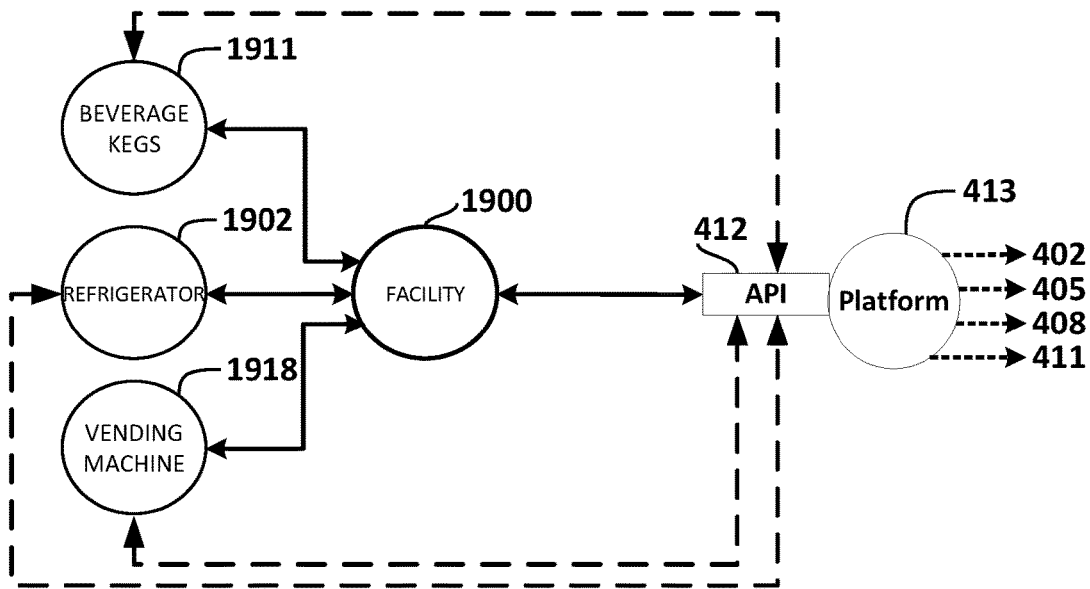
FIG. 28A, FIG. 28B, and FIG. 28C (collectively referred to as FIG. 28) illustrate an example use-case of using facility sensors to determine the optimal delivery time, as influenced by supply and demand.
Figure 28B:
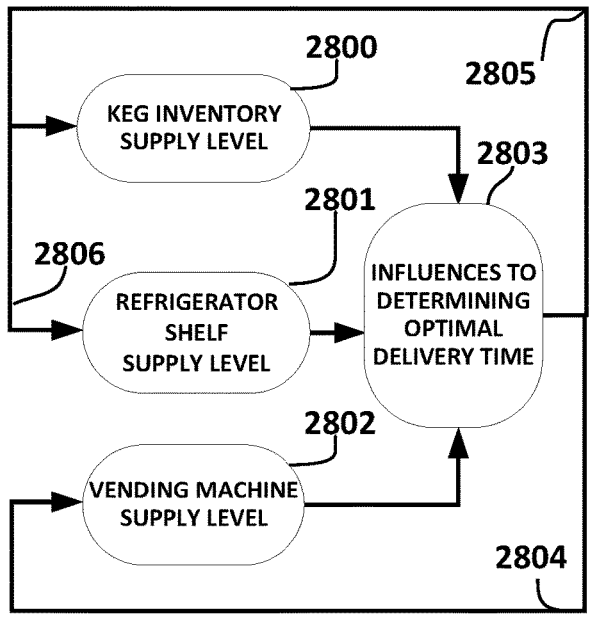
Figure 28C:
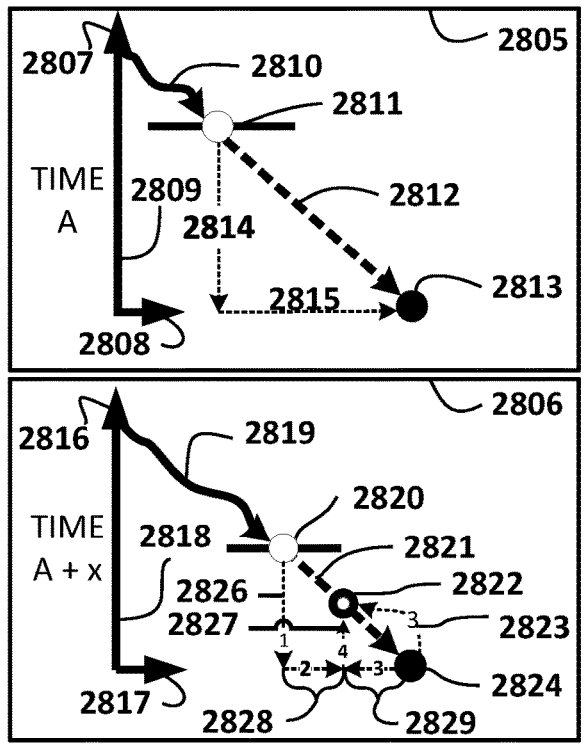

FIG. 28A, FIG. 28B, and FIG. 28C illustrate another example use-case of integrating sensors and understanding more about the calculations of a customer's need for a certain delivery. The illustrations in FIG. 28A, FIG. 28B, and FIG. 28C are independently, and collectively, demonstrative of a system and method of utilizing sensors 1910, 1902, and 1908 towards gaining an understanding of the collective influences 2803 for determining optimal delivery times 2803. These examples illustrate how the gathering of information with sensors 1911, 1902, and 1918 can develop an understanding of the influences 2803 to computing the optimal inventory supply and demand reorder points at various times 2811 and 2822, and that by building such an understanding by translating sensor data 1911, 1902, and 1918 into utility curve functions 2810 and 2819, it may be possible to make more informed decisions.

Shown in FIG. 28, and more specifically in FIG. 28A, is an example beverage keg sensor 1911, refrigerator sensor 1902, and a vending machine sensor 1918, that each may communicate with a Facility aggregator 1900, or directly to the API 412, which is connected to the platform 413 that is communicating with various stakeholders, for example, 402, 405, 408, and/or 4111. The sensors 1911, 1902, and 1918 which may be communicating via encrypted or other secure channels, using various means, for example, radio, electrical, and internet protocols, for example, TCP IPv4, TCP IPv6. The sensors may be collecting data at various time increments, for example, seconds, minutes, hours, days, weeks, and years.

Shown specifically in FIG. 28B is an example of keg inventory supply sensor data 2800, refrigerator shelf supply level sensor data 2801, and vending machine supply level sensor data 2802, that may be utilized to influence the optimal delivery time 2803. The feedback loops 2804, 2805, and 2806 may promote the system to collect new data and update the optimal delivery time determination.

Shown specifically in FIG. 28C is an example graph plot 2805 that illustrates an example utility curve function that is using continuous time. In one example embodiment, the curve function 2810 is defined with Inventory Supply in the vertical axis 2807, time along the horizontal access 2808. The curve 2810 illustrates the decrease in supply over time. The platform may generate the predicted curve 2810 utilizing various methods, discussed herein. In one example, at a time 2814, the expected supply inventory 2811 is determined, and a corresponding forecast 2812 is computed. From the forecast 2812, it can be predicated on the amount of time 2815 before the current inventory level 2811 will reach to zero 2813.

Shown specifically in FIG. 28C is another example graph plot 2806 that illustrates an example utility curve function that has advanced in time, for example, x value of minutes, from plot 2805, and illustrates the cyclic repetition of the analysis, at a future time, A+x.

Shown specifically in FIG. 28C is another example graph plot 2806. The vertical axis 2816 represents the inventory supply quantity and the horizontal axis 2817 represents the time, A+x. The platform may generate the curve 2819 utilizing various methods, discussed herein. In one example, at a time 2826, the expected supply inventory 2820 is determined, and a corresponding forecast 2821 is computed to determine when the supply will reach zero quantity 2824. From the forecast 2821, it can be determined the amount of time before the current inventory level 2820 will reach to zero 2824. In another embodiment, the sensor data from 2800, 2801, and 2802 may influence the algorithm to develop a need predication, 2822, that may result in an earlier delivery capability. Utilizing the algorithm 501 it may be determined that based on the actual consumption rate 2819, the current inventory level 2820, and the sensor data 2800, 2801, 2802, a delivery time of 2827 may be available. Thereby, improving on the static forecast predication for a real-time predication 2822 due to additional sensor data. The benefit is that the customer may receive the new inventory shipment sooner, at time 2827 for example, before the levels reach zero 2824, thereby preventing the stock-out occurrence.

FIG. 28A, FIG. 28B, and FIG. 28C illustrate one example of sensors 1400 and the aggregators 1401, in general, and the API/platform 1402, as specifically disclosed herein, in an example use-case of how to gain a better understanding of current events, with the intent of facilitating improved business decisions and learning 333. Other permutations and combinations of other sensors are possible and may be considered. The examples depicted in FIG. 28A, FIG. 28B, and FIG. 28C, illustrate the method by which insights can be made, not only forecasting on past critical data points, but also on actual real-time data collected from sensors, that augment the algorithm 501 capabilities to compute or learn 316 about operational efficiencies, for example, when is optimal to make a deliveries, what are the better routes, and minimizing wasted resources.

Figure 29A:
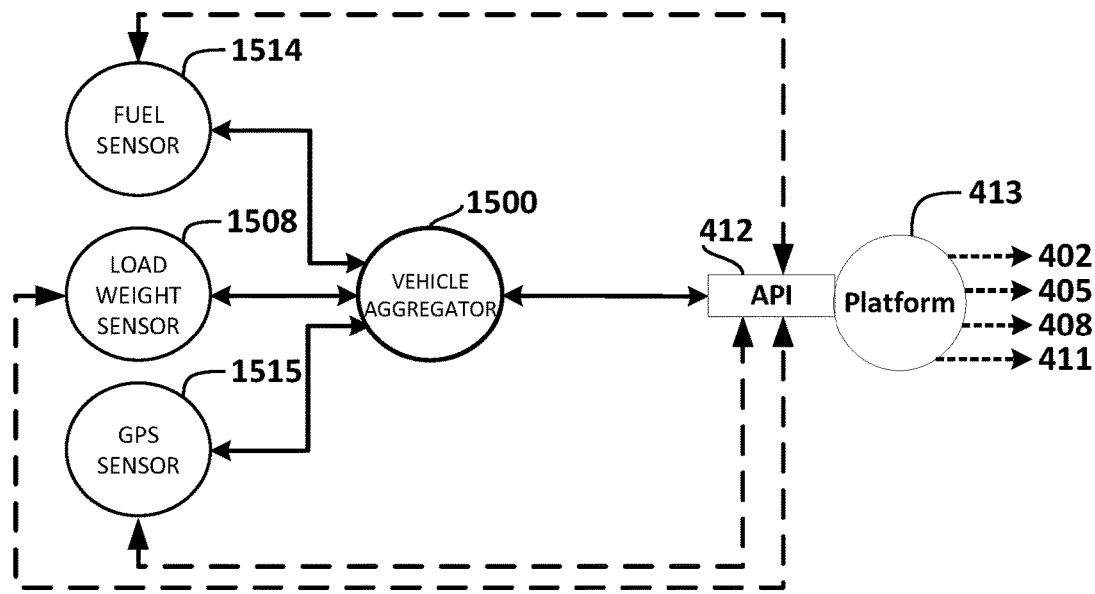
FIG. 29A-C illustrate an example use-case of using vehicle sensors to determine the marginal cost for delivery, as influenced by various vehicle measurements.
Figure 29B:
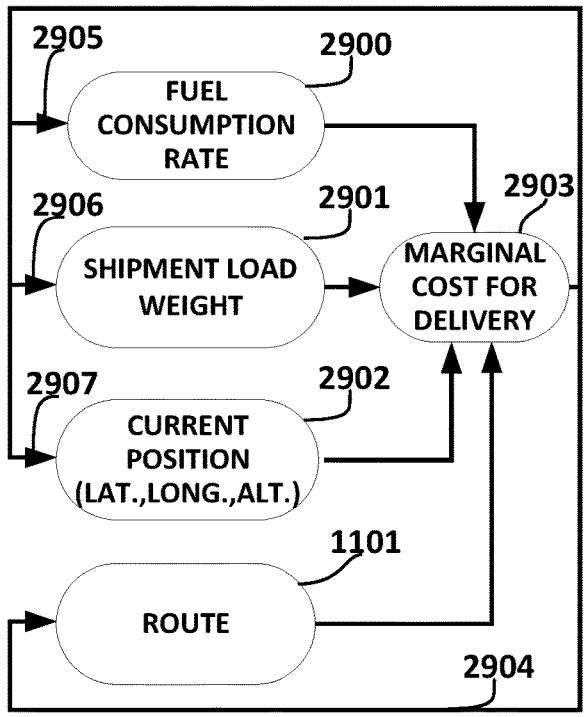
Figure 29C:
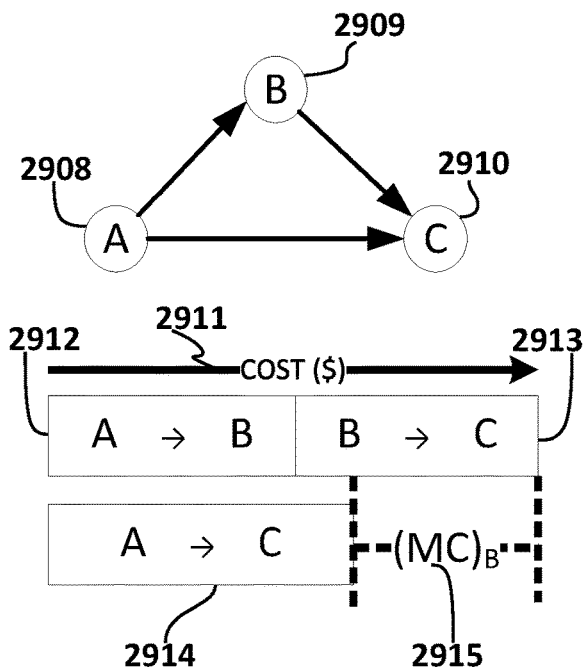

FIG. 29A, FIG. 29B, and FIG. 29C, collectively referred to as FIG. 29, illustrate another example use-case of integrating sensors and understanding more about the calculation of the marginal cost for delivering to the customer. The illustrations in FIG. 29A, FIG. 29B, and FIG. 29C are independently, and collectively, demonstrative of a system and method of utilizing sensors 1214, 1208, and 1215 towards gaining an understanding of the collective influences for determining marginal cost of delivery 2903. These example embodiments illustrate how the gathering of information with sensors 1214, 1208, 1215 can develop an understanding of the marginal cost 2903 and 2915 for making deliveries, and that by building such an understanding by translating sensor data 1214, 1208, and 1215 into utility functions 2911, 2912, 2913, 2914, 2915, it may be possible to make more informed decisions.

Specifically shown in FIG. 29A is an example fuel sensor 1214, load weight sensor 1208, and GPS sensor 1215, that each may communicate with a vehicle aggregator 1200, or directly to the API 412, which is connected to the platform 413 that is communicating with various stakeholders, for example, 402, 405, 408, and/or 4111. The sensors 1214, 1208, and 1215 which may be communicating via encrypted or other secure channels, using various means, for example, radio, electrical, and internet protocols, for example, TCP IPv4, TCP IPv6. The sensors may be collecting data at various time increments, for example, seconds, minutes, hours, days, weeks, and years.

Specifically shown in FIG. 29B is an example of fuel consumption rate data 2900, shipment load weight data 2901, and current position (e.g., Latitude, Longitude, Altitude) 2902, that may be utilized to influence the marginal cost of delivery. In another example embodiment, the route information 801 may also be included. The feedback loops 2904, 2905, 2906, and 2907 may promote the system to collect new data and update the optimal delivery time determination.

Specifically shown in FIG. 29C is an example use-case graph plot that illustrates an example for determining the marginal cost of delivery 2903 of delivery to a waypoint, as influenced by the sensor data 2900, 2901, 2902, and route information 801. In one example embodiment use-case, three waypoints are depicted, waypoint A 2908, waypoint B 2909, and a waypoint C 2910. The marginal cost of adding waypoint B 2909, is illustrated, for example, by Equation (5) 2915:

$$\text{Marginal Cost for Delivery to 2909} \triangleq (MC)_{2909} \triangleq 2915 = (2912+2913) - 2914 \qquad (5)$$

To understand the marginal cost 2915 of adding waypoint B 2909 to a route between waypoint A 2908 and waypoint C 2910, the cost 2911 of delivery from waypoint A 2908 to waypoint C 2910 is compared to the total cost 2911 of delivering from waypoint A 2908 to waypoint B 2909 plus the cost of delivering from waypoint B 2909 to waypoint C 2910.

FIG. 29A, FIG. 29B, and FIG. 29C present one example of sensors 1100 and the aggregators 1101, in general, and the API/platform 1102, as specifically disclosed herein, in an example use-case of how to gain a better understanding of current events, with the intent of facilitating improved business decisions and learning 333. Other permutations and combinations of other sensors are possible and may be considered. The examples depicted in FIG. 29A, FIG. 29B, and FIG. 29C, illustrate the method by which insights can be made, not only forecasting on past critical data points, but also on actual real-time data collected from sensors, that augment the algorithm 501 capabilities to compute or learn 316 about operational efficiencies, for example, when is optimal to make a deliveries, what are the better routes, and minimizing wasted resources.

As disclosed herein, the advantages of implementations of the technologies described in this specification include, without limitation, efficiency in holistically considering numerous parameters to provide route recommendations. The users and various agent types may interact with, to input, control, and extract information. The data is formatted in structured and unstructured types to facilitate usability for input and extraction. Furthermore, the platform system 413 is suitable for business managers to improve the operations, for example, by reducing operation cost, increasing accuracy, and improving the task scheduling. Furthermore, control mechanisms may measure actual progress, and may receive influence from external forces that impact the progress, and if used, may adjust the output such that actual progress matches desired progress, as closely as possible. The capabilities disclosed herein are accomplished by the actual measurement, with or without historic measurement, actual implications on route as opposed to historic measurements, and/or using input from external sources.

As disclosed herein, in terms of the various example embodiments, permutations, and use cases, in both summarized and detailed forms, it is not intended that these descriptions in any way limit the scope, and it will be understood that many substitutions, changes and variations in the described embodiments, applications, and methods discussed herein, and of their operation, can be made by those skilled in the art, without departing from the scope and spirit.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
    determining a plurality of candidate routes for a vehicle, wherein each respective candidate route (i) includes each waypoint of a same predetermined plurality of waypoints and (ii) specifies a corresponding ordering of the same predetermined plurality of waypoints;
    generating, for each respective candidate route of the plurality of candidate routes, independent feature values for the respective candidate route based on the corresponding ordering of the same predetermined plurality of waypoints;
    computing, for each respective candidate route and using a machine learning model, a corresponding score for the respective candidate route based on the independent feature values for the respective candidate route, wherein the machine learning model has been trained using a plurality of training samples each comprising (i) training independent feature values from a particular trip and (ii) a corresponding dependent score that represents an outcome of at least a portion of the particular trip;
    ranking the plurality of candidate routes based on the respective score computed for each respective candidate route; and
    providing a representation of at least one candidate route based on the ranking of the plurality of candidate routes.

2. The computer-implemented method of claim 1, wherein computing the corresponding score for the respective candidate route comprises:
    computing, using the machine learning model, a corresponding waypoint-specific score for each respective waypoint of the same predetermined plurality of waypoints of the respective candidate route, wherein the corresponding waypoint-specific score represents a respective benefit value of arriving at the respective waypoint according to the respective candidate route; and
    combining the corresponding waypoint-specific scores of the same predetermined plurality of waypoints of the respective candidate route.

3. The computer-implemented method of claim 2, wherein the corresponding waypoint-specific score represents a respective benefit value of arriving at the respective waypoint during a predicted time window indicated by the respective candidate route.

4. The computer-implemented method of claim 2, wherein the plurality of training samples is based on trip log data for previously-completed trips, and wherein the corresponding dependent score comprises, for each respective training waypoint of the particular trip, a waypoint-specific training score that indicates an extent to which a task was successfully performed at the respective training waypoint during a corresponding time window.

5. The computer-implemented method of claim 1, wherein each respective waypoint of the same predetermined plurality of waypoints is associated with a corresponding task to be completed at the respective waypoint, and wherein the corresponding score for the respective candidate route is based on a likelihood of successfully completing the corresponding task of at least one waypoint of the same predetermined plurality of waypoints.

6. The computer-implemented method of claim 1, wherein each respective candidate route of the plurality of candidate routes represents a proposed rerouting for subset of a trip of the vehicle.

7. The computer-implemented method of claim 1, wherein providing the representation of the at least one candidate route comprises:
    selecting a final route based on the ranking of the plurality of candidate routes; and
    providing data representing the final route to the vehicle for executing the final route.

8. The computer-implemented method of claim 1, further comprising:
    generating one or more of (i) an estimated time of arrival (ETA) for each respective waypoint of the same predetermined plurality of waypoints or (ii) travel directions for the at least one candidate route; and
    providing, for display to a driver of the vehicle, data representing the one or more of (i) the ETA for each respective waypoint or (ii) the travel directions.

9. The computer-implemented method of claim 1, wherein the independent feature values for the respective candidate route are based on sensor data received from one or more remote devices configured to generate one or more of vehicle data, passageway data, weather data, geopolitical data, facility data, or agent data.

10. The computer-implemented method of claim 1, wherein the independent feature values for the respective candidate route represent one or more of agent-specific information, payload-specific information, vehicle-specific information, passageway-specific information, path-specific information, environment-specific information, facility-specific information, or customer-specific information.

11. The computer-implemented method of claim 1, wherein the machine learning model is configured to generate, for each respective path of one or more paths between waypoints in the corresponding ordering of the same predetermined plurality of waypoints specified by the candidate route, a predicted duration for the vehicle to travel the respective path, and wherein the corresponding score is based on the predicted duration for each respective path of the one or more paths.

12. The computer-implemented method of claim 1, wherein the machine learning model is configured to generate, for each respective path of one or more paths between waypoints in the corresponding ordering of the same predetermined plurality of waypoints specified by the candidate route, a predicted distance to be traveled by the vehicle on the respective path, and wherein the corresponding score is based on the predicted distance for each respective path of the one or more paths.

13. A system comprising one or more computers and one or more storage devices storing instructions that are operable, when executed by the one or more computers, to cause the one or more computers to perform operations comprising:
  determining a plurality of candidate routes for a vehicle, wherein each respective candidate route (i) includes each waypoint of a same predetermined plurality of waypoints and (ii) specifies a corresponding ordering of the same predetermined plurality of waypoints;
  generating, for each respective candidate route of the plurality of candidate routes, independent feature values for the respective candidate route based on the corresponding ordering of the same predetermined plurality of waypoints;
  computing, for each respective candidate route and using a machine learning model, a corresponding score for the respective candidate route based on the independent feature values for the respective candidate route, wherein the machine learning model has been trained using a plurality of training samples each comprising (i) training independent feature values from a particular trip and (ii) a corresponding dependent score that represents an outcome of at least a portion of the particular trip;
  ranking the plurality of candidate routes based on the respective score computed for each respective candidate route; and
  providing a representation of at least one candidate route based on the ranking of the plurality of candidate routes.

14. The system of claim 13, wherein computing the corresponding score for the respective candidate route comprises:
  computing, using the machine learning model, a corresponding waypoint-specific score for each respective waypoint of the same predetermined plurality of waypoints of the respective candidate route, wherein the corresponding waypoint-specific score represents a respective benefit value of arriving at the respective waypoint according to the respective candidate route; and
  combining the corresponding waypoint-specific scores of the same predetermined plurality of waypoints of the respective candidate route.

15. The system of claim 14, wherein the corresponding waypoint-specific score represents a respective benefit value of arriving at the respective waypoint during a predicted time window indicated by the respective candidate route.

16. The system of claim 14, wherein the plurality of training samples is based on trip log data for previously-completed trips, and wherein the corresponding dependent score comprises, for each respective training waypoint of the particular trip, a waypoint-specific training score that indicates an extent to which a task was successfully performed at the respective training waypoint during a corresponding time window.

17. The system of claim 13, wherein each respective waypoint of the same predetermined plurality of waypoints is associated with a corresponding task to be completed at the respective waypoint, and wherein the corresponding score for the respective candidate route is based on a likelihood of successfully completing the corresponding task of at least one waypoint of the same predetermined plurality of waypoints.

18. The system of claim 13, wherein the independent feature values for the respective candidate route are based on sensor data received from one or more remote devices configured to generate one or more of vehicle data, passageway data, weather data, geopolitical data, facility data, or agent data.

19. A non-transitory computer-readable medium having stored thereon instructions that, when executed by a computing system, cause the computing system to perform operations comprising:
  determining a plurality of candidate routes for a vehicle, wherein each respective candidate route (i) includes each waypoint of a same predetermined plurality of waypoints and (ii) specifies a corresponding ordering of the same predetermined plurality of waypoints;
  generating, for each respective candidate route of the plurality of candidate routes, independent feature values for the respective candidate route based on the corresponding ordering of the same predetermined plurality of waypoints;
  computing, for each respective candidate route and using a machine learning model, a corresponding score for the respective candidate route based on the independent feature values for the respective candidate route, wherein the machine learning model has been trained using a plurality of training samples each comprising (i) training independent feature values from a particular trip and (ii) a corresponding dependent score that represents an outcome of at least a portion of the particular trip;
  ranking the plurality of candidate routes based on the respective score computed for each respective candidate route; and
  providing a representation of at least one candidate route based on the ranking of the plurality of candidate routes.

20. The non-transitory computer-readable medium of claim 19, wherein computing the corresponding score for the respective candidate route comprises:
  computing, using the machine learning model, a corresponding waypoint-specific score for each respective waypoint of the same predetermined plurality of waypoints of the respective candidate route, wherein the corresponding waypoint-specific score represents a respective benefit value of arriving at the respective waypoint according to the respective candidate route; and combining the corresponding waypoint-specific scores of the same predetermined plurality of waypoints of the respective candidate route.

\* \* \* \* \*